(12) United States Patent
Thomas

(10) Patent No.: US 12,698,199 B2
(45) Date of Patent: Aug. 4, 2026

(54) SYSTEMS, METHODS, AND DEVICES FOR INDUSTRIAL TOWER WASTE EXTRACTION

(71) Applicant: Industrial Vacuum Transfer Services USA, LLC, Houston, TX (US)

(72) Inventor: Randall Earl Thomas, Harwood, TX (US)

(73) Assignee: Industrial Vacuum Transfer Services USA, LLC, Houston, TX (US)

( * ) Notice: Subject to any disclaimer, the term of this patent is extended or adjusted under 35 U.S.C. 154(b) by 225 days.

(21) Appl. No.: 18/791,520

(22) Filed: Aug. 1, 2024

(65) Prior Publication Data

US 2024/0391753 A1 Nov. 28, 2024

Related U.S. Application Data

(62) Division of application No. 17/811,277, filed on Jul. 7, 2022, now Pat. No. 12,098,068.

(Continued)

(51) Int. Cl.
*B65G 53/60* (2006.01)
*B01D 46/42* (2006.01)

(Continued)

(52) U.S. Cl.
CPC ....... *B67D 7/0277* (2013.01); *B01D 46/4236* (2013.01); *B01D 46/4245* (2013.01); *B01D 46/444* (2013.01); *B01D 2279/55* (2013.01)

(58) Field of Classification Search
CPC ....... B01J 8/0415; B01J 8/0453; C10G 11/10; B65G 51/01–46; B65G 53/01–66; B65G 2207/06; B65G 2812/16–1683

(Continued)

(56) References Cited

U.S. PATENT DOCUMENTS 1,083,408 A 1/1914 Matchette
2,193,784 A * 3/1940 Smith ...................... A47L 5/32 15/301

(Continued)

FOREIGN PATENT DOCUMENTS

CN 110817176 2/2020
CN 113123397 A 7/2021

(Continued)

OTHER PUBLICATIONS

VAC-U-MAX, Air Operated Industrial Vacuum Cleaners, Belleville, NJ, 2021, https://www.vac-u-max.com/.

(Continued)

*Primary Examiner* — Joseph A Dillon, Jr.
(74) *Attorney, Agent, or Firm* — Womble Bond Dickinson (US) LLP

(57) ABSTRACT

Systems, methods, apparatuses, and devices for removal of undesired materials are disclosed. Production of desired materials may result in the production of undesired materials. The systems, methods, apparatuses, and devices, may provide for removal of the undesired materials from various environments (e.g., industrial, commercial, residential, natural, etc.). The undesired materials may be removed in a substantially continuous manner and may limit or prevent contamination of an ambient environment with the undesired materials. The undesired materials may be removed with high-pressure vacuum through a fluid flow path that keeps the undesired materials from the ambient environment.

31 Claims, 47 Drawing Sheets

Related U.S. Application Data

(60) Provisional application No. 63/367,570, filed on Jul. 1, 2022, provisional application No. 63/367,218, filed on Jun. 29, 2022, provisional application No. 63/367,219, filed on Jun. 29, 2022, provisional application No. 63/364,630, filed on May 13, 2022, provisional application No. 63/264,101, filed on Nov. 16, 2021, provisional application No. 63/264,015, filed on Nov. 12, 2021, provisional application No. 63/203,147, filed on Jul. 9, 2021, provisional application No. 63/203,108, filed on Jul. 8, 2021.

(51) Int. Cl.
*B01D 46/44* (2006.01)
*B67D 7/02* (2010.01)

(58) Field of Classification Search
USPC ........................................ 406/1–198
See application file for complete search history.

(56) References Cited

U.S. PATENT DOCUMENTS 2,458,258 A * 1/1949 Furr .................... E01H 1/0836 414/508
2,483,485 A * 10/1949 Barr .................... C07C 1/0485 209/474
2,863,525 A * 12/1958 Lucian .................... A47L 5/18 15/409
3,319,645 A * 5/1967 Mahoney .............. B65G 53/06 137/267
3,489,464 A * 1/1970 Delfs .................... B65G 53/60 406/28
3,776,601 A 12/1973 Capes et al.
3,971,096 A 7/1976 Renholt
4,000,061 A 12/1976 Bowling et al.
4,034,869 A * 7/1977 Stange .............. G03B 27/6264 406/72
4,212,653 A 7/1980 Giles
4,278,454 A 7/1981 Nemesi
4,303,417 A 12/1981 Koch
4,372,713 A 2/1983 Kean, Jr.
4,379,663 A 4/1983 Allison
4,415,297 A 11/1983 Boring
4,422,810 A 12/1983 Boring
4,423,987 A 1/1984 Powers
4,460,389 A 7/1984 Baum
4,519,810 A 5/1985 Haas
4,578,840 A 4/1986 Pausch
4,642,223 A * 2/1987 Al-Saigh ............... B01J 8/0492 208/158
4,759,691 A 7/1988 Kroupa
4,913,597 A 4/1990 Christianson
4,923,597 A 5/1990 Anderson et al.
4,925,467 A 5/1990 Jordan et al.
4,933,017 A 6/1990 Brzoska
4,935,984 A 6/1990 Bryant
4,947,510 A 8/1990 English
4,988,240 A 1/1991 Thompson
5,030,259 A 7/1991 Bryant et al.
5,163,786 A 11/1992 Christianson
5,201,958 A 4/1993 Breunsbach
5,310,291 A 5/1994 Miller
5,425,188 A 6/1995 Rinker
5,540,784 A 7/1996 Ranes
5,562,746 A 10/1996 Raether
5,791,073 A 8/1998 Palmer
5,940,926 A 8/1999 Inzinna
6,093,226 A 7/2000 Schoenberger
6,206,621 B1 3/2001 Sebring
6,322,327 B1 11/2001 Dawson
6,325,572 B1 12/2001 Dietrich
6,385,867 B1 5/2002 Slabach
6,413,020 B1 7/2002 Davison
6,471,751 B1 10/2002 Semanderes
6,623,215 B2 9/2003 Dietrich
6,749,373 B2 6/2004 Von Geldern
6,872,263 B1 3/2005 Jansen
RE38,872 E 11/2005 Hayes
7,045,068 B2 5/2006 Hutchinson
7,074,261 B2 7/2006 Murphy
7,203,994 B2 4/2007 Smith
7,909,910 B2 3/2011 Benner
7,959,870 B2 6/2011 Yanokuchi et al.
7,967,901 B2 6/2011 Sakatani et al.
8,153,001 B2 4/2012 Peters
8,277,201 B2 10/2012 Krohn
8,360,691 B2 1/2013 Moretto
8,596,990 B2 12/2013 Schaaf
8,702,399 B2 4/2014 Krohn
8,764,350 B2 7/2014 Bjarno
8,881,341 B2 11/2014 Schmidt, Jr.
8,967,919 B2 3/2015 Yaluris et al.
9,045,072 B2 6/2015 Hetcher
9,212,669 B2 12/2015 Krohn
9,227,780 B2 1/2016 Krohn
9,382,079 B2 7/2016 Bjarno
9,687,890 B2 6/2017 Tacke
9,713,827 B2 7/2017 Bonneau et al.
9,719,230 B2 8/2017 Showley
9,988,788 B2 6/2018 Holt
10,000,347 B2 6/2018 Newton
10,065,150 B2 9/2018 Archuleta et al.
10,421,624 B2 9/2019 Maguire
10,457,501 B2 10/2019 Wilkinson et al.
10,502,237 B2 12/2019 Johnson
10,527,064 B2 1/2020 Krohn
10,739,070 B2 8/2020 Bishop
10,875,060 B2 12/2020 Wu et al.
10,906,225 B2 2/2021 Zinski
10,926,008 B2 2/2021 Minskoff et al.
11,091,327 B2 8/2021 Kelly
11,179,754 B2 11/2021 Doucette, Jr
11,319,958 B2 5/2022 Schaller
11,448,221 B2 9/2022 Scancarello
11,549,748 B1 1/2023 Khankal
11,584,598 B2 2/2023 Conradt
11,629,486 B2 4/2023 Forster
11,643,790 B2 5/2023 Renger
11,891,255 B2 2/2024 Congedi
11,939,174 B2 3/2024 Sundholm
11,952,224 B2 4/2024 Handfield
11,999,576 B2 6/2024 Klose
12,091,264 B2 9/2024 Thomas
12,098,068 B2 9/2024 Thomas
12,103,791 B2 10/2024 Thomas
12,137,864 B2 11/2024 Thomas
12,193,627 B2 1/2025 Thomas
12,203,701 B2 1/2025 Khankal
12,246,932 B2 3/2025 Thomas
12,466,643 B1 11/2025 Ell
12,485,459 B2 12/2025 Thomas et al.
12,510,077 B2 12/2025 Thomas
2003/0190200 A1 10/2003 Hajima
2004/0149317 A1 8/2004 Jur
2004/0238006 A1 12/2004 Sears
2005/0005968 A1 1/2005 Berry
2005/0183574 A1 8/2005 Burnett
2006/0162568 A1 7/2006 Arai
2007/0212175 A1 9/2007 Ernst
2007/0234906 A1 10/2007 Demarco
2007/0251198 A1 11/2007 Witter
2008/0244986 A1 10/2008 Adelmann et al.
2009/0127352 A1 5/2009 Hinther
2009/0159003 A1 6/2009 Noguchi et al.
2010/0218467 A1 9/2010 Witter
2010/0243575 A1 9/2010 Nowling
2011/0047743 A1 3/2011 Shepherd
2012/0117754 A1 5/2012 Mendenhall
2012/0125441 A1 5/2012 Krohn
2012/0233758 A1 9/2012 Tolles
2012/0318583 A1 12/2012 Krohn
2013/0108482 A1 5/2013 Johnson

(56) References Cited

U.S. PATENT DOCUMENTS

| | | | |
|---|---|---|---|
| 2013/0192467 | A1 | 8/2013 | Lyras |
| 2013/0232723 | A1 | 9/2013 | Catalfamo |
| 2013/0315761 | A1 | 11/2013 | Milhau et al. |
| 2013/0327706 | A1 | 12/2013 | Ursoi |
| 2013/0336875 | A1 | 12/2013 | Chang |
| 2014/0374331 | A1 | 12/2014 | Anderson |
| 2015/0335217 | A1 | 11/2015 | Fritsche |
| 2016/0280473 | A1 | 9/2016 | Veselov |
| 2017/0058484 | A1 | 3/2017 | Buchleiter |
| 2017/0128957 | A1 | 5/2017 | Kozawa et al. |
| 2017/0267466 | A1 | 9/2017 | Wilkinson et al. |
| 2018/0148277 | A1 | 5/2018 | Maguire |
| 2019/0183737 | A1 | 6/2019 | Valerino |
| 2019/0193960 | A1 | 6/2019 | Sewell |
| 2019/0226474 | A1 | 7/2019 | Krohn |
| 2020/0078837 | A1 | 3/2020 | Ducette et al. |
| 2020/0378200 | A1 | 12/2020 | Krohn |
| 2022/0031929 | A1 | 2/2022 | Davie |
| 2022/0126225 | A1 | 4/2022 | Nowling |
| 2022/0128055 | A1 | 4/2022 | Kolvenbach |
| 2023/0009143 | A1 | 1/2023 | Thomas |
| 2023/0009644 | A1 | 1/2023 | Thomas |
| 2023/0010206 | A1 | 1/2023 | Thomas |
| 2023/0010395 | A1 | 1/2023 | Thomas |
| 2023/0010635 | A1 | 1/2023 | Thomas |
| 2023/0011157 | A1 | 1/2023 | Thomas |
| 2023/0127887 | A1 | 4/2023 | Khankal et al. |
| 2023/0304903 | A1 | 9/2023 | Burger |
| 2023/0340957 | A1 | 10/2023 | Thomas |
| 2023/0340966 | A1 | 10/2023 | Krohn |
| 2023/0356273 | A1 | 11/2023 | Speece |
| 2023/0373757 | A1 | 11/2023 | Sato |
| 2023/0405644 | A1 | 12/2023 | Thomas et al. |
| 2024/0150136 | A1 | 5/2024 | Sundholm |
| 2024/0190669 | A1 | 6/2024 | Brothier |
| 2024/0367922 | A1 | 11/2024 | Thomas |
| 2024/0391708 | A1 | 11/2024 | Thomas |
| 2024/0391709 | A1 | 11/2024 | Thomas |
| 2024/0391710 | A1 | 11/2024 | Thomas |
| 2024/0391754 | A1 | 11/2024 | Thomas |
| 2024/0391755 | A1 | 11/2024 | Thomas |
| 2025/0009197 | A1 | 1/2025 | Thomas |
| 2025/0025820 | A1 | 1/2025 | Sisk |
| 2025/0089956 | A1 | 3/2025 | Thomas |
| 2025/0145392 | A1 | 5/2025 | Thomas |
| 2026/0108921 | A1 | 4/2026 | Thomas |
| 2026/0110299 | A1 | 4/2026 | Thomas |

FOREIGN PATENT DOCUMENTS

| | | | |
|---|---|---|---|
| CN | 114034519 | | 2/2022 |
| CN | 118579521 | | 11/2024 |
| CN | 115215101 | | 1/2025 |
| DE | 1528900 | | 12/1969 |
| DE | 2625701 | | 12/1977 |
| DE | 202011052400 | | 1/2012 |
| EP | 5043983 | | 5/1974 |
| EP | 1226865 | | 7/2002 |
| EP | 1537773 | | 8/2005 |
| EP | 1967260 | | 9/2008 |
| EP | 2045199 | | 4/2009 |
| EP | 20120006864 | | 1/2012 |
| EP | 2805902 | | 11/2014 |
| EP | 3799969 | | 4/2021 |
| FR | 2903422 | | 1/2008 |
| GB | 1385706 | | 2/1975 |
| IN | 298340 | | 6/2018 |
| IN | 326989 | | 12/2019 |
| IN | 329066 | | 1/2020 |
| IN | 396075 | | 5/2022 |
| JO | 2006130479 | | 5/2006 |
| JP | 52115089 | | 9/1977 |
| JP | 60190707 | | 12/1985 |
| JP | 04103849 | | 9/1992 |
| JP | 0738044 | | 7/1995 |
| JP | 09221225 | | 8/1997 |
| JP | 2003095436 | | 4/2003 |
| JP | 2005112373 | | 4/2005 |
| JP | 2006102657 | | 4/2006 |
| JP | 2007063934 | A | 3/2007 |
| KR | 1251087 | | 10/2002 |
| KR | 100776693 | | 11/2007 |
| KR | 20160077775 | | 7/2016 |
| KR | 3064457 | | 9/2016 |
| KR | 101864666 | | 6/2018 |
| KR | 102063424 | | 1/2020 |
| WO | 97/27135 | | 7/1997 |
| WO | 2004010006 | | 1/2004 |
| WO | 2008009024 | | 1/2008 |
| WO | 2009156685 | | 12/2009 |
| WO | 2010090574 | | 8/2010 |
| WO | 2012059625 | | 5/2012 |
| WO | 2013025522 | | 2/2013 |
| WO | 2017041769 | | 3/2017 |
| WO | 2021089977 | | 5/2021 |

OTHER PUBLICATIONS

Filter Concept Pvt. Ltd., Screenshots from youtube video located at https://www.youtube.com/watch?v=bbXZCzgZh4w, Mar. 14, 2013.

Transvac, Ejector Performance Testing, Alfreton, Derbyshire, UK, 2021, https://www.transvac.co.uk/ejector-performance-testing/.

Transvac, How an Ejector Works, Alfreton, Derbyshire, UK, 2021, https://www.transvac.co.uk/how-an-ejector-works/.

Declaration of Randall Earl Thomas, Nov. 28, 2022.

Wayback Machine printouts of www.supavac.com, Apr. 4, 2004.

Invitation to Pay Additional Fees with Partial International Search for PCT/US2022/073532, Nov. 4, 2022.

International Search Report and Written Opinion for PCT/US2022/073537, Nov. 4, 2022.

International Search Report and Written Opinion for PCT/US2022/073542, Nov. 4, 2022.

International Search Report and Written Opinion for PCT/US2022/073545, Nov. 4, 2022.

International Search Report and Written Opinion for PCT/US2022/073551, Nov. 4, 2022.

International Search Report and Written Opinion for PCT/US2022/073554, Nov. 4, 2022.

International Search Report and Written Opinion for PCT/US2022/073532, Jan. 2, 2023.

* cited by examiner 20
22
10
32
30
24
26
28

10
14
20
26
28
24
20
30
32
104

310
520
300
130
130
210

910
930
900
100
920

SYSTEMS, METHODS, AND DEVICES FOR INDUSTRIAL TOWER WASTE EXTRACTION

PRIORITY CLAIMS

This application is a divisional of U.S. Non-Provisional application Ser. No. 17/811,277, filed Jul. 7, 2022, titled "SYSTEMS, METHODS, AND DEVICES FOR INDUSTRIAL TOWER WASTE EXTRACTION," which claims priority to and the benefit of U.S. Provisional Application No. 63/367,570, filed Jul. 1, 2022, titled "HIGH VOLUME INDUSTRIAL VACUUM ASSEMBLIES AND METHODS," U.S. Provisional Application No. 63/367,219, filed Jun. 29, 2022, titled "RECEIVER, ASSEMBLIES, AND METHODS FOR LOADING AND EXTRACTING PRODUCT IN ELEVATED TOWER," U.S. Provisional Application No. 63/367,218, filed Jun. 29, 2022, titled "ASSEMBLIES AND METHODS FOR MATERIAL EXTRACTION FROM RETENTION COLLECTIONS," U.S. Provisional Application No. 63/364,630, filed May 13, 2022, titled "ASSEMBLIES, APPARATUSES, SYSTEMS, AND METHODS FOR MATERIAL EXTRACTION AND CONVEYANCE," U.S. Provisional Application No. 63/264,101, filed Nov. 16, 2021, titled "ASSEMBLIES AND METHODS FOR MATERIAL EXTRACTION," U.S. Provisional Application No. 63/264,015, filed Nov. 12, 2021, titled "ASSEMBLIES AND METHODS FOR MATERIAL EXTRACTION," U.S. Provisional Application No. 63/203,147, filed Jul. 9, 2021, titled "SYSTEMS, METHODS, AND DEVICES FOR INDUSTRIAL TOWER WASTE EXTRACTION," and U.S. Provisional Application No. 63/203,108, filed Jul. 8, 2021, titled "SYSTEMS, METHODS, AND DEVICES FOR INDUSTRIAL TOWER WASTE EXTRACTION," the disclosures of all of which are incorporated herein by reference in their entireties.

FIELD OF DISCLOSURE

Embodiments of this disclosure relate to waste material removal from industrial sites, and more particularly, to systems and methods for removing waste material with high-pressure vacuums.

BACKGROUND

Various materials in a range of different environments (e.g., industrial, commercial, residential, natural) may impact these environments. For example, the presence of undesired materials may render these environments to be less desirable for their respective purposes.

In traditional approaches for material removal, such as using shovels, carts, and other tools, the undesired materials may be loaded onto open vehicles such as dump trucks and driven to disposal sites remote to the environments. The undesired materials make take a variety of forms (e.g., liquids, solids, emulsions, particulates, etc.) which may present challenges in their removal.

The present disclosure is directed to embodiments of systems and methods that may provide for the removal of undesired materials from a variety of different environments.

SUMMARY

The present disclosure is generally directed to systems, methods, apparatuses, and devices, for removal of undesired materials. Production of desired materials may result in the production of undesired materials. In some embodiments, the systems, methods, apparatuses, and devices, provide for efficient removal of undesired materials from various environments (e.g., industrial, commercial, residential, natural, etc.). The undesired materials may be removed in a substantially continuous manner and may be removed without contaminating (or with limited contamination of) an ambient environment with the undesired materials.

Accordingly, an embodiment of the disclosure is directed to a system for removing undesired materials from a reaction vessel. The reaction vessel may include multiple zones in which the undesired material is disposed. The system may remove the undesired material with a high-pressure vacuum. The system may include a manifold pneumatically coupled to two or more zones of the reaction vessel in which the undesired material is disposed. The system may also include a material collector having an interior and pneumatically coupled to the manifold. The system may further include a high-pressure vacuum source pneumatically coupled to the material collector and positioned to generate a high-pressure vacuum of a fluid flow through the interior of the material collector to extract a majority of the undesired material from the reaction vessel, through the manifold and into the interior the interior of the material collector. The system may also include a fluid flow attenuating filter pneumatically coupled to an exhaust of the vacuum source. The fluid flow attenuating filter may be positioned to filter a minority of the undesired material from the fluid flow after passage through the material collector and prior to discharge into an ambient environment. The fluid flow attenuating filter may also be positioned to attenuate sound of the high-pressure vacuum of the fluid flow prior to exhaustion of the fluid flow into ambient environment.

Another embodiment of the disclosure is directed to a material collector for removing waste material from a reaction vessel when a high-pressure vacuum source is applied to the material collector. The material collector may include a housing. The housing includes one or more housing walls. The housing may include a housing interior substantially surrounded by the one or more housing walls. The material collector may also include an inlet port connected to the housing. The inlet port may be positioned to allow access to the housing interior when pneumatically connected to the reaction vessel, and to receive the waste material when entrained in a fluid flow from the high-pressure vacuum source. The material collector may also include a waste material mover positioned in the housing interior. The material mover may move the waste material when received in the housing interior. The material collector may additionally include a waste material discharge port connected to the housing to provide access to the housing interior and through which the waste material is discharged from the housing interior when positioned in the housing. The material collector may further include two or more structural housing support members each positioned spaced apart and extending along a surface of the housing to structurally support the one or more housing walls of the housing.

Another embodiment of the disclosure is directed to a high volume pressure vessel for removing waste material from a reaction vessel. The high volume pressure vessel includes a housing. The housing includes one or more housing walls in a bulbous shape. The high volume pressure vessel also includes an interior substantially surrounded by the one or more housing walls. The interior may be drawn down to a vacuum to transfer the waste material to the interior. The high volume pressure vessel may also include an inlet port connected to the housing. The inlet port may be positioned to allow access to the interior when pneumatically connected to the reaction vessel, and to receive a majority of the waste material in the interior with the vacuum. The high volume pressure vessel additionally includes an exhaust port connected to the housing. The exhaust port is positioned to allow access to the interior when pneumatically connected to a high-pressure vacuum source, and to exhaust a minority of the waste material out of the interior to the high-pressure vacuum source. The high volume pressure vessel also includes a discharge port connected to the housing. The discharge port is positioned to discharge the majority of the waste material from the interior. The high volume pressure vessel further includes a fluid supply port pneumatically connected to a fluid supply. The fluid supply port is positioned to pressurize the interior with the fluid supply. The high volume pressure vessel also includes a relief port pneumatically connected to an ambient environment. The relief port is positioned to relieve the high-pressure vacuum from the interior. The high volume pressure vessel further includes a flow assistor positioned to increase a rate of the discharge of the majority of the waste material through the discharge port. The high volume pressure vessel also includes a controller that monitors a fill level of the majority of the waste material in the interior, makes a determination that the fill level meets criteria, and in response to the determination: discharges the majority of the waste material through the discharge port.

A further embodiment of the disclosure is directed to a fluid flow attenuating filter container to collectively filter fluid flow and attenuate sound when connected to a vacuum source. The fluid flow attenuating filter container includes a housing. The housing including walls. The fluid flow attenuating filter container also includes a filter interior substantially surrounded by the walls. The fluid flow attenuating filter container additionally includes an inlet port positioned on one of the walls to receive a fluid flow into the filter interior when connected to the vacuum source. The fluid flow attenuating filter container also includes an exhaust port positioned on the housing to exhaust the fluid flow from the filter interior when connected to the vacuum source and sized relative to the inlet port to attenuate the sound from the fluid flow. The fluid flow attenuating filter container further includes a filter media positioned in the filter interior to filter solid material from the fluid flow, and attenuate sound from the fluid flow prior to exhaustion from the filter interior. The fluid flow attenuating filter container also includes baffling positioned in the filter interior to attenuate the sound from the fluid flow prior to exhaustion from the filter interior.

An additional embodiment of the disclosure is directed to a method for removing waste material from zones of a reaction vessel. The method includes generating a high-pressure vacuum of fluid flow in an interior of a material collector when connected to the reaction vessel by a pneumatic connection which extends between one or more of the zones and the interior. The method also includes transferring, with the high-pressure vacuum of the fluid flow, the waste material through the pneumatic connection to collect a majority of the waste material from the zones into the interior of the material collector. The interior is pneumatically connected to the reaction vessel by the pneumatic connection. The method further includes filtering a minority of the waste material from the fluid flow after passage through the material collector with a fluid flow attenuating filter in fluid communication with the material collector and prior to discharge of the fluid flow into an ambient environment. The method also includes attenuating sound from the high-pressure vacuum of the fluid flow with the fluid flow attenuating filter prior to the discharge of the fluid flow into ambient environment.

An additional embodiment of the disclosure is directed to a method for removing waste material from a reaction vessel. The method includes pneumatically connecting a vacuum box to the reaction vessel and a vacuum source to form a fluid flow path between reaction vessel and the vacuum source through the vacuum box. The method includes substantially continuously removing the waste material from the reaction vessel. The waste material may be substantially continuously removed by drawing a vacuum in the vacuum box with the vacuum source to transfer a portion of the waste material from the reaction vessel into the vacuum box along the fluid flow path. The waste material may also be substantially continuously removed by monitoring a waste material fill level in the vacuum box to determine a stop time when transferring the portion of the waste material to the vacuum box so as to not overfill the vacuum box with the portion of the waste material. The waste material may also be substantially continuously removed by removing the vacuum from the vacuum box based on the stop time to equalize pressure in the vacuum box and stop the transfer of the portion of the waste material from the reaction vessel into the vacuum box along the fluid flow path. The waste material may also be substantially continuously removed by pneumatically disconnecting the pressure equalized vacuum box from the reaction vessel and the vacuum source to remove the pressure equalized vacuum box from the fluid flow path. The waste material may also be substantially continuously removed by pneumatically connecting a replacement vacuum box to the reaction vessel and the vacuum source to replace the pressure equalized vacuum box with the replacement vacuum box in the fluid flow path. The waste material may also be substantially continuously removed by drawing a second vacuum in the replacement vacuum box with the vacuum source to transfer a second portion of the waste material from the reaction vessel into the replacement vacuum box along the fluid flow path. The method may additionally include transporting the disconnected vacuum box with a transportation vehicle to a disposal site remote to the reaction vessel. The method may also include removing the portion of the waste material from the disconnected vacuum box at the disposal site.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

DETAILED DESCRIPTION

Figure 1:
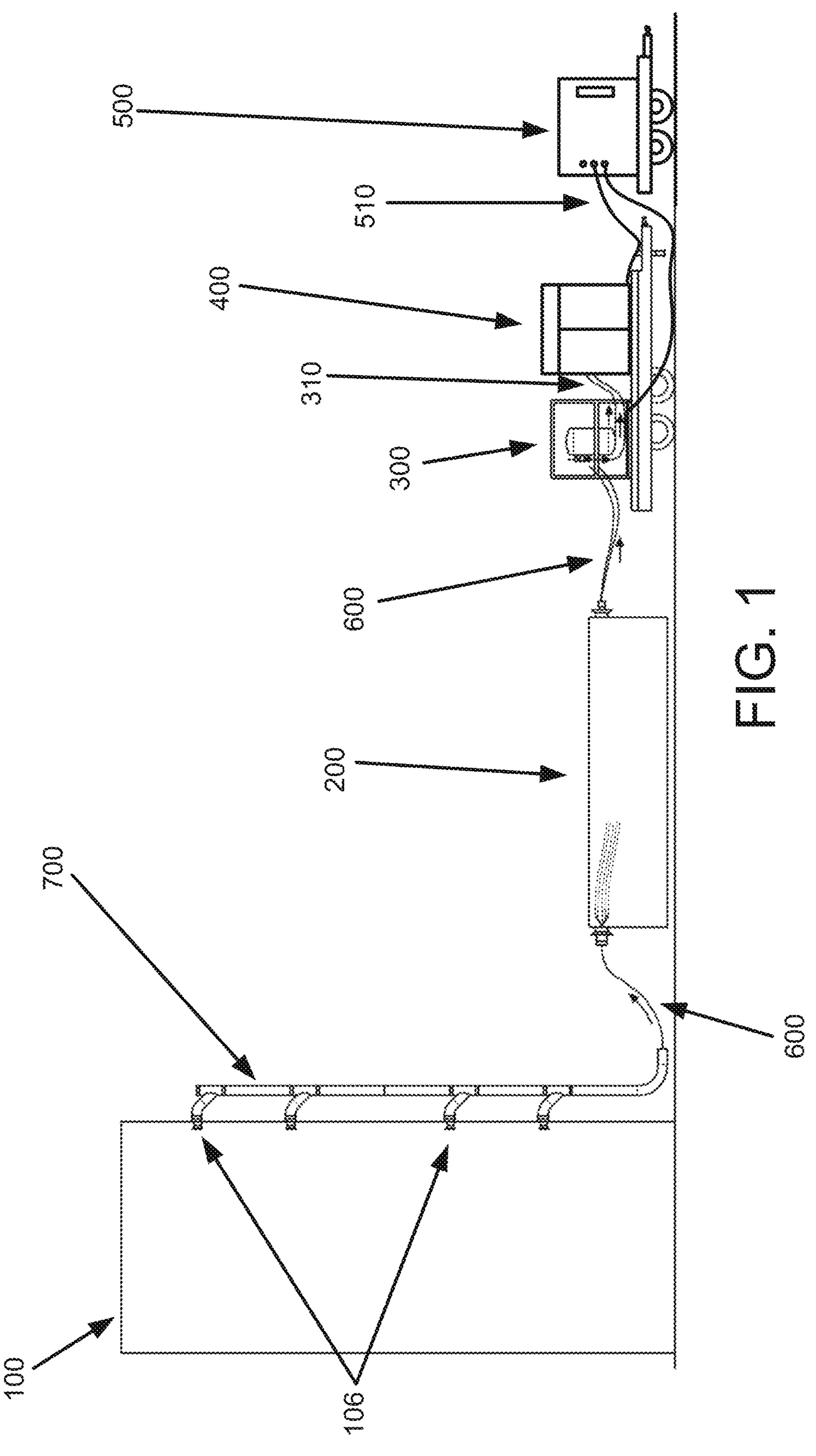
FIG. 1 is a simplified diagram of a material removal system, according to one or more embodiments of the disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

As illustrated in FIGS. 1-48, the present disclosure is directed to embodiments of systems, methods, apparatuses, and devices for waste material removal from industrial and commercial settings. The industrial settings, for example, may include chemical reaction towers (or other types of reaction vessels) in which chemical reactions are performed to obtain desirable products. Waste material may be generated as a byproduct from the chemical reactions.

For example, some types of chemical reactions utilize a catalyst material to mediate the chemical reactions (e.g., by causing the reaction to occur, increasing/decreasing a rate at which the reaction occurs, etc.). In a chemical reaction tower (see, e.g., FIG. 1), the catalyst material may be loaded into the chemical tower at various tower levels. Other materials (e.g., gasses, liquids, etc.) are then introduced into the tower. The presence of the catalyst material may cause, mediate, or otherwise facilitate a desired chemical reaction to generate a desired product.

The chemical reaction may cause the reactivity, morphology, or other properties of the catalyst material to change thereby reducing the ability of the catalyst to perform its function. In other words, the catalyst may be used up or otherwise render its presence in the chemical tower to be undesirable.

Additionally, the chemical reaction (with or without the catalyst material) may generate some desired products and other undesired products (e.g., additional waste material) from the other materials introduced into the tower. The undesired products may be deposited in the chemical reaction tower at various locations which may present challenges to removing the undesired products.

The chemical reaction may also interact with the materials out of which the chemical reaction tower is formed. For example, some chemical reaction towers are formed from concrete and steel. Chemical reaction towers may be formed from any number and types of materials. The catalyst or the other materials in the chemical tower may react or otherwise interact with these materials of the chemical reaction tower forming additional undesired products (referred to as "tower products").

The undesired reaction products and/or the tower products (referred to as "waste materials") may move within the chemical reaction tower. For example, some of these materials may partially or completely cover the catalyst or other important features of the chemical reaction tower thereby reducing the effectiveness of the catalyst (even in cases where the catalysis is not used up but remains active) and/or important features of the chemical reaction tower.

The presence of the used up catalyst material, catalyst covered in waste materials, and/or the waste materials themselves may impair the future function of the chemical reaction tower. For example, presence of these materials in the chemical reaction tower may reduce the conversion efficiency (desirable products produced versus quantity of input products) of the chemical reactions, increase a reaction time, may render the chemical reactions more difficult to control (or prevent them from occurring), or may otherwise reduce the ability of the chemical reaction tower to perform its function.

In general, embodiments disclosed herein relate to systems, methods, apparatuses, and devices for removing undesired materials from industrial environments (or other environments), for example. Specifically, embodiments disclosed herein provide for the removal of undesired materials from an industrial environments using high-pressure vacuum. Removing undesired materials from industrial environments using high-pressure vacuums may provide for time efficient removal of the undesired materials while preventing contamination of nearby areas with the removed undesired materials.

Figure 2:
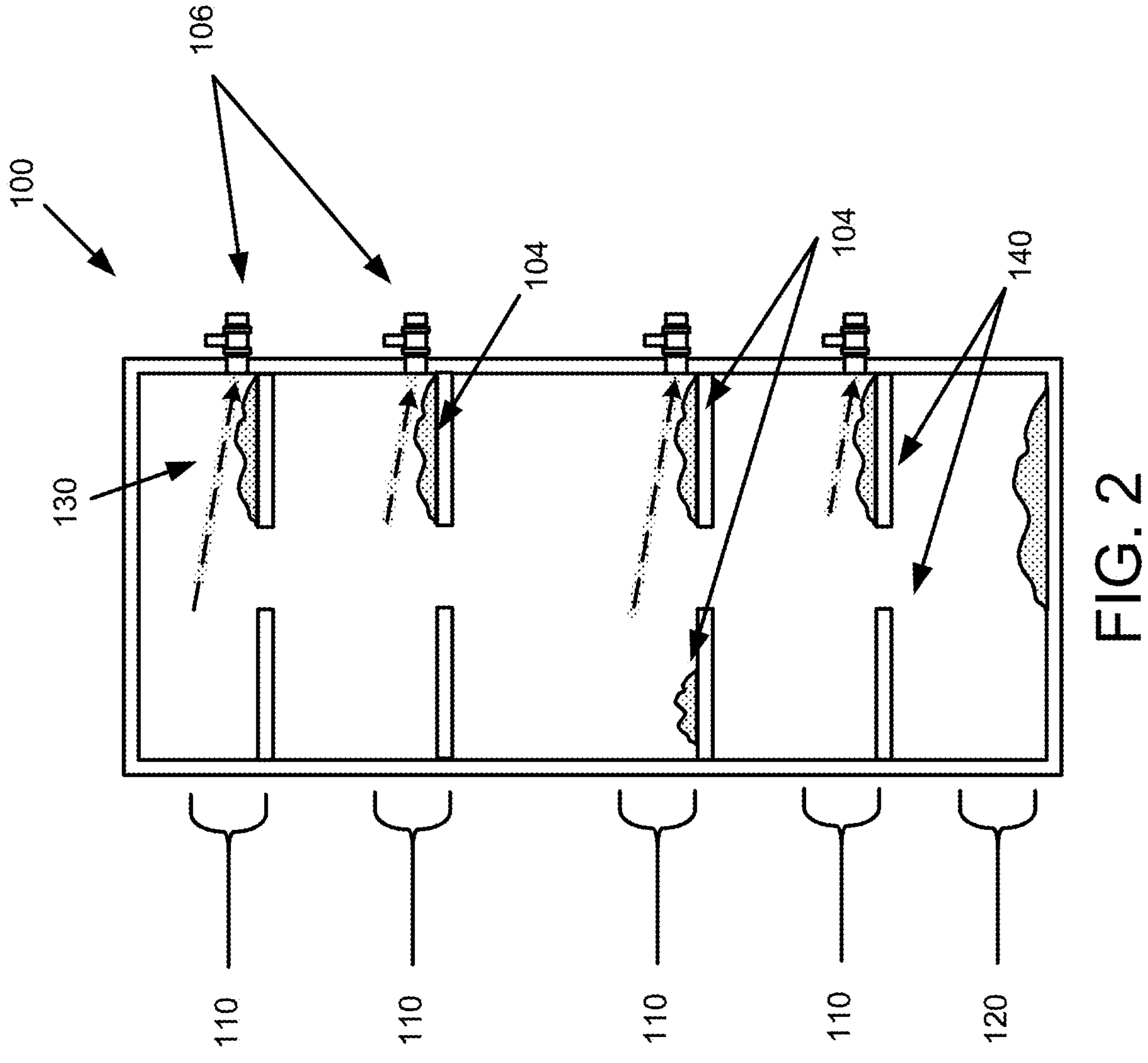
FIGS. 2-3 are simplified diagrams of removal of undesired material from a reaction vessel using a material removal system, according to one or more embodiments of the disclosure.
Figure 3:
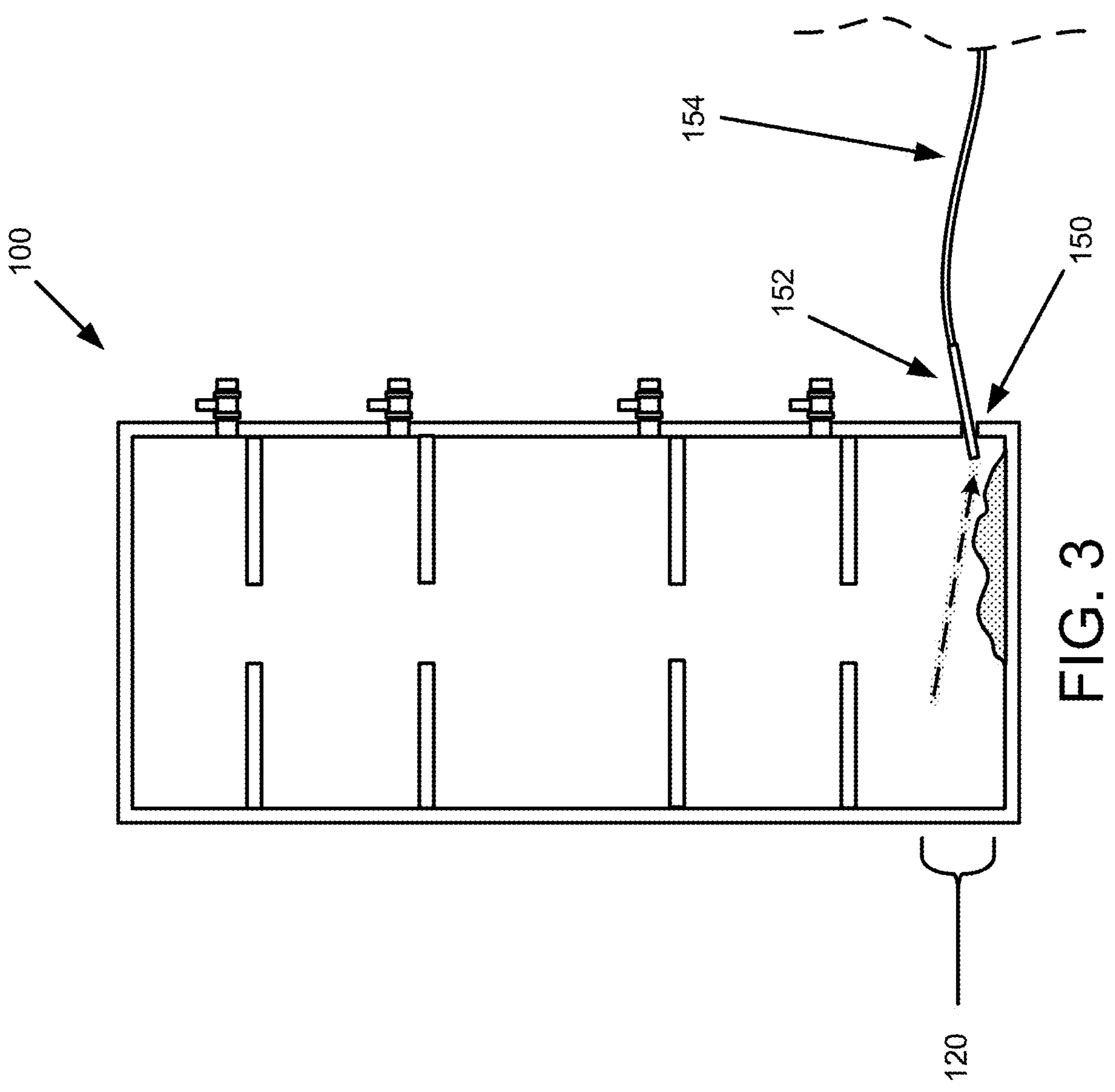
Figure 4:
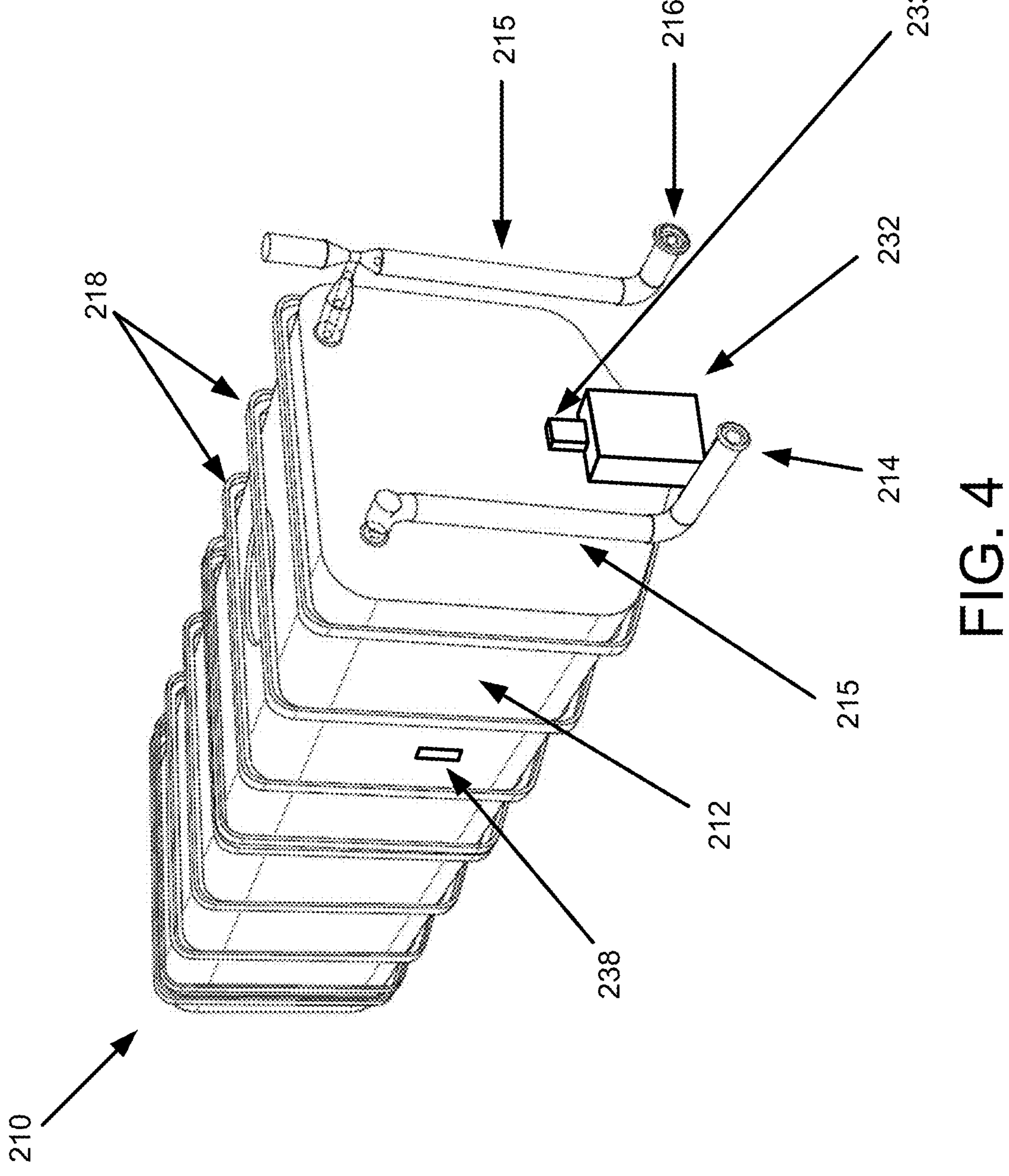
FIG. 4 is a diagram of a material collector including a vacuum box of a material removal system, according to one or more embodiments of the disclosure.
Figure 5:
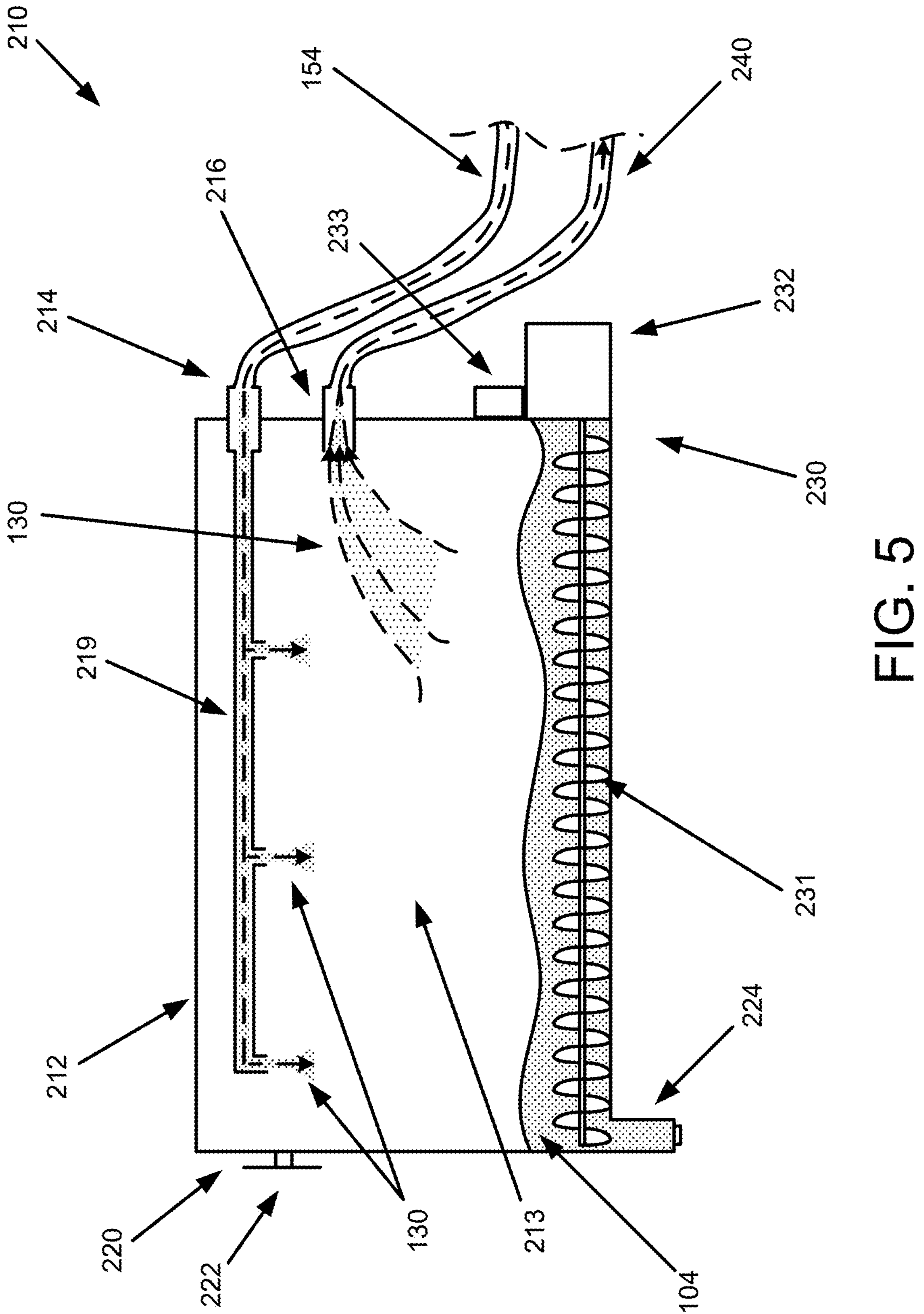
FIG. 5 is a side-elevational diagram of an interior of a material collector including a vacuum box of a material removal system, according to one or more embodiments of the disclosure.
Figure 6:
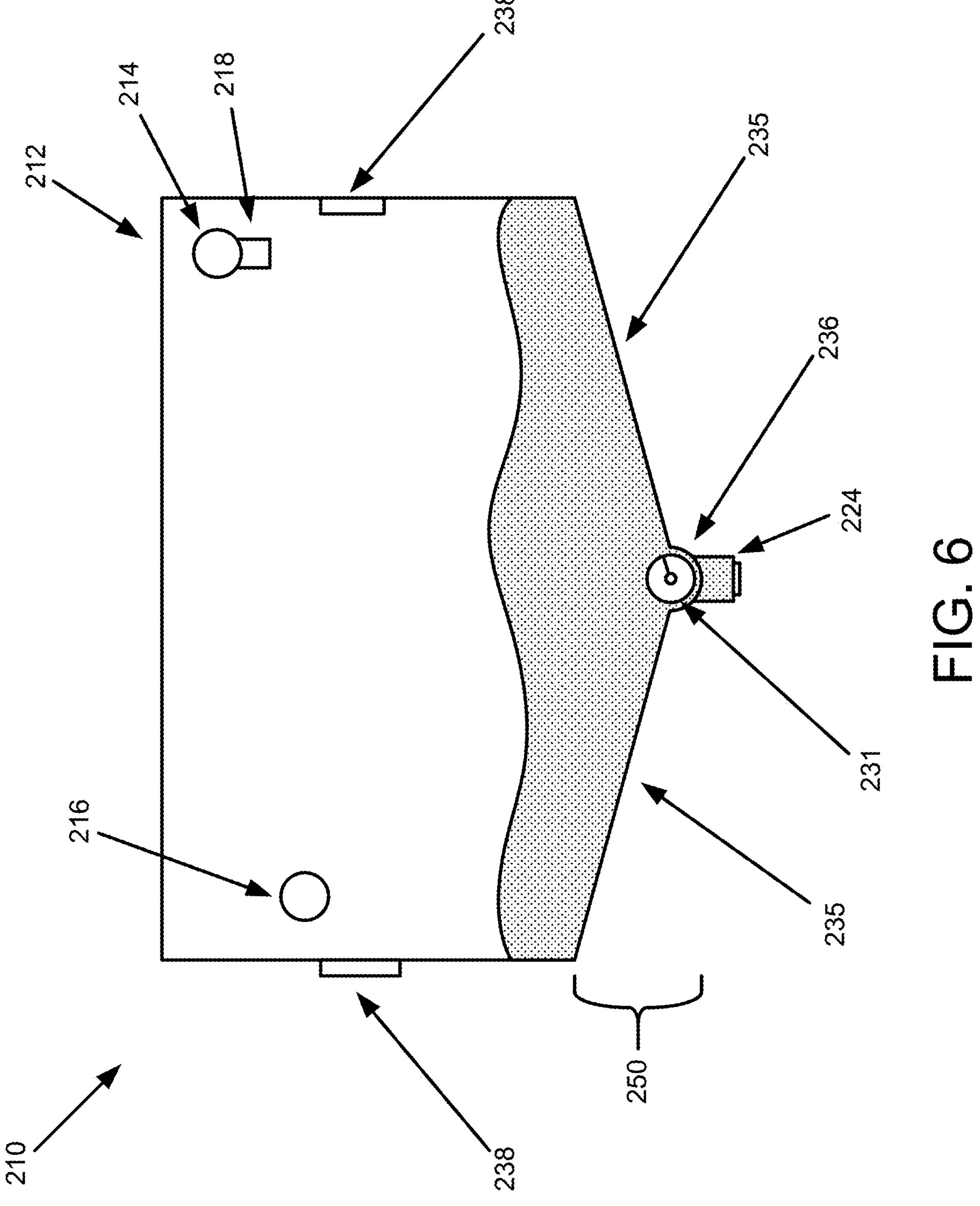
FIG. 6 is an end elevational diagram of a material collector including a vacuum box of a material removal system, according to one or more embodiments of the disclosure.
Figure 7:
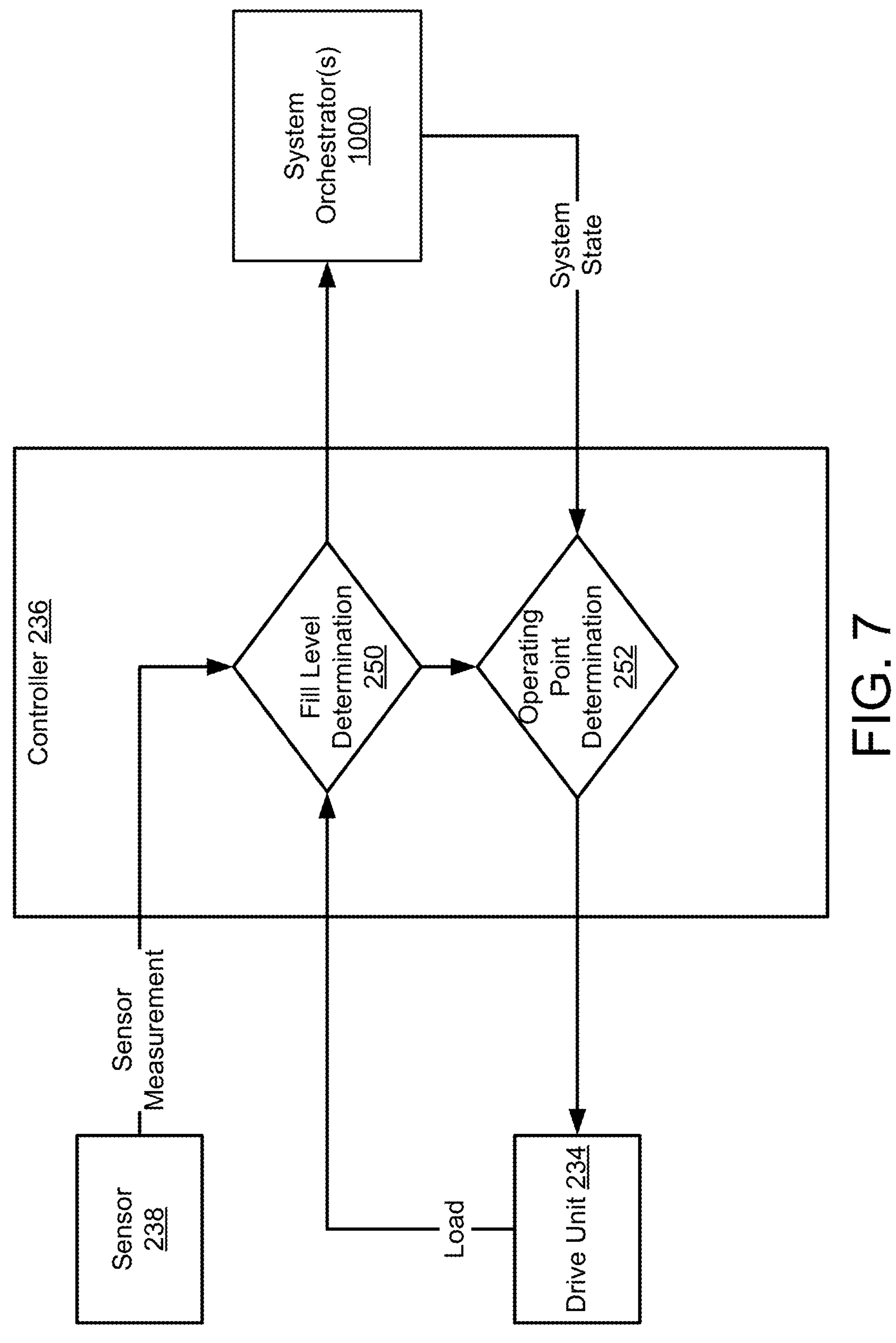
FIG. 7 is a block diagram of an operating point determination for a material collector of a material removal system, according to one or more embodiments of the disclosure.
Figures 8, 9:
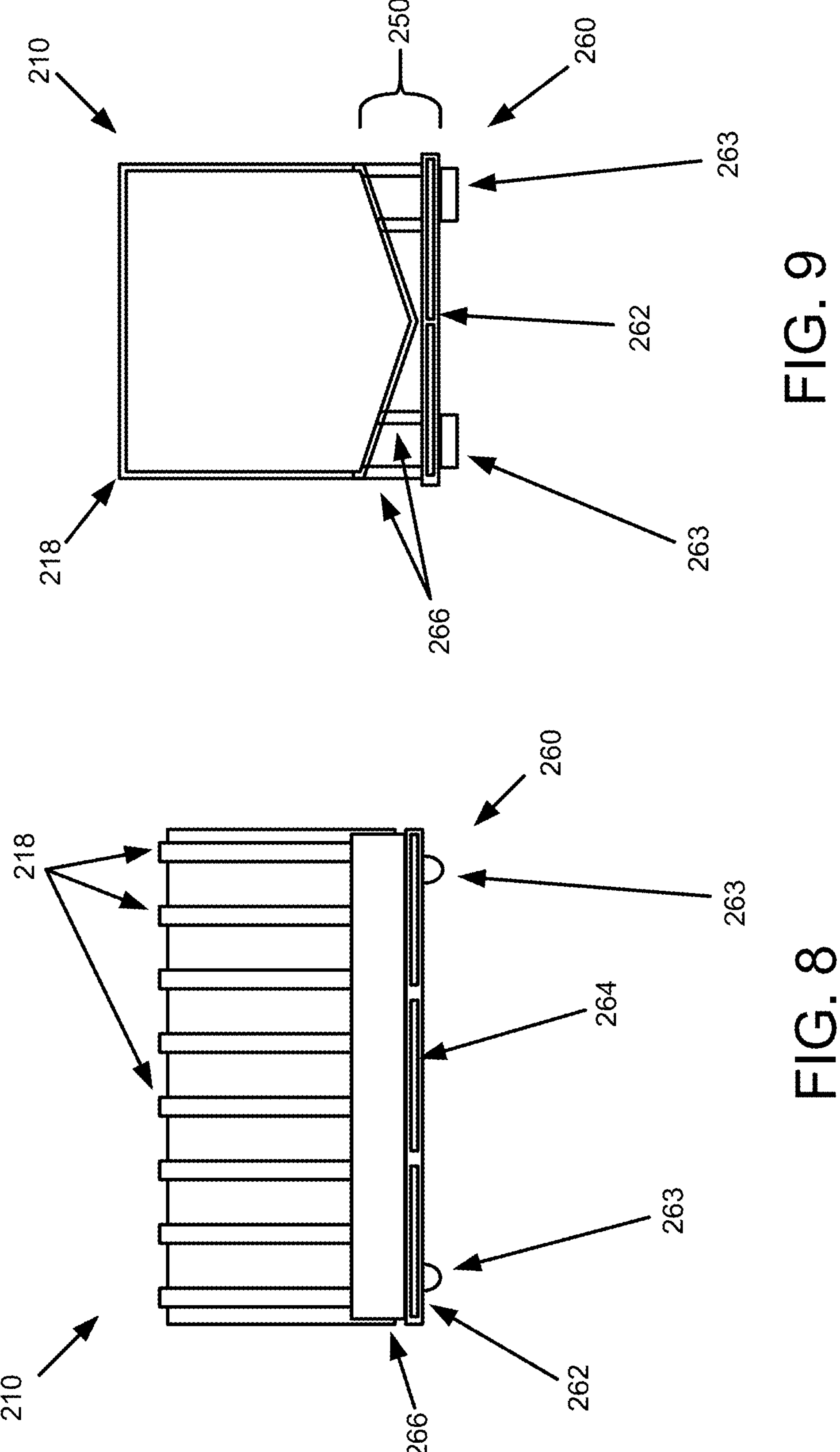
FIGS. 8-9 are diagrams of carriers for transportation and orientation of material collectors of a material removal system, according to one or more embodiments of the disclosure.

As illustrated in FIGS. 1-3, Applicant recognized that industrial settings frequently include reactions vessel 100 used to generate desirable products via chemical reaction. Reaction vessel 100 may generate the desirable products by reacting multiple materials with each other. Once the desirable product is generated, reaction vessel 100 may be contaminated with undesired material 104.

Applicant recognized that undesired material 104 may be distributed throughout reaction vessel 100, that reaction vessel 100 may be tall, and that reaction vessel 100 may include limited access to where the undesired material 104 is located. For example, reaction vessel 100 may include any number of zones 110, 120 which may be contaminated with undesired material 104. The zones 110, 120 may be located in different regions of reaction vessel 100, may be separated by floors, levels, or support members 140 (e.g., platforms, beams, etc.) of reaction vessel 100, and may be difficult to physically access. In some cases, different zones of reaction vessel 100 may only be reachable by way of a ladder or other types of structures that may make physical access to the zones challenging.

As illustrated in FIGS. 1-3, a system in accordance with one or more embodiments may provide for the removal of undesired materials from reaction vessel 100 using high-pressure vacuum. The use of high-pressure vacuum may enable undesired material to be removed with limited physical access to the zones 110, 120 where the undesired material 104 is present. The use of high-pressure vacuum may enable parallel removal of undesired material 104 from multiple locations within reaction vessel 100.

For example, as seen to FIG. 2, reaction vessel ports 106 may enable limited access to the zones 110, 120 from outside of reaction vessel 100. The reaction vessel ports 106 may be limited in physical size so that a person may not be able to enter reaction vessel 100 through the ports, nor would conventional tools such as shovels or material transportation carts be able to move through the reaction vessel ports 106. To remove undesired material 104 efficiently, in one embodiment, high-pressure vacuum is applied to the external portion of reaction vessel ports 106. The high-pressure vacuum may generate suction directed out of the interior of reaction vessel 100 through reaction vessel ports 106. The suction may generate a vacuum induced fluid flow 130 with some of undesired material 104 entrained in the vacuum induced fluid flow 130.

Based on the distribution of undesired material 104, various tools may be affixed to reaction vessel ports 106 to control the application of suction to the undesired material 104. In one embodiment, hoses or other fluid flow directing devices are pneumatically attached to one or more of reaction vessel ports 106 inside of reaction vessel 100. The hoses may be used to position the vacuum induced fluid flow 130 so as to entrain desired quantities of the undesired material 104 in the vacuum induced fluid flow 130. The exterior portions of reaction vessel ports 106 may be connected to other components of the system, discussed in greater detail below, to apply the high-pressure vacuum and process the vacuum induced fluid flow 130 entrained with undesired material 104.

In some scenarios, some of the zones of reaction vessel 100 may not be reachable via reaction vessel ports 106. However, undesired material may be present in these zones. In one embodiment, as seen by example in FIG. 3, reaction vessel 100 includes sealed zone 120. Sealed zone 120 may not be readily accessible via reaction vessel ports 106 or other structures through which fluid flow paths may be established to outside of reaction vessel 100. To remove undesired material 104 from sealed zone 120, in one embodiment, a temporary access 150 is formed. Temporary access 150 may include a hole (or other feature for accessing the interior of reaction vessel 100 that is not easily scalable) drilled or otherwise made through reaction vessel 100 to facilitate access of sealed zone 120 from outside of reaction vessel 100. Temporary access 150 may facilitate access to sealed zone 120 from outside of reaction vessel 100.

To remove undesired material 104 from sealed zone 120, in one embodiment, access device 152 is inserted into the interior of reaction vessel 100 through temporary access 150. Access device 152 may be a physical structure for forming a fluid flow path from the interior of reaction vessel 100 to outside of reaction vessel 100. Access device 152 may include, for example, tubular members, hoses, manifolds, and/or other structures. A portion of access device 152 outside of reaction vessel 100 may be attached to hose 154 to form a fluid flow path from sealed zone 120 to other components of the system. When attached to other components of the system, access device 152 may apply suction proximate to undesired material 104 in sealed zone 120 to entrain it in a fluid flow (e.g., a vacuum induced fluid flow 150) into access device 152. The fluid flow into access device 152 may follow the fluid flow path to other disclosed embodiments of the system thereby removing undesired material 104 from sealed zone 120.

Applicant also recognized that the undesired materials may present a contamination threat to areas nearby reaction vessels. The undesired materials may include significant quantities of small particles that are difficult to control. A system in accordance with one or more embodiments may provide for the removal of undesired materials with a partially sealed system. The partially sealed system may transfer the undesired materials from reaction vessel 100 using a sealed fluid flow path with a limited number of exits. The fluid flow path may be filtered prior to the exits from the fluid flow path to limit or prevent the discharge of particulate forms of the undesired materials from the disclosed embodiments of the system.

Applicant further recognized that the undesired materials may be heterogeneous in nature and may include materials that range in size from particulates to one or more inches in size. The undesirable materials may also be in various states of matter. Some portions of the undesirable materials may be solid while other portions may be liquid. Conventional approaches to material removal may be unable to effectively process heterogeneous undesired materials. A system in accordance with one or more embodiments may provide for the removal of heterogeneous undesired materials with a high-pressure vacuum. The high-pressure vacuum may be capable of moving a broad range of materials in various states of matter. Further, the use of vacuum for material transfer purposes may provide for containment of removed undesired materials thereby limiting or preventing contamination of ambient environments with the removed undesired materials.

To remove the undesired materials, a material removal system may be deployed to an industrial site. FIG. 1 shows an embodiment of a deployed material removal system for removing undesired materials from an industrial environment. While described with respect to an industrial environment, the embodiment illustrated in FIG. 1 may be broadly usable to remove undesired materials from other environments including, for example, commercial, residential, and natural environments.

The system shown in FIG. 1 may remove materials from the industrial environment with high-pressure vacuum. The high-pressure vacuum may move the undesired material along a fluid flow path to separate it from the industrial environment. Once separated from the industrial environment, the undesired material may be transported to a disposal site. The material removal system may include multiple components that cooperate to separate the undesired material. In one embodiment, the material removal system includes material collector 200, vacuum source 300, fluid flow attenuating filter 400, and mobile fluid supply 500. Material collector 200, vacuum source 300, and fluid flow attenuating filter 400 may be arranged to form a fluid flow path beginning at reaction vessel 100 and terminating at fluid flow attenuating filter 400. The fluid flow path may be used to remove undesired material from reaction vessel 100 while limiting contamination of the ambient environment. For example, vacuum source 300 may generate a vacuum in the fluid flow path thereby generating a fluid flow along the fluid flow path. The fluid flow may be used to apply suction proximate to the undesired material 104 in reaction vessel 100 to draw the undesired material 104 in to the fluid flow path. The fluid flow in the fluid flow path may cause the undesired material 104 to flow out of reaction vessel 100 and into material collector 200 thereby separating the undesired material from the industrial environment. A majority of the undesired material may be trapped in material collector 200. A minority of the undesired material collector may flow out of material collector 200, through vacuum source 300, and into fluid flow attenuating filter 400. Fluid flow attenuating filter 400 may remove (or reduce) the minority of the undesired material in the fluid flow prior to exhaustion of the fluid flow into an ambient environment.

To form the fluid flow path, material collector 200 may be pneumatically connected to reaction vessel 100. In an embodiment, the pneumatic connection between reaction vessel 100 is formed using manifold 700. Manifold 700 may be connected to multiple ports 106 of reaction vessel 100 thereby pneumatically connecting material collector 200 to multiple locations of reaction vessel 100. Specifically, the interior of material collector 200 may be pneumatically connected to reaction vessel 100. Pneumatically connecting material collector 200 to multiple locations of reaction vessel 100 may enable undesired material to be removed from each of the locations (e.g., simultaneously, sequentially, etc.).

Due to the height of reaction vessel 100 and the distribution of zones along this height, it may be challenging to access the zones of reaction vessel 100. In one embodiment, manifold 700 includes rigid piping. The rigid piping may allow for the manifold 700 to be at least partially self-supporting to facilitate pneumatic connection of manifold 700 to multiple zones of reaction vessel 100. Manifold 700 may pneumatically connect material collector 200 to any number of locations on reaction vessel 100 that are difficult to reach. The rigid piping may be of low weight and easily attachable to a wide variety of structures removing the need for significant person-access to the difficult to reach locations on reaction vessel 100 for undesired material removal purposes.

Manifold 700 may be pneumatically connected to material collector 200 by hose 600. Hose 600 may be flexible to allow for pneumatic connection of manifold 700 and material collector 200 in various orientations and positions with respect to one another. Hose 600 may be sized so as not to limit the flow of fluid along the fluid flow path.

In some cases, the undesired material in reaction vessel 100 presents clogging hazards. For example, the undesired material may include large components that may tend to wedge or otherwise catch on structures through which the undesired materials are drawn. In one embodiment, hose 600 is, at least in part, transparent, translucent, or otherwise capable of providing information regarding the contents disposed within hose 600 usable to diagnose whether hose 600 is clogging. As noted above, the undesired material may be heterogeneous and include large components that may tend to clog narrow passages (e.g., such as constrictions in hose 600). To reduce the risk of clogging, in one embodiment, hose 600 includes, at least in part, a smooth inner surface. When undesired material flows through hose 600, the smooth inner surface may reduce the clogging susceptibility of hose 600.

Figure 43:
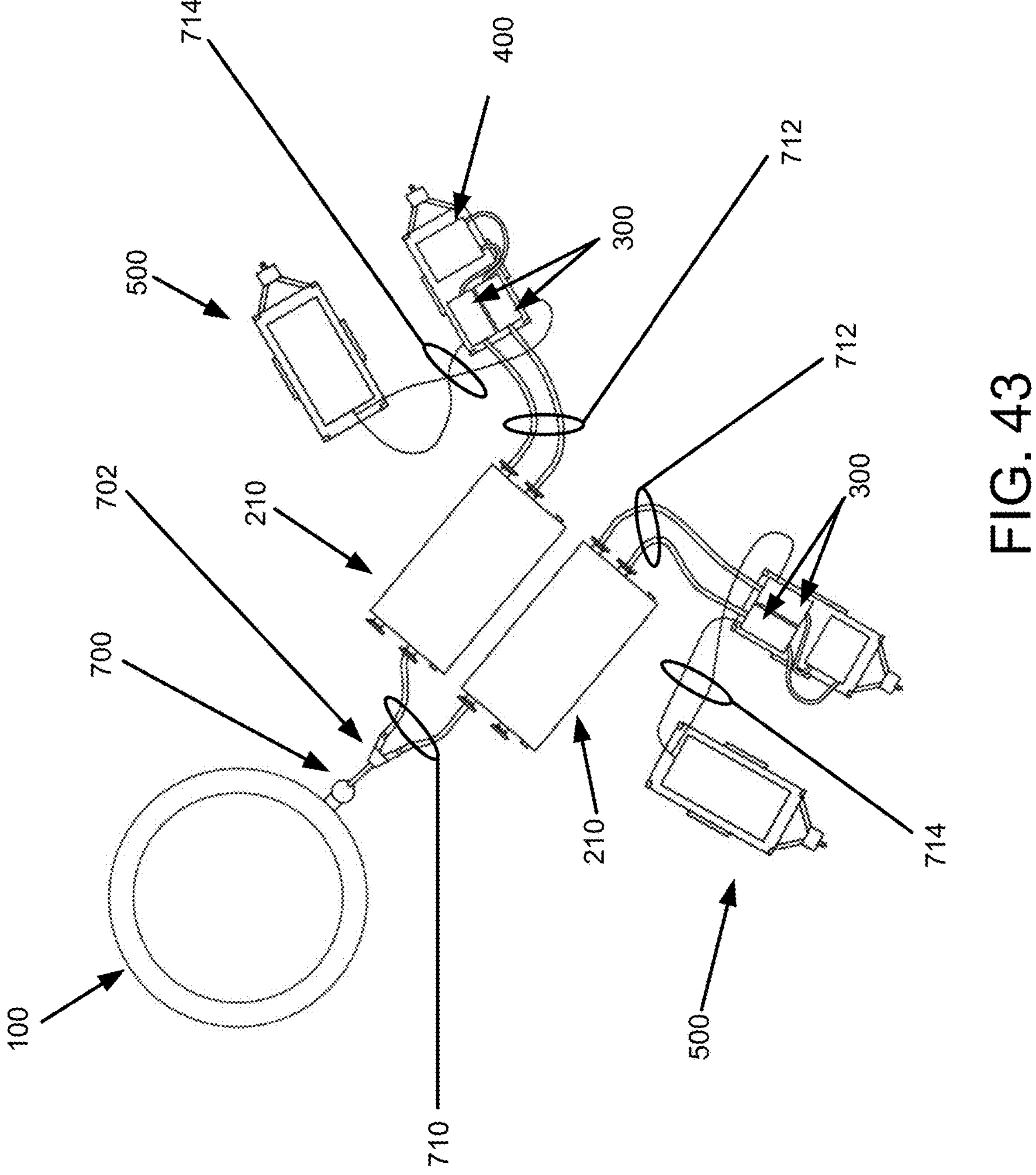
FIG. 43 is a diagram of topology of components of a material removal system scalable to meet requirements of an industrial environment, according to one or more embodiments of the disclosure.

While manifold 700 is illustrated in FIG. 1 as only being pneumatically connected to one material collector, manifold 700 may be connected to multiple material collectors without departing from embodiments disclosed herein. The multiple material collectors may be connected in parallel to, for example, scale the undesired material capacity of the material removal system, increase a pressure of the high-pressure vacuum, etc. Refer to FIG. 43 and its corresponding discussion, below, for additional information regarding connecting multiple material collectors to manifold 700.

Undesired material may flow into material collector 200 after flowing through manifold 200. Generally, the undesired material may be trapped in material collector 200. However, some of the undesired material may continue to flow out of material collector 200. In one embodiment, material collector 200 removes a majority of undesired material 104 from fluid flow that it receives. To do so, material collector 200 may receive all, or a portion, of the fluid flow out of reaction vessel 100. Material collector 200 may include one or more features that tend to trap the majority of undesired material 104 in the fluid flow that it receives inside of material collector 200. Once trapped, the majority of undesired material 104 may be retained in material collector 200 for future disposal.

Material collector 200 may be implemented in a variety of different configurations. FIGS. 4-9 show one embodiment of material collector 200 including vacuum box 210. Vacuum box 210 may be a physical structure through which the fluid flow with undesired material 104 may traverse along the fluid flow path.

Vacuum box 210 may include housing 212. Housing 212 may include any number of walls or other physical structures that surround interior 213. Generally, interior 213 may be substantially sealed off from the ambient environment by housing 212 so that a vacuum may be applied to interior 213 and a fluid flow path through interior 213 may be established.

To facilitate the flow of the fluid into and out of interior 213, a number of ports may be positioned on housing 212. Each of the ports may (i) facilitate access to interior 213, (ii) connection of hoses or other structures to place interior 213 in a fluid flow path with other components of a material removal system, and/or (iii) removal of portions of undesired material from interior 213. The ports may include inlet port 214, vacuum port 216, and discharge port 224.

Inlet port 214 may be positioned on housing 212 and allow for access to interior 213 from outside of housing 212. Inlet port 214 may include a hole or other structure through housing 212 that allow for interior 213 to be pneumatically connected to other components. In one embodiment, inlet port 214 is pneumatically connected to manifold 700, reaction vessel ports 106, and/or access device 152 to pneumatically connect interior 213 to zones 110, 120 of reaction vessel 100. When connected to these ports, fluid flow including undesired material 104 from reaction vessel 100 may flow into interior 213 through inlet port 214.

Inlet port 214 may include tubular members 215 and/or other fluid flow components to form a fluid flow path from interior 213 to various locations outside of housing 212. In one embodiment, inlet port 214 includes tubular members 215 to connect a location where inlet port 214 passes through housing 212 to a location that is more convenient for persons to make pneumatic connections between inlet port 214 and other components. For example, with reference to FIG. 4, inlet port 214 may extend through housing 212 towards a top of housing 212 and include tubular members 215 to enable inlet port 214 to be accessible to persons towards lower portion 250.

Applicant recognized that vacuum box 210 is only able to store a limited quantity of material and that the limited quantity may depend on how the material is distributed in interior 213. For example, if material is preferentially deposited in interior 213 near locations where fluid flow may exit the interior, then significant quantities of the deposited material in the interior 213 may tend to be drawn out of the exits rather than being retained in vacuum box 210. Further, reaction vessel 100 (or other structures in which undesired material 104 may be disposed) may include more undesired material than vacuum box 210 is able to hold.

A vacuum box 210 in accordance with one or more embodiments may provide for the distribution of material within interior 213. Distributing the material in interior 213 may increase the amount of material that may be disposed in the interior without increasing the rate at which the material exits vacuum box 210 due to fluid flow within vacuum box 210. Consequently, vacuum box 210 may have an increased effective material capacity (e.g., the maximum material capacity at which the quantity of material exiting a structure passes a threshold level) when compared to other structures that do not distribute material across their interiors. As will be discussed in greater detail below, the increased effective material capacity of vacuum box 210 may reduce the rate at which vacuum box 210 may need to be replaced for being full due to the use of high-pressure vacuum for material removal purposes. Additionally, a vacuum box in accordance with embodiments disclosed herein may provide for time efficient replaced in a material removal system so as to enable the material removal system to substantially continuously remove undesired material 104 using multiple vacuum boxes.

To facilitate distribution of undesired material across interior 213, in one embodiment, vacuum box 210 includes extension 219. Extension 219 may be positioned in interior 213 and connected to the portion of inlet port 214 that passes through housing 212 so as to position the fluid flow inside interior 213. Extension 219 may include multiple exits into interior 213 to direct vacuum induced fluid flow 130 from reaction vessel 100 traveling along the fluid flow path to multiple locations within interior 213. The multiple locations may be distributed along a length of vacuum box 210 so that the undesired material 104 entrained in vacuum induced fluid flow 130 is distributed across interior 213 (e.g., rather than being generally deposited at a single location). The exits to extension 219 may be positioned to direct the undesired material in vacuum induced fluid flow 130 toward sloped floor 235. In part, the positioning of the exits of extension 219 may trap the majority of undesired material 104 on sloped floor 235. For example, by being directed toward sloped floor 235, undesired material entrained 104 in vacuum induced fluid flow 130 may fall below vacuum port 216 rendering undesired material 104 less likely to exit interior 213 due to gravity.

To enable high-pressure vacuum to be applied to interior 213, vacuum port 216 may be positioned on housing 212 and allow for access to interior 213 from outside of housing 212. Vacuum port 216 may include a hole or other structure which pass through housing 212 and allow for interior 213 to be pneumatically connected to other components. In one embodiment, vacuum port 216 is pneumatically connected to vacuum source 300 to enable vacuum source 300 to apply a vacuum to interior 213. Vacuum port 216 may include tubular members 215 and/or other fluid flow components to form a fluid flow path from interior 213 to various locations outside of housing 212. In one embodiment, vacuum port 216 includes tubular members 215 to connect a location where vacuum port 216 passes through housing 212 to a location that is more convenient for persons to make pneumatic connections between vacuum port 216 and other components. For example, with reference to FIG. 4, vacuum port 216 may extend through housing 212 towards a top of housing 212 and includes tubular members 215 to enable vacuum port 216 to be accessible to persons towards lower portion 250.

As discussed above, interior 213 may be placed along a fluid flow path through which undesired material flows. In one embodiment, inlet port 214 and vacuum port 216 are positioned with respect to interior 213 to establish a fluid flow path into and out of interior 213. The fluid flow path may cause fluid flow directed into inlet port 214 to flow through interior 213 and out of vacuum port 216. The fluid flow path through interior 213 may be placed along the fluid flow path through the material removal system. Additionally, the aforementioned fluid flow path may be used in combination with other fluid flow paths, parallel to one another, to enhance the rate at which undesired material may be removed, to enhance a strength of the applied high-pressure vacuum to facilitate removal of challenging materials (e.g., more viscous materials, materials including significant solid content, etc.), or for other purposes. Refer to FIG. 43 and the corresponding discussion for additional details regarding the use of multiple fluid flow paths to remove undesired materials.

To further improve the material capacity of vacuum box 210, vacuum box 210 may move undesired material in interior 213 to reduce the likelihood of it flowing out of vacuum port 216. In one embodiment, vacuum box 210 includes material mover 230. Material mover 230 may move undesired material 104 within interior 213. Moving undesired material 104 in interior 213 may further distribute undesired material 104 in the interior thereby further increasing the effective undesired material capacity of vacuum box 210. Material mover 230 may apply force to various portions of undesired material 104 in interior 213 to change their locations within interior 213. Material mover 230 may include auger 231 and drive unit 232.

Auger 231 may be a physical structure positioned in interior 213 to distribute the undesired material within interior 213. Auger 231 may include a drill or other structure for applying force to undesired material 104 in interior 213. For example, when auger 231 rotates, a drill of auger 231 may apply force to undesired material 104 to move it within interior 213. The movement caused by auger 231 may more evenly distribute undesired material 104 within interior to reduce the likelihood of the material flowing out of exhaust port 216.

Auger 231 may be positioned within interior 213 to improve the likelihood that material will interact with it when it rotates. In one embodiment, auger 231 is positioned in a lower portion 250 of vacuum box 210. Lower portion 250 may include sloped floor 235 that tends to cause undesired material on sloped floor 235 to move towards trough 236 in sloped floor 235 by way of gravitational force. Auger 231 may be disposed in trough 236. When disposed in trough 236 and rotated, auger 231 may tend to move undesired material along the length of vacuum box 210 (e.g., extending from left to right in FIG. 5) and distribute the undesired material across the width of vacuum box 210 (e.g., extending from left to right in FIG. 6).

Rotation of auger 231 may cause material to move. However, if the material is unable to move freely when auger 231 interacts with it, the material may place a load on auger 231 or prevent auger 231 from rotating (e.g., by binding it). In one embodiment, auger 231 is positioned by discharge port 224. Discharge port 224 may be a port on housing 212 to allow access to interior 213 while discharge port 224 is opened. Discharge port 224 may be usable to reduce the likelihood of auger 231 binding. Undesired material 104 moved by auger 231 may be, in part, directed out interior 213 through discharge port 224 to reduce the likelihood of auger 231 binding. Discharge port 224 may be opened while auger 231 is driven by drive unit 232 to enable undesired material 104 to be discharged from interior 213. Discharging undesired material through discharge port 224 may reduce the resistance of undesired material 104 to movement by auger 231.

To rotate auger 231, force may be applied to it. In one embodiment, auger 231 is coupled to drive unit 232. Drive unit 232 may include a motor or other type of actuator usable to rotate auger 231 by application of force. In one embodiment, drive unit 232 includes a hydraulic motor driven using electric power. The quantity of electric power required to rotate auger 231 by drive unit 232 may be directly related to the quantity of undesired material in interior 213. For example, as the quantity of undesired material in interior 213 increases, it may take progressively larger amounts of electric power for drive unit 232 to rotate auger 231. Consequently, the quantity of electrical power used by drive unit 232 may be used to infer the load on auger 231 (and/or the quantity of undesired material in interior 213.

Drive unit 232 may be position inside of interior 213 our outside of interior 213. In one embodiment, drive unit 232 is positioned outside of interior 213 to reduce the likelihood of material in interior 213 from damaging or otherwise impacting the operation of drive unit 232. For example, drive unit 232 may be positioned outside of housing 212 and coupled to auger 231 through housing 212 (e.g., using a drive shaft through housing 212). Drive unit 232 may be positioned in other locations (e.g., inside of housing 212) without departing from embodiments disclosed herein.

To manage the operation of auger 231, in one embodiment, drive unit 232 is operably connected to controller 233 (which may be coupled to system level controllers, discussed below). Controller 233 may direct, instruct, or otherwise orchestrate operation of drive unit 232. Controller 233 may include computing hardware (e.g., processors, memory, storage devices, communication devices, other types of hardware devices including circuitry, etc.) and/or computing instructions (e.g., computer code) that when executed by the computing hardware cause the controller 233 to provide its functionality. In one embodiment, controller 233 utilizes its computing hardware to set the operating point of drive unit 232.

To set the operating point of drive unit 232, in one embodiment, controller 233 receives information from drive unit 232 regarding a load placed on drive unit 232 to drive auger 231. For example, controller 233 may monitor the quantity of electric power used by drive unit 232 to drive auger 231 over time. To do so, drive unit 232 may report its electrical power consumption to controller 233 over time. Controller 233 may include a data structure (e.g., table, list, function, etc. stored in the computer hardware) usable to estimate the fill level of vacuum box 210 based on the electric power consumption of drive unit 232. The data structure may include a lookup table that provides the fill level of vacuum box 210 as a function of its electrical power consumption.

To set the operating point of drive unit 232, in one embodiment, controller 233 obtains information from one or more sensors 238. Sensors 238 may be positioned at various locations on housing 212 (and/or other locations) and may be operably connected to controller 233. Sensors 238 may be capable of measuring one or more physical properties, providing information regarding the physical properties to controller 233, and/or displaying information regarding the physical properties (or quantities inferred from the measured physical properties such as fill level of vacuum box 210). Controller 233 may include a data structure (e.g., table, list, function, etc.) usable to estimate the fill level of vacuum box 210 based on the physical properties measured with sensors 238. The data structure may include a lookup table that provides the fill level of vacuum box 210 as a function of the measured physical properties. The measured physical properties may include, for example, temperatures, depths/heights of material in interior 213, opacities of materials, quantities of light reflected by or transmitted through materials, etc.

To measure temperatures, in one embodiment, vacuum box 210 includes sensors 238 that include thermocouples or other devices for measuring temperature. The thermocouples of sensors 238 may be positioned to measure the temperature of housing 212, interior 213, or other components of vacuum box 210. In one embodiment, the data structure provides the fill level of vacuum box 210 as a function of the temperature of vacuum box 210.

To measure depths or heights of material, in one embodiment, vacuum box 210 includes sensors 238 that include depth sensors (e.g., floats, interferometers, etc.). The depth sensors of sensors 238 may be positioned in interior 213, on housing 212, or in other locations to measure the heights of undesired material in vacuum box 210. In one embodiment, the data structure provides the fill level of vacuum box 210 as a function of the heights of undesired material 104 in vacuum box 210.

To measure available light, in one embodiment, vacuum box 210 includes sensors 238 that include photo-sensors (e.g., charge-coupled devices). The photo-sensors may be positioned to measure the intensity of light reflected by or transmitted by undesired material in interior 213 (or other visual indicators) so as to infer the fill level of vacuum box 210. In one embodiment, the data structure provides the fill level of vacuum box 210 as a function of the measured intensity light of undesired material 104 in vacuum box 210.

To determine the fil level of vacuum box 210, in one embodiment, controller 233 receives the measurements from sensors 238 using one or more wireless or wired connections (not shown). Controller 233 may provide the measurements and/or the load on the drive unit 232 to system level controllers (e.g., system orchestrator(s) 1000) using the one or more wireless or wired connections (not shown). Controller 233 may use the measurements to determine the fill level of vacuum box 210 using the data structures. Based on the determined fill level and/or a state of the system (e.g., provided by system orchestrator(s) 1000), controller 233 determines an operating point for drive unit 232. Drive unit 232 may consume electric power based on the operating point, thereby allowing controller 233 to control the rate at which undesired material 104 is moved within vacuum box 210.

When in industrial environment and/or generally used, vacuum box 210 may be subject to forces applied to it by the environment. To manage these forces, in one embodiment, vacuum box 210 includes structural housing support members 218 positioned on housing 212. Structural housing support members 218 may be positioned along the length of housing 212 and may circumscribe multiple walls of housing 212. In one embodiment, structural housing support members 218 circumscribe three or more walls of housing 212 (e.g., at least a top wall and two side walls). Structural housing support members 218 may have a thickness that extends away from housing 212 so as to reduce the likelihood of force being directly transmitted to housing 212. Structural housing support members 218 may enable housing 212 to be efficiently repositioned by distributing load for moving vacuum box 210 across housing 212. Structural housing support members 218 may also increase the rigidity of housing 212 (e.g., by enhancing the cross section of housing 212 where structural housing support members 218 are connected to housing) thereby allowing vacuum box 210 to be moved with reduce risk of damage (e.g., due to forces applied to vacuum box 210 to move it).

As discussed above, vacuum box 210 may include one or more sloped floors or other features. These features may tend to make housing 212 tip to one side or another if housing structural housing support members 218 are placed directly onto a surface. To orient vacuum box 210, in one embodiment, vacuum box 210 includes carrier 260. Housing 212 and/or structural housing support members 218 may be positioned on carrier 260. Carrier 260 may be a structure to maintain an orientation of vacuum box 210. Carrier 260 may include base plate 262 usable to apply force to vacuum box 210 to move vacuum box 210 in a manner that is unlikely to damage vacuum box 210. Lifting member receivers 264 may be positioned on base plate 262 and extend into base plate 262 to allow forks or other structures of heavy equipment to efficiently lift or otherwise apply force to base plate 262. Forklifts or other types of machinery (e.g., cranes) may be capable of lifting carrier 260 (or other portions of vacuum box 210) and vacuum box 210 using lifting member receivers 264 (or other features of vacuum box 210). Support members 266 may be positioned between base plate 262 and vacuum box 210 to distribute force from base plate 262 to vacuum box 210. As discussed above, vacuum box 210 may have a sloped floor which may tend to cause vacuum box to list to one side or another if positioned on a flat surface. Support members 266 may attach base plate 262 to vacuum box 210 so that when carrier 260 is positioned on a flat surface, vacuum box 210 is maintained in a predetermined orientation. Base plate 262 may include wheels 263 to facilitate movement of vacuum box 210. Wheels 263 may be positioned on base plate 262 to allow carrier 260 with vacuum box 210 to roll while being loaded, unloaded, and moved around an environment to which vacuum box 210 is deployed.

Once vacuum box 210 is filled with material, it may need to be unloaded before it may continue to be used. To facilitate rapid unloading of vacuum box 210, in one embodiment, vacuum box 210 includes door 220. Door 220 may substantially extend across one end of housing 212. Door 220 may enable interior 213 to be physically accessed. Door 220 may include handle 222 which allows for door 220 to be opened or closed. When opened, the end of housing 212 may generally be unsealed thereby allowing for large scale access to undesired material 104. When door 220 is closed, interior may generally be sealed. As will be discussed in greater detail below, door 220 may allow for efficient removal of undesired material 104 from interior 213 thereby allowing for a full vacuum box to be quickly emptied and returned to use for undesired material removal purposes. For example, to efficiently remove undesired material from interior 213, door 220 may be opened and vacuum box 210 may be oriented so that gravity force tends to cause material in interior 213 to exit housing 212 through door 220.

Returning to the discussion of material collector 200, as discussed above, material collector 200 may be implemented in a variety of manners. The implementation of material collector 200 may depend on the topology of the environment to which material collector 200 is deployed. FIGS. 24-28 show one embodiment of material collector 200 including pressure vessel 270. Pressure vessel 270 may be a physical structure through which the fluid flow with undesired material 104 may flow along the fluid flow path.

Generally, pressure vessel 270 may allow for undesired material to be separated from an environment by transferring the undesired material to pressure vessel 270 with high-pressure vacuum. To do so, pressure vessel 270 may include housing 272. Housing 272 may include any number of walls or other physical structures that surround interior 289. Generally, interior 289 may be substantially sealed off from the ambient environment by housing 272 so that a vacuum may be applied to interior 289 and a fluid flow path through interior 289 may be established. In one embodiment, interior 289 is pulled to various pressures (e.g., vacuum, ambient, elevated) to drive various fluids into or out of interior 289 through various ports. The ports may be connected to other components to pressurize interior 289 to desired pressures, to establish fluid flows through interior to transfer undesired materials 104 from reaction vessel 100 (or other locations) into interior 289, and/or to remove undesired materials 104 from interior 289.

To transfer undesired materials to interior 289, in one embodiment, pressure vessel 270 includes inlet port 274. Inlet port 274 may be positioned on housing 272 and allow for access to interior 289 from outside of housing 272. Inlet port 274 may include a hole or other structure through housing 272 that allows for interior 289 to be pneumatically connected to other components (e.g., to place interior 289 in a fluid flow path). In one embodiment, inlet port 274 is pneumatically connected to manifold 700, ports 106, and/or access device 152 to pneumatically connect interior 289 to zones of reaction vessel 100. When connected to these ports, fluid flow including undesired material 104 from reaction vessel 100 may flow into interior 289 through inlet port 274 while interior 289 is drawn to a high-pressure vacuum (e.g., with vacuum port 276).

To manage the flow of fluid through inlet port 274, in one embodiment, pressure vessel 270 includes inlet port control valve 275. Inlet port control valve 275 may be positioned to reversibly seal (partially or completely) inlet port 274. For example, inlet port control valve 275 may reversibly block a fluid flow path through inlet port 274 into interior 289. Inlet port control valve 275 may include a motor or other type of actuator usable to modulate the level of restriction through inlet port 274. In one embodiment, inlet port control valve 275 is operable using electrical power. Inlet port control valve 275 may be operably connected to control valves drive unit 286, discussed below.

To apply high-pressure vacuum to interior 289, in one embodiment, pressure vessel 270 includes vacuum port 276. Vacuum port 276 may be positioned on housing 272 and allow for access to interior 289 from outside of housing 272. Vacuum port 276 may include a hole or other structure through housing 272 that allows for interior 289 to be pneumatically connected to other components. In one embodiment, vacuum port 276 is pneumatically connected to vacuum source 300. Vacuum source 300 may apply vacuum to interior 289 via vacuum port 276 thereby establishing a fluid flow into inlet port 274, through interior 289, and out of vacuum port 276.

To manage the flow of fluid through vacuum port 276, in one embodiment, pressure vessel 270 includes vacuum port control valve 277. Vacuum port control valve 277 may be positioned to reversibly seal (partially or completely) vacuum port 276. For example, vacuum port control valve 277 may reversibly block (or limit) a fluid flow path through vacuum port 276 into interior 289. Vacuum port control valve 277 may include a motor or other type of actuator to modulate the flow of fluid through vacuum port 276. In one embodiment, vacuum port control valve 277 is operable using electrical power. Vacuum port control valve 277 may be operably connected to control valves drive unit 286, discussed below.

Once undesired material is transferred into interior 289, it may need to be removed before pressure vessel 270 may continue to be used. To remove undesired material from interior 289, in one embodiment, pressure vessel 270 includes discharge port 282. Discharge port 282 may be positioned on housing 272 to provide access to interior 289 from outside of housing 272. Discharge port 282 may include a hole or other structure through housing 272 that allows for interior 289 to be pneumatically connected to other components. In one embodiment, undesired material 104 in interior 289 is discharged out of interior 289 through discharge port 282. Discharge port 282 may generally be positioned on a bottom of housing 272 to be located where undesired material 104 in interior 289 is likely to move via gravity force.

To control the flow of fluid through discharge port 282, in one embodiment, pressure vessel 270 includes discharge port control valve 283. Discharge port control valve 283 may be positioned to reversibly seal (partially or completely) discharge port 282. For example, discharge port control valve 283 may reversibly block (or reduce) a fluid flow path through discharge port 282 into interior 289. Discharge port control valve 283 may include a motor or other type of actuator to module the flow of fluid through discharge port 282. In one embodiment, discharge port control valve 283 is operable using electrical power. Discharge port control valve 283 may be operably connected to control valves drive unit 286, discussed below.

To discharge material from interior 289, the high-pressure vacuum in interior 289 may be need to be removed. To remove the high-pressure vacuum, in one embodiment, pressure vessel 270 includes relief port 278. Relief port 278 may be positioned on housing 272 to provide access to interior 289 from outside of housing 272. Relief port 278 may include a hole or other structure through housing 272 that allows for interior 289 to be pneumatically connected to other components. In one embodiment, relief port 278 is pneumatically connected to an ambient environment around pressure vessel 270. When connected to the ambient environment, relief port 178 may enable high-pressure vacuum in interior 289 to be dissipated at desired rates (e.g., by allowing gasses from the ambient environment to enter interior 289 through relief port 278). The desired rates may reduce or prevent significant forces to be applied to components attached to any of the ports that provide access to interior 289. Consequently, the connected components (e.g., hoses, pipes, etc. used to for pneumatic connections) may be less likely to move to due the forces applied to them by the dissipation of the high-pressure vacuum in interior 289. When unsealed, pressure relief fluid flow 293 may flow from the ambient environment into interior 289 through relief port 278.

To manage the rate of flow through relief port 278, in one embodiment, pressure vessel 270 includes relief port control valve 279. Relief port control valve 279 may be positioned to reversibly seal (completely or partially) relief port 278. For example, relief port control valve 279 may reversibly block or limit a fluid flow path through relief port 278 into interior 289 to control the rate at which vacuum in interior 289 is dissipated using pressure relief fluid flow 293 from the ambient environment (thereby pressurizing interior 289 from the high-pressure vacuum pressure to ambient pressure). Relief port control valve 279 may include a motor or other type of actuator for reversibly sealing and/or controlling the rate of fluid flow through relief port 278. In one embodiment, relief port control valve 279 is operable using electrical power. Relief port control valve 279 may be operably connected to control valves drive unit 286, discussed below.

To manage, in part, the rate of discharge of undesired material 104 out of discharge port 282, interior 289 may be pressurized above ambient pressure. To pressurize interior 289, in one embodiment, pressure vessel 270 includes fluid supply port 280. Fluid supply port 280 may be positioned on housing 272 and allow for access to interior 289 from outside of housing 272. Fluid supply port 280 may include a hole or other structure through housing 272 that allows for interior 289 to be pneumatically connected to other components. In one embodiment, fluid supply port 280 is pneumatically connected to a source of compressed fluid. The source of compressed fluid may be mobile fluid supply 500. When connected to mobile fluid supply 500, pressurization fluid flow 295 from mobile fluid supply 500 to interior 289 through fluid supply port 280 may be induced to pressurize interior 289 to an elevated pressure while fluid supply port 280 is open.

To control the rate of pressurization fluid flow 295, in one embodiment, pressure vessel 270 includes fluid supply port control valve 281. Fluid supply port control valve 281 may be positioned to reversibly seal (completely or partially) fluid supply port 280. For example, fluid supply port control valve 281 may reversibly block or limit a fluid flow path through fluid supply port 280 into interior 289 so as to control pressurization of interior 289 to elevated pressures (e.g., above ambient) with pressurization fluid flow 295. Fluid supply port control valve 281 may include a motor or other type of actuator for reversibly sealing and/or controlling the rate of pressurization fluid flow 295 through fluid supply port 280. In one embodiment, fluid supply port control valve 281 is operable using electrical power. Fluid supply port control valve 281 may be operably connected to control valves drive unit 286, discussed below.

To further increase the rate of discharge of undesired material 104 out of discharge port 283, in one embodiment, pressure vessel 270 includes assist port 284. Assist port 284 may be used to manage a flow rate through discharge port 282. Assist port 284 may be positioned in alignment with discharge port 282 to direct material discharge assist fluid flow 294 through discharge port 282. In one embodiment, assist port 284 is pneumatically connected to a source of compressed fluid. The source of compressed fluid may be mobile fluid supply 500. When connected to mobile fluid supply 500, material discharge assist fluid flow 294 aligned with discharge port 282 may be selectively generated. Material discharge assist fluid flow 294 may be used to increase the rate of discharge of undesired material 104 out of discharge port 282. For example, the rate of discharge of undesired material may increase as the rate of material discharge assist fluid flow 294 through assist port 284 increases.

To control the flow rate of fluid flow 294, in one embodiment, pressure vessel 270 includes assist port control valve 285. Assist port control valve 285 may be positioned to reversibly seal (completely or partially) assist port 284. For example, assist port control valve 285 may reversibly block or limit a fluid flow path through assist port 284 that is aligned with discharge port 282. Assist port control valve 285 may include a motor or other type of actuator for reversibly scaling and/or controlling the rate of material discharge assist fluid flow 294 through assist port 284. In one embodiment, assist port control valve 285 is operable using electrical power. Assist port control valve 285 may be operably connected to control valves drive unit 286, discussed below.

When undesired material enters interior 289, it may begin to fill interior 289 thereby risking exit through one of the ports. To reduce the likelihood of undesired material 104 exiting interior 289, in one embodiment, pressure vessel 270 includes extensions 290. Extensions 290 may pneumatically connect inlet port 274, vacuum port 276, and/or relief port 278 to locations within interior 289. Extensions 290 may include tubular members that establish fluid flow paths from the aforementioned ports to the locations within interior 289 to reduce the likelihood of undesired material exiting interior 289 through one of the ports. The locations may be positioned towards an upper portion of interior 289 (while the undesired material 104 may generally fill interior 104 from bottom up). Extensions 290 may reduce the likelihood of undesired material 104 exiting interior 213 through any of the aforementioned ports. For example, undesired material 104 may generally be positioned towards the lower portion of interior 289 by gravity force. The extensions may allow more undesired material 104 to be received into interior 289 without having the undesired material 104 flow out of the aforementioned ports. Extensions 290 may allow for ports more flexibility in positioning on housing 272 without risking undesired material exiting interior 289. In one embodiment, the lower portion of interior 289 has a bowl shape and discharge port is connected to a bottom of the bowl shape which may preferentially direct undesired material 104 towards discharge port 282 by gravity force. Vacuum port 276 and inlet port 274 may be disposed across the bowl shape from one another thereby forming a fluid flow path across the bowl shape.

When undesired material 104 flows into interior 289, it may exit inlet port 274 and the corresponding extension with some velocity. To manage the exiting undesired material from inlet port 274, in one embodiment, pressure vessel 270 includes deflector plate 291. Deflector plate 291 may include a plate of structure for dissipating impact of undesired material 104 as it flows into interior 289. Deflector plate 291 may be positioned in interior 289 in alignment with vacuum induced fluid flow 130 after it exits extensions 290. As discussed above, interior 289 may be drawn to a high-pressure vacuum which may cause vacuum induced fluid flow 130 to exit extensions 290 with reasonable velocity. Deflector plate 291 may be positioned to dissipate physical impact of undesired material 104 entrained in vacuum induced fluid flow 130. For example, undesired material 104 may strike or otherwise impact deflector plate 291. Deflector plate may have a size, shape, and/or be oriented and/or positioned to preferentially direct undesired material that impacts it towards a lower portion of interior 289 thereby trapping a majority of the undesired material 104 entrained in vacuum induced fluid flow 130 in interior 289. A minority of the entrained undesired material 104 may exit interior 289 through vacuum port 276 entrained in vacuum induced fluid flow 130 (after it flows from inlet port 274, through interior 289, and out of vacuum port 276.

To further decrease the likelihood of undesired material existing interior 289 through one of the ports, in one embodiment, pressure vessel 270 includes caps 292. Caps 292 may reduce the likelihood of undesired material 104 in interior 289 from entering relief port 278 and vacuum port 276. Caps 292 may include plates or other structures positioned by extensions 290 that are connected to relief port 278 and vacuum port 276. Caps 292 may partially (or completely) cover openings of the aforementioned extensions 290. Generally, caps 292 may be positioned to reduce the likelihood of undesired material 104 from falling into the openings in extensions 290 due to gravity force (e.g., if some undesired material flows above the openings in the extensions 290 and then falls downward due to gravity).

To transfer undesired material into and out of interior 289, the pressure in interior 289 may need to be changed over time. For example, interior 289 may need to be drawn down to a vacuum to draw undesired material into interior 289 and the vacuum may need to be dissipated to allow the undesired material to be discharged through discharge port 282. To manage the pressure in interior 289, in one embodiment, pressure vessel 270 includes control valves drive unit 286. Control valves drives unit 286 may control the operation of the control valves (e.g., 275, 277, 279, 281, 283, and/or 285). Control valves drives unit 286 may be operably connected to the control valves.

Control valves drive unit 286 may control the operation of the control valves by controlling the quantity of power supplied to each of the control valves. Different power levels provided to the respective control valves may partially or completely close the ports associated with the respective control valves. Consequently, the rate of fluid flow through each of the respective control valves may be regulated by controlling the quantity of power supplied to the respective control valves. Accordingly, interior 289 may be drawn to a high-pressure vacuum, the high-pressure vacuum may be dissipated, and interior 289 may be pressurized above ambient by changing the rates of fluid flow through the aforementioned ports.

The control valves may manage the rate of fluid flow through the ports using any technology. For example, in one embodiment, one or more of the control valves include a valve and an actuator coupled to the valve. The actuator may modulate a size of the opening through the valve in response to provided electrical power. The quantity of supplied electrical power may be proportional to the size of the opening through the valve. In one embodiment, the default position of the valve is fully opened or fully closed. The quantity of supplied electrical power to the actuator may modulate the valve between the fully opened and fully closed states.

To manage the process of transferring undesired material 104 in interior 289, in one embodiment, pressure vessel 270 includes sensors 287. Sensors 287 may be used to measure physical properties of pressure vessel 270 (e.g., pressure levels, fluid flow rates, etc.) and/or the fill level of undesired material in pressure vessel 270. Sensors 287 may perform the aforementioned measurements using any measurement modality without departing from embodiments disclosed herein.

To orchestrate the transfer of undesired material 104 into and out of interior 289, in one embodiment, pressure vessel 270 includes controller 288. Controller 288 may control the flow of fluid flows into and out of the ports of pressure vessel 270 to transfer undesired material 104 from reaction vessel 100 (or other locations) into interior 289. To do so, controller 288 may monitor the pressure in pressure vessel 270, fill level of undesired material 104 in pressure vessel 270, and discharge rate of undesired material 104 out of discharge port 282. Controller 288 may use the pressure and fill level (e.g., measured with sensors 287) to determine how to set the rates of fluid flow into pressure vessel 270.

Figure 25:
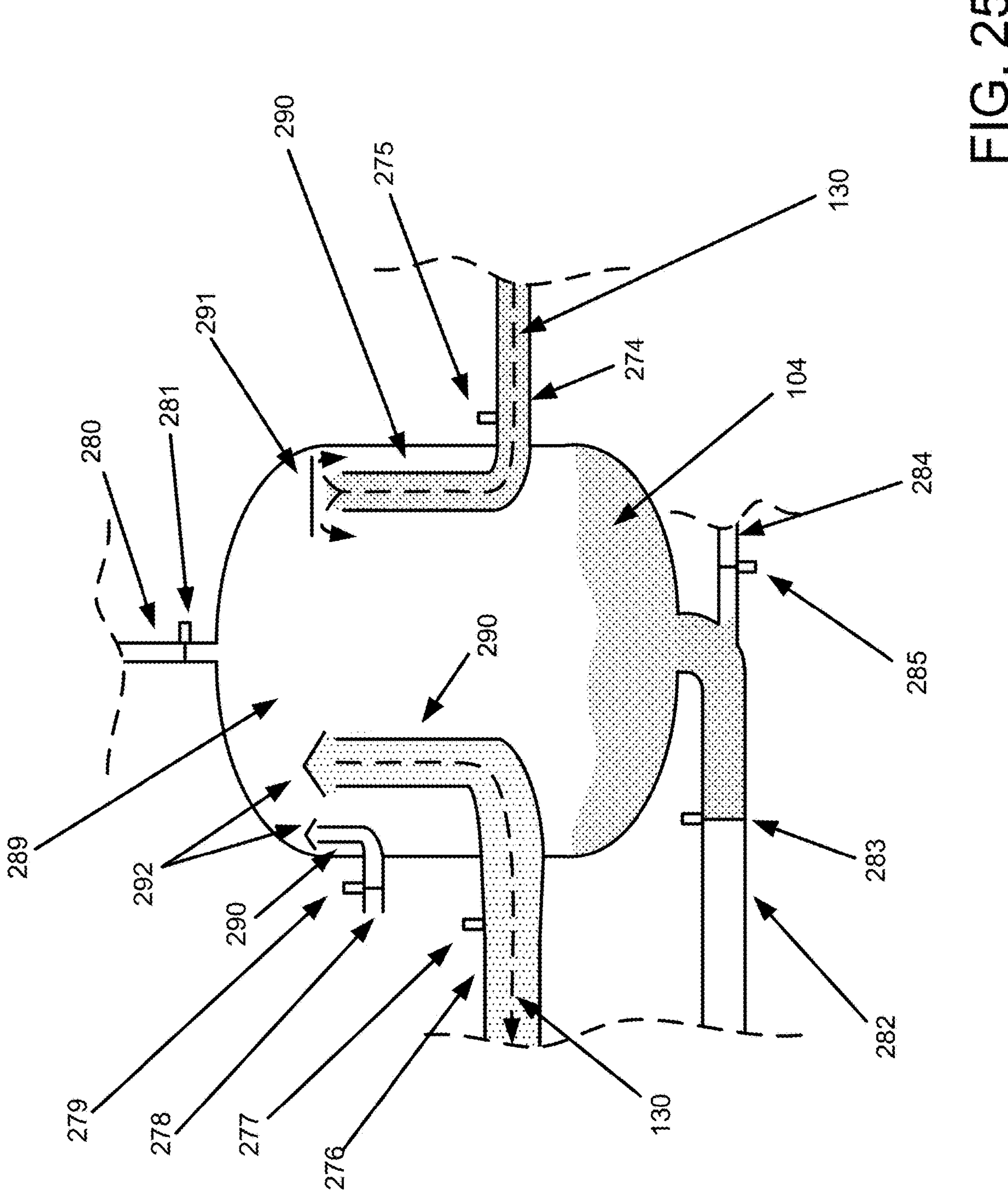
Figure 26:
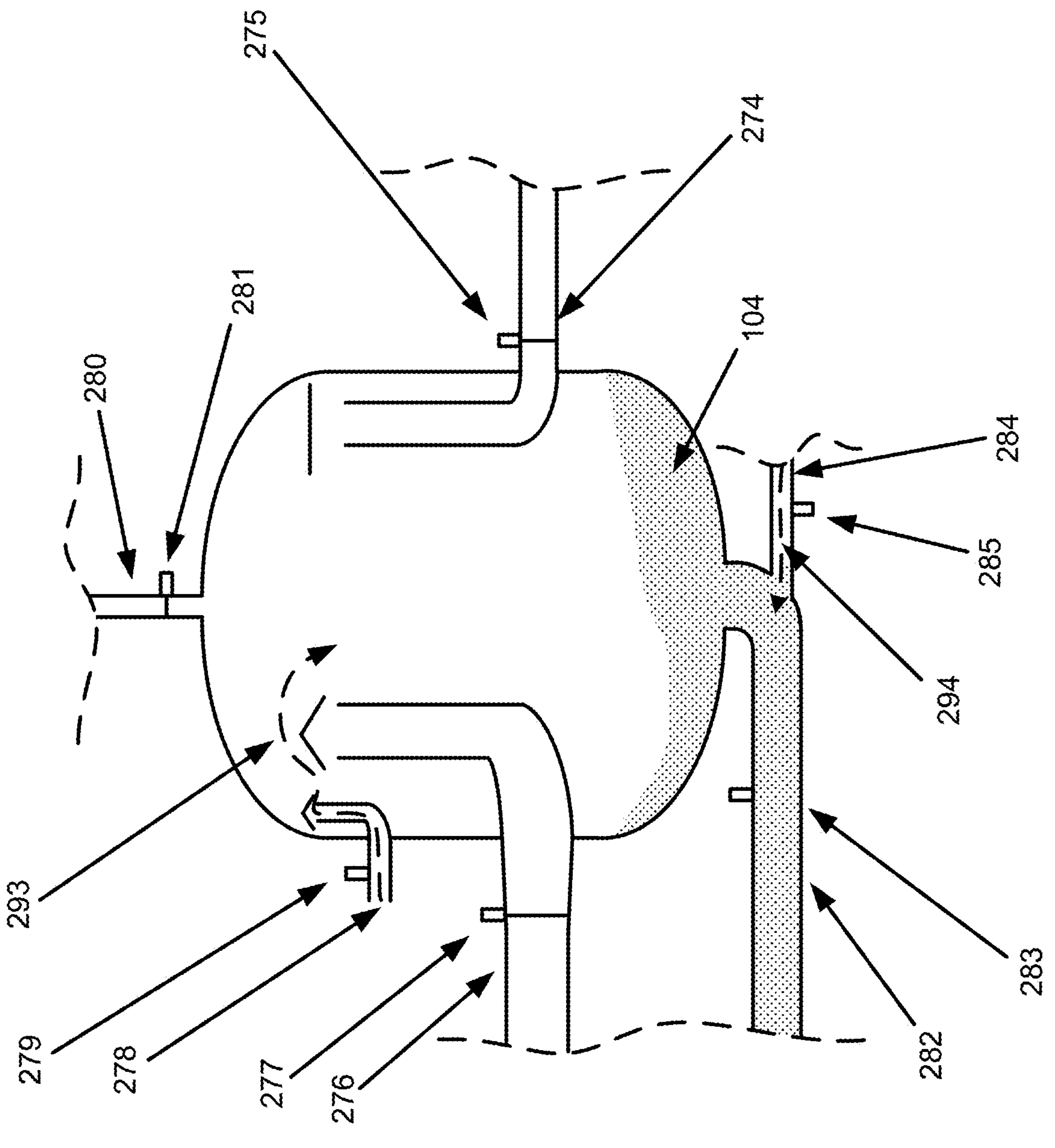
Figure 27:
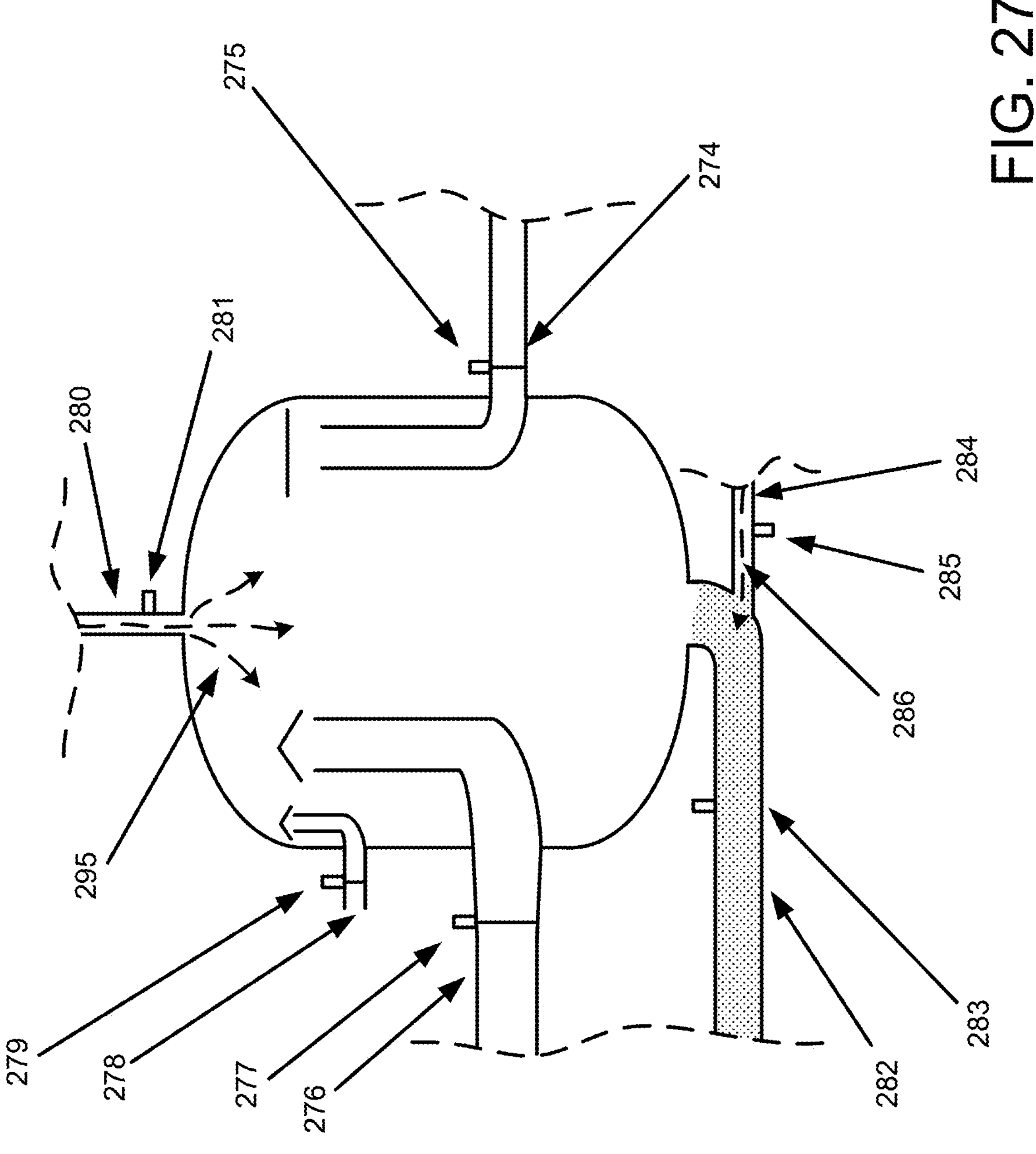
Figure 28:
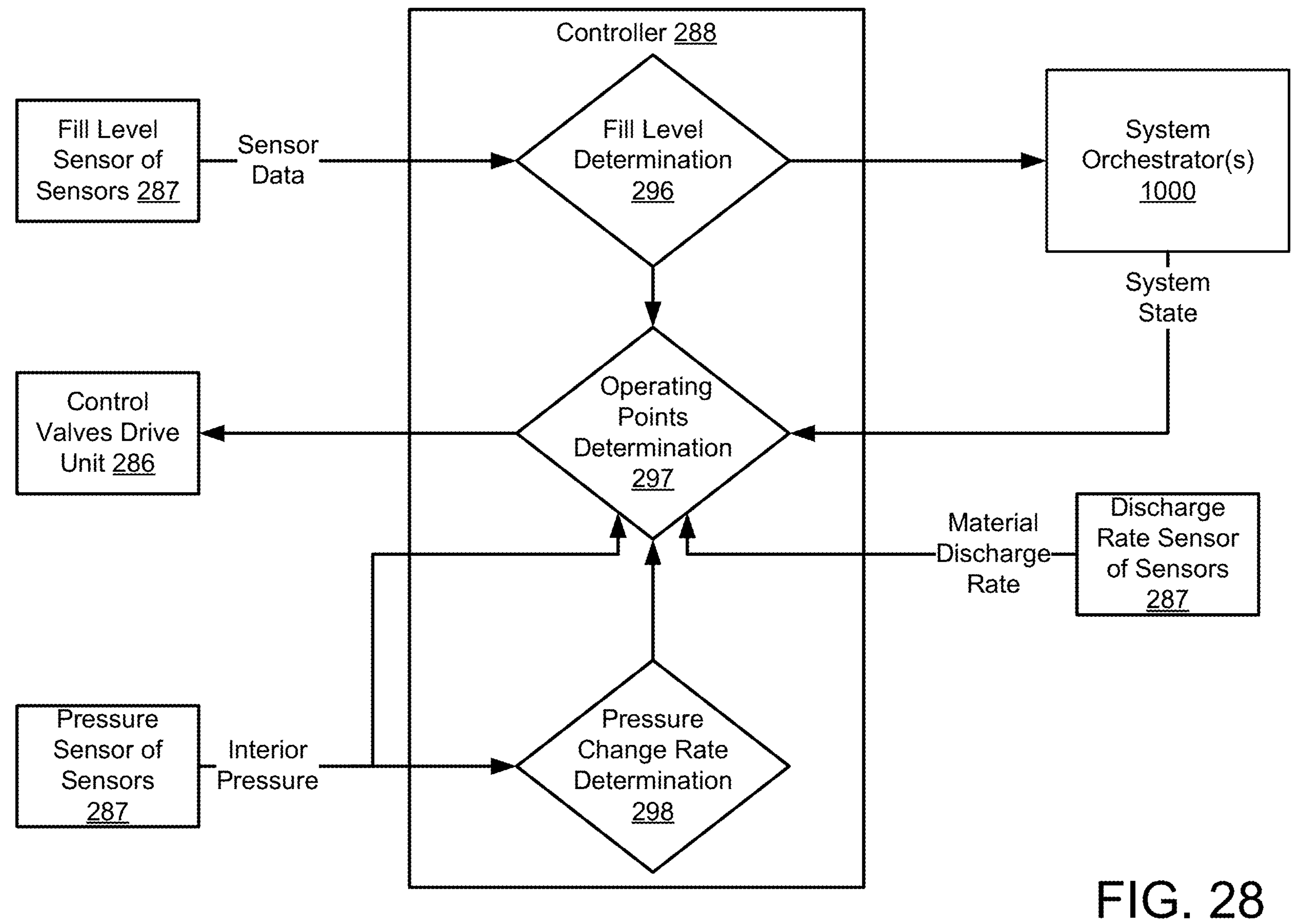
FIG. 28 is a block diagram of an operating points determination for a vacuum source of a material removal system, according to one or more embodiments of the disclosure.

Generally, controller 288 may manage the fluid flows to control the rates and timing of pressurization of interior 289. For example, in one embodiment, controller 288 seals and opens ports to (i) transfer undesired material into interior 289 and (ii) discharge undesired material out of interior 289 through discharge port 282. To do so, for example, controller 288 may seal relief port 278, fluid supply port 280, and discharge port 282 to allow vacuum induced fluid flow 130 to flow through interior 289 thereby transferring undesired material 104 into interior 289 as shown in FIG. 25. In another example, controller 288 may seal inlet port 274, vacuum port 276, and fluid supply port 280 as illustrated in FIG. 26 to dissipate a vacuum in interior 289 thereby allowing undesired material 104 to begin to flow out of discharge port 282. In a further example, controller 288 may seal inlet port 274, vacuum port 276, and relief port 278 to increase the rate of discharge of undesired material by pressurizing interior 289 and accelerating the flow through discharge port 282 with material discharge assist fluid flow 294.

To manage the flow of fluids through the ports, in one embodiment, controller 288 is coupled to control valves drive unit 286. Controller 288 may control the operation of control valves drive unit 286 using the operable connection (e.g., via message passing). For example, controller 288 may instruct control valves drive unit 286 to drive different control valves with different quantities of power to control rates of fluid flows into and out of pressure vessel 270. To determine the quantity of power to supply to the respective control valves, controller 288 may perform a fill level determination 296 to determine whether the interior 289 is filled. The fill level determination 296 be based on sensor data obtained from a fill level sensor of the sensors 287. If the interior 289 is determined as being filled, then controller 288 may perform an operating points determination 297 to determine the quantity of power to be supplied to the respective control valves. The operating points determination may be based on sensor data obtained from a pressure sensor of the sensors 287, inferred pressure change rates in the interior 289, sensor data from a material discharge sensor of the sensors 287, and a state (e.g., whether the system is operating, whether operation is suspended pending replacement of a component, etc.) of the system from system orchestrator(s) 1000. The inferred pressure change rate may be obtained from a pressure change rate determination 298 based on the sensor data from the pressure sensor of the sensors 287.

When managing the fluid flows, controller 288 may utilize measurements from sensors 287. In one embodiment, controller 288 is operably connected to sensors 287. Controller 288 may obtain information regarding the operation of pressure vessel 270 from the sensors 287. In one embodiment, controller 288 monitors the pressure in interior 289, the fill level in interior 289, and the discharge rate of undesired material 104 through discharge port 282 with measurements from sensors 287.

To provide its functionality, in one embodiment, controller 288 includes computing hardware (e.g., processors, memory, storage devices, communication devices, other types of hardware devices including circuitry, etc.) and/or computing instructions (e.g., computer code). When the computing instructions are executed by the computing hardware, the controller 288 may provide its functionality.

To transfer undesired material from reaction vessel 100 to material collector 200, high-pressure vacuum may be applied to material collector 200. Vacuum source 300 may be pneumatically connected to material collector 200 by hose 600. The pneumatic connection may allow vacuum source 300 to apply a high-pressure vacuum to material collector 200. Specifically, the vacuum may be applied to the interior of material collector 200 with hose 600 (or through other types of pneumatic connections between these components). The applied vacuum may generate the vacuum induced fluid flow 130 along the fluid flow path thereby flowing the undesired material from reaction vessel 100 to material collector 200.

Figure 29:
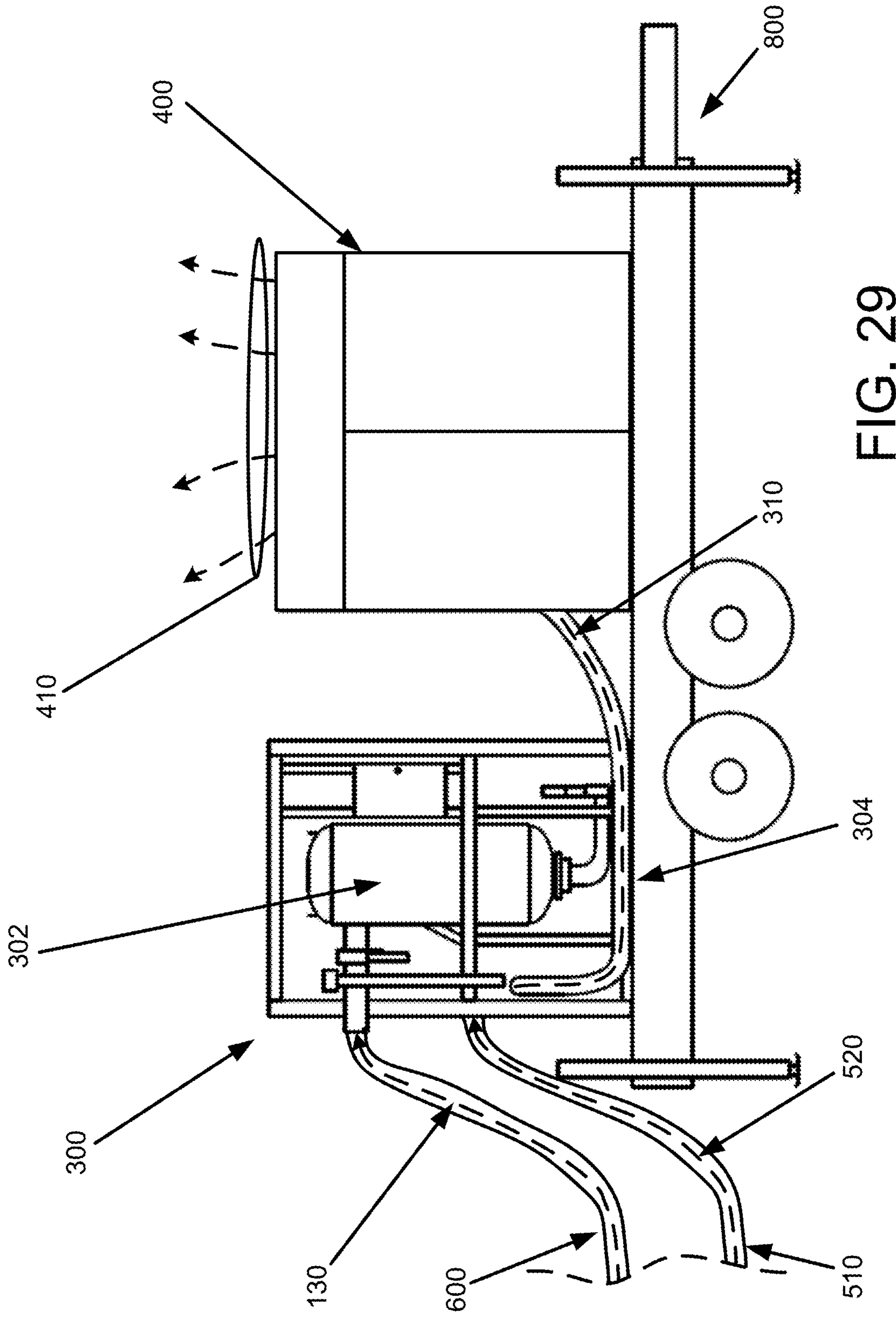
FIGS. 29-30 are diagrams of a highly mobile vacuum source of a material removal system, according to one or more embodiments of the disclosure.
Figure 30:
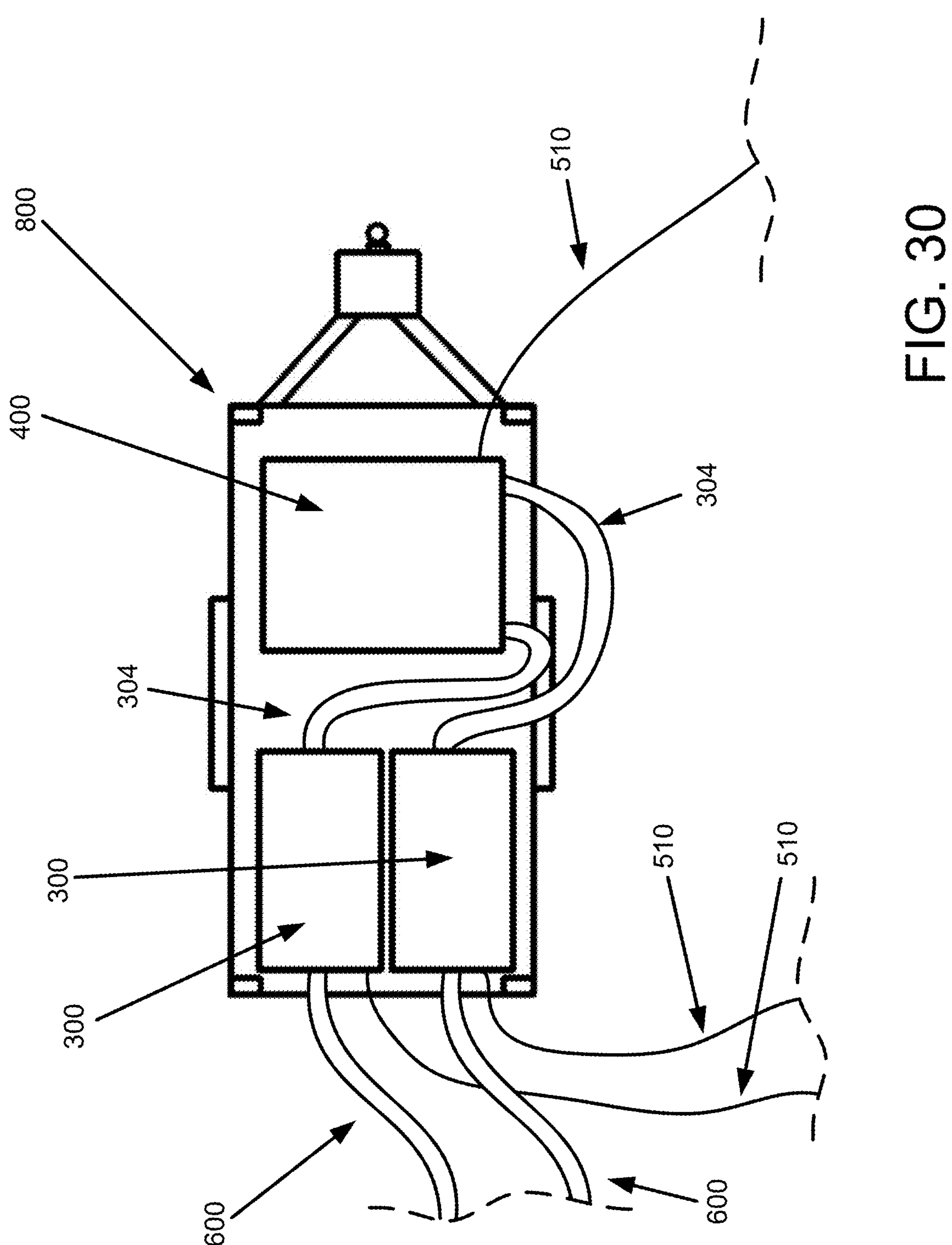
Figure 31:
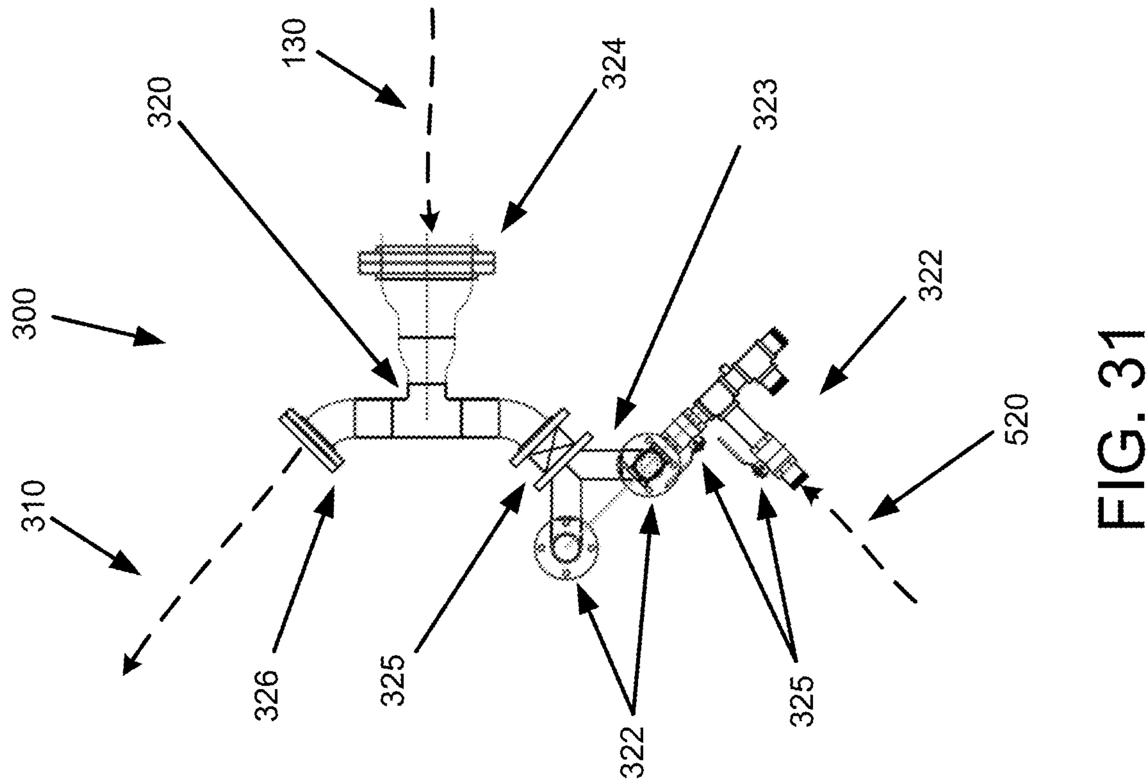
FIG. 31 is a diagram of a vacuum mechanism of a vacuum source of a material removal system, according to one or more embodiments of the disclosure.

Vacuum source 200 may be implemented using a variety of configurations depending on the environment to which a material collector is deployed. For example, in one embodiment, as shown in FIGS. 29-30, for example, vacuum source 300 generates the vacuum that it applies to material collector 200. Vacuum source 300 may include a vacuum generation mechanism 302 which generates the vacuum. Vacuum generation mechanism 302 may be pneumatically coupled to material collector 200 through hose 600.

Vacuum generation mechanism 302 may generate the vacuum in different manners depending on the environment to which it is deployed. For example, in one embodiment, vacuum generation mechanism 302 generates the vacuum using another fluid. To do so, vacuum generation mechanism 302 may be pneumatically coupled to mobile fluid supply 500 through fluid supply hose 510. Vacuum generation mechanism 302 may receive fluid supply fluid flow 520 through fluid supply hose 510. Fluid supply fluid flow 520 may cause vacuum generation mechanism 302 to generate a vacuum thereby applying a high-pressure vacuum to material collector 200 thereby generating vacuum induced fluid flow 130 from material collector 200 to vacuum source 300. Vacuum induced fluid flow 130 from material collector 200 may include a minority of undesired material from material collector 200, as discussed above.

When vacuum generation mechanism 302 generates the vacuum, in one embodiment, vacuum generation mechanism 302 combines vacuum induced fluid flow 130 and fluid supply fluid flow 520 and exhausts the combined fluid flows as vacuum exhaust fluid flow 310 (which may include the minority of the undesired material). To limit or prevent contamination of the ambient environment with the minority of the undesired material, vacuum generation mechanism 302 may be pneumatically connected to fluid flow attenuating filter 400 through fluid flow attenuating filter hose 304. Vacuum exhaust fluid flow 310 may flow from vacuum source 300 into fluid flow attenuating filter 400 through fluid flow attenuating filter hose 304. Accordingly, vacuum source 300 may be in the fluid flow path from reaction vessel 100 to fluid flow attenuating filter 400.

To facilitate rapid deployment and/or reconfiguration of a material removal system, in one embodiment, vacuum source 300 and fluid flow attenuating filter 400 are positioned on trailer 800 to form a mobile unit. Positioning the aforementioned components on a trailer may allow for the rapid establishment, removal, and/or reconfiguration of a material removal system in accordance with one or more embodiments.

To provide for a more powerful high-pressure vacuum, in one embodiment, multiple vacuum sources 300 and fluid flow attenuating filter 400 are positioned on trailer 800 to form a mobile unit. The multiple vacuum sources 300 may each be pneumatically coupled to the fluid flow attenuating filter 400 thereby causing two separate fluid flow paths (each including one of the vacuum sources) to be combined at the fluid flow attenuating filter 400. The vacuum sources may be pneumatically connected to the same material collector (e.g., to increase a strength of the high-pressure vacuum in the material collector) or different material collectors (e.g., to enable undesired material to be transferred to multiple material collectors in parallel).

As discussed above, vacuum source 300 may be implemented using a variety of different structures depending on the environment to which vacuum source 300 is deployed. For example, in one embodiment, as shown in FIGS. 31-37 vacuum source 300 includes Venturi mechanism 320. Venturi mechanism 320 may be a vacuum generation mechanism that generate a vacuum using another fluid flow. To do so, Venturi mechanism 320 may include fluid supply ports 322 through which a supply fluid flow used to generate the vacuum is received, vacuum port 324 through which the generated vacuum is applied, and exhaust port 326 through which the fluid flow used to generate the vacuum and materials drawn into the vacuum port 324 with the generated vacuum are exhausted from Venturi mechanism 320.

To generate the vacuum, in one embodiment, fluid supply ports 322 are pneumatically connected to mobile fluid supply 500. Specifically, fluid supply ports 322 may be pneumatically connected to a compressed fluid stored in mobile fluid supply 500. The compressed fluid may be used to generate fluid supply fluid flow 520 from mobile fluid supply 500. The fluid supply fluid flow 520 may from through the pneumatic connection and into fluid supply ports 322. Fluid supply fluid flow 520 may drive Venturi mechanism 320 thereby generating the vacuum produced by vacuum source 300, which may be applied to other devices via vacuum port 324.

The strength of the vacuum generated by Venturi mechanism 320 may depend on the rate of the generation fluid supply used to drive the Venturi mechanism 320. To facilitate higher pressure vacuum generation, in one embodiment, vacuum source 300 includes combiner 323. Combiner 323 may be a physical structure for combining multiple fluid flows received by fluid supply ports 322 into a single fluid flow and directing the single fluid flow into Venturi mechanism 320 for the vacuum.

To manage the flow of fluid supply fluid flow 520 into Venturi mechanism 320 (e.g., to control the strength of the vacuum), in one embodiment, fluid flow control valves 325 are positioned between fluid supply ports 322 and the mobile fluid supply 500. Generally, the strength of the vacuum generated by Venturi mechanism 320 may be proportional to the rate of fluid flow into fluid supply ports 322. Fluid flow control valves 325 may be used to limit (e.g., reduce, stop, etc.) the rate of fluid flow into Venturi mechanism 320 from fluid supply ports 322. Fluid flow control valves 325.

To apply the vacuum to a material collector 200, in one embodiment, vacuum port 324 is pneumatically connected to material collector 200. Specifically, vacuum port 324 may be pneumatically connected to material collector 200 to apply a vacuum to material collector 200. Applying the vacuum to material collector 200 may generate vacuum induced fluid flow 130 into vacuum port 324 from material collector 200. By doing so, vacuum induced fluid flow 130 may draw undesired material 104 into material collector 200 from reaction vessel 100. As discussed above, a majority of undesired material 104 may be trapped in material collector 200 while a minority of undesired material 104 may flow into vacuum source 300 in vacuum induced fluid flow 130.

To prevent or limit contamination of an ambient environment, in one embodiment, exhaust port 326 is pneumatically connected to fluid flow attenuating filter 400. Specifically, exhaust port 326 may be pneumatically connected to fluid flow attenuating filter 400 to exhaust vacuum induced fluid flow 130 (which may include a minority of the undesired material 104) and fluid supply fluid flow 520 as a combined fluid flow into fluid flow attenuating filter 400.

The pneumatic connections between the ports 322, 324, 326 of vacuum source 300 may be made using hoses or other flexible tubular structures. The hoses may enable the pneumatic connections to be efficiently made thereby reducing the setup time for establishing the system illustrated in FIG. 1.

Applicant recognized that the use of hoses or other flexible tubular structures may present a danger to persons near the hoses. The fluid flows generated by vacuum source 300 may cause the hoses to flex or move due to the forces applied to them by the fluid flows. Persons may be impacted by the hoses if the flexing or movement of the hoses is significant. A system in accordance with one or more embodiments may provide for the direct attachment of vacuum source 300 to material collector 200 and/or fluid flow attenuating filter 400. By directly attaching vacuum source 300 to material collector 200 and/or fluid flow attenuating filter 400, hoses or other flexible structure may not be needed. Consequently, the threat of impact by hoses or other flexible structures to persons may be reduced.

Figure 32:
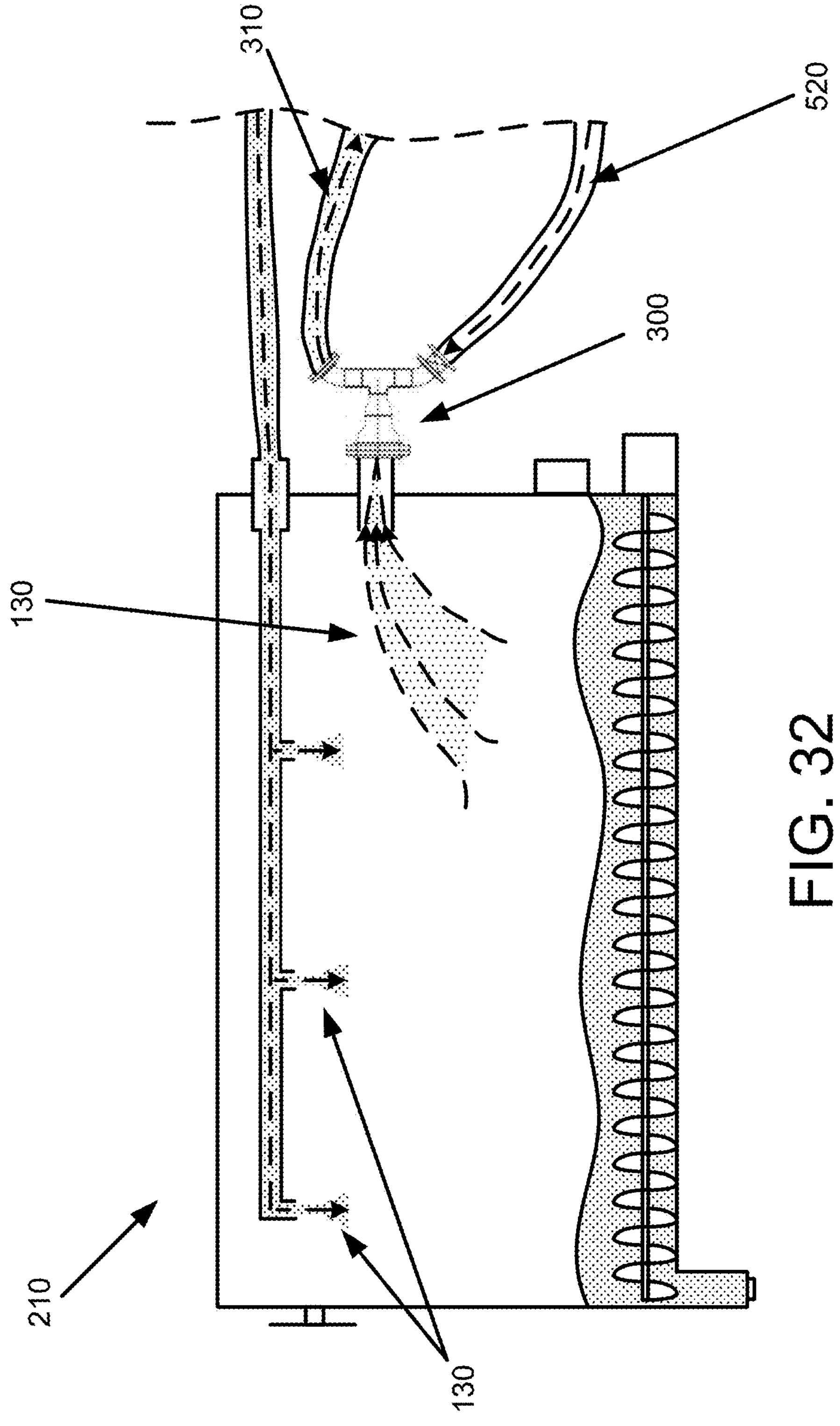
FIG. 32 is a diagram of an integration of a vacuum source with a vacuum box of a material removal system, according to one or more embodiments of the disclosure.

As illustrated in FIG. 32, in one embodiment, vacuum source 300 is directly connected to vacuum box 210. Directly connecting vacuum source 300 to vacuum box 210 may cause vacuum induced fluid flow 130 to flow from vacuum box 210 directly into vacuum source 300. Both vacuum box 210 and vacuum source 300 may be rigid structures able to absorb forces applied to them by vacuum induced fluid flow 130 without significantly deflecting or moving.

Figure 33:
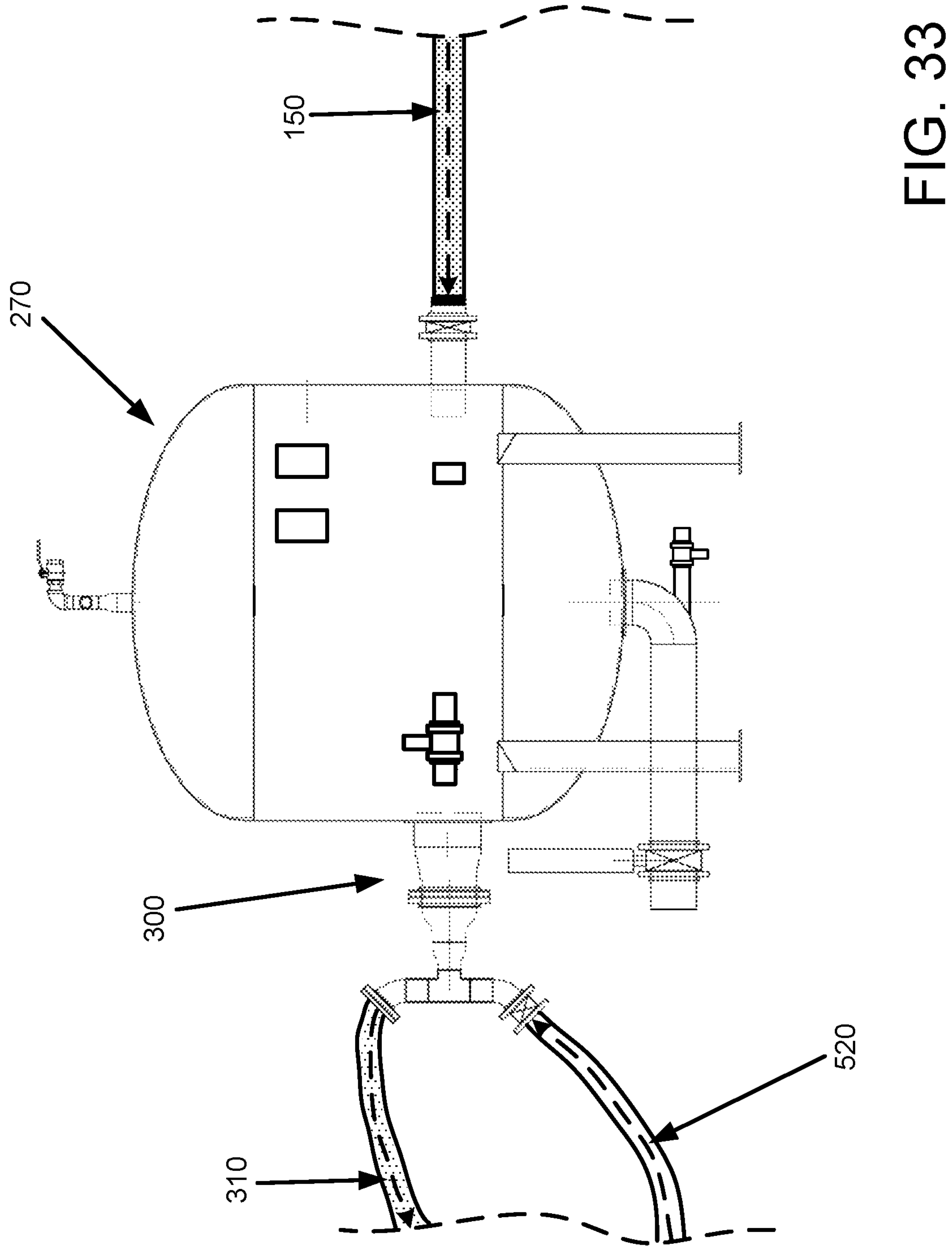
FIG. 33 is a diagram of an integration of a vacuum source with a pressure vessel of a material removal system, according to one or more embodiments of the disclosure.
Figure 34:
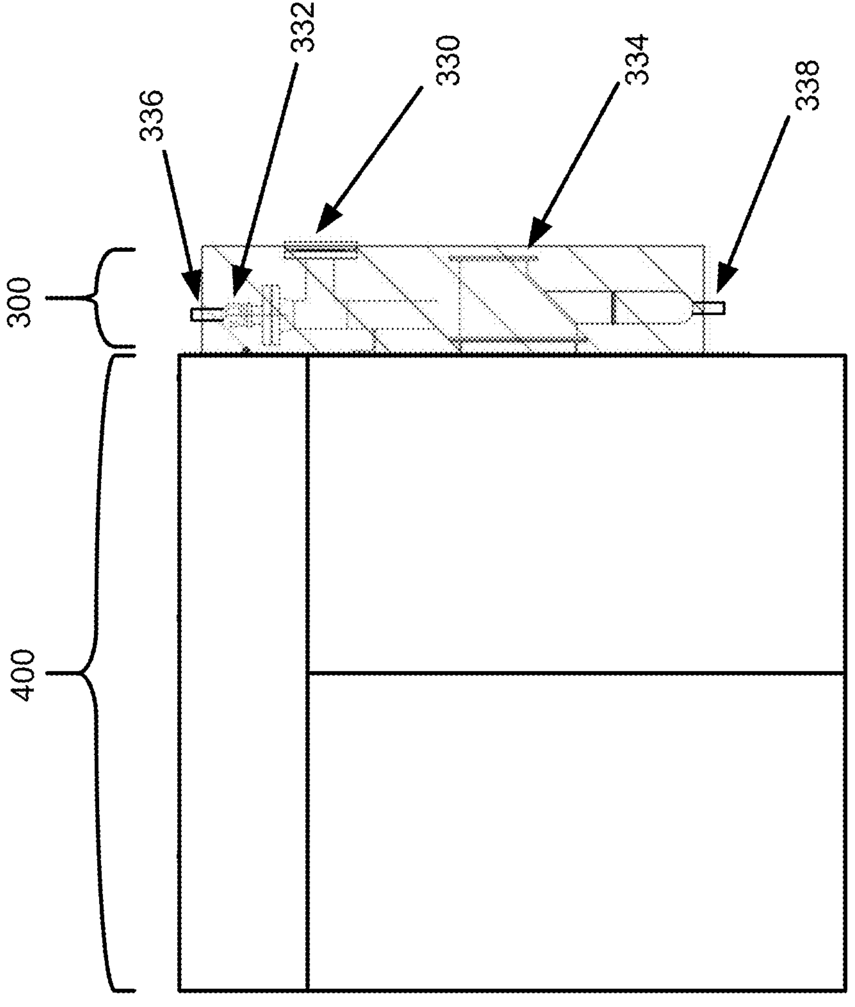
FIGS. 34-35 are diagrams of a first integration of a vacuum source with a fluid flow attenuating filter of a material removal system, according to one or more embodiments of the disclosure.
Figure 35:
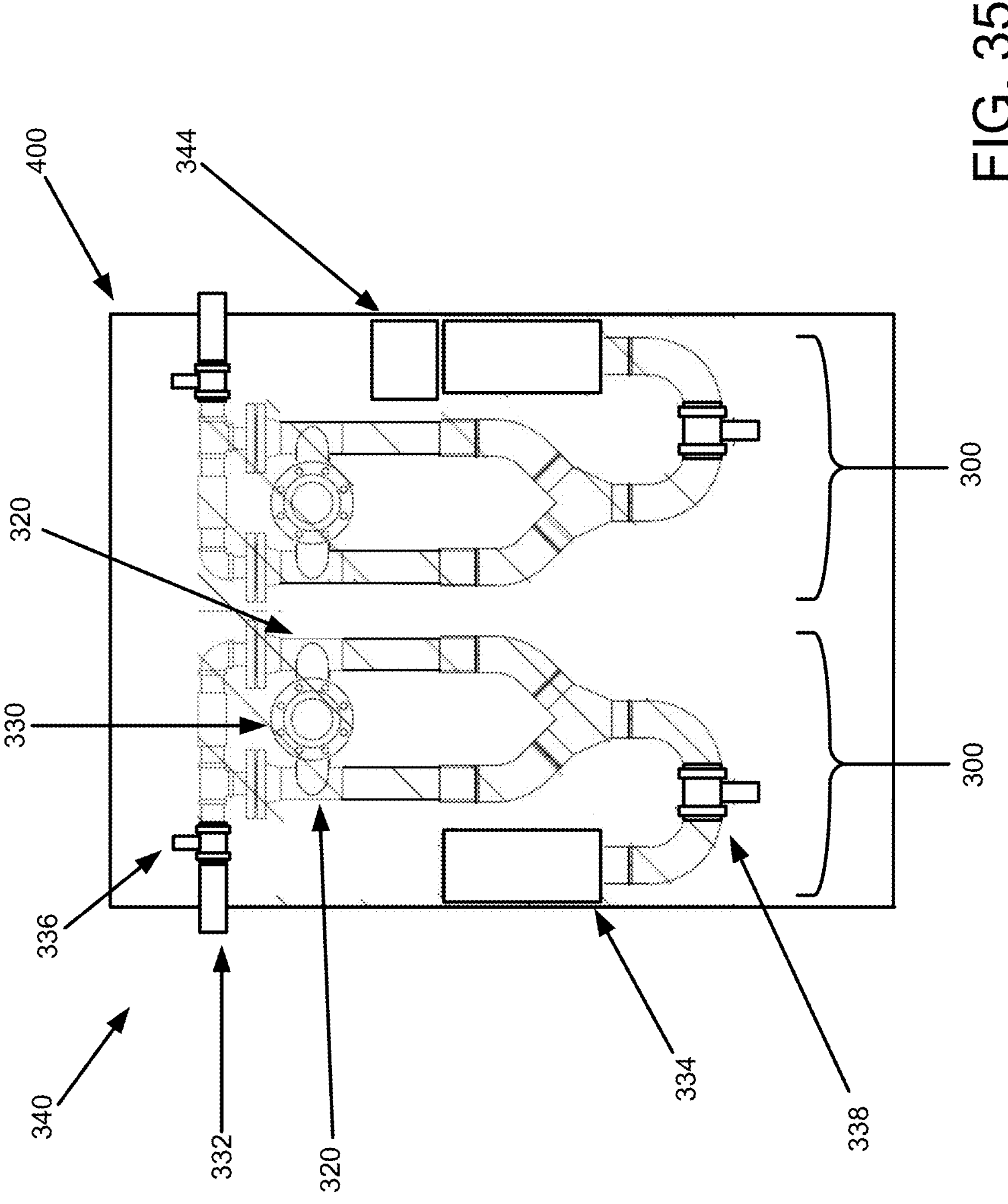
Figure 36:
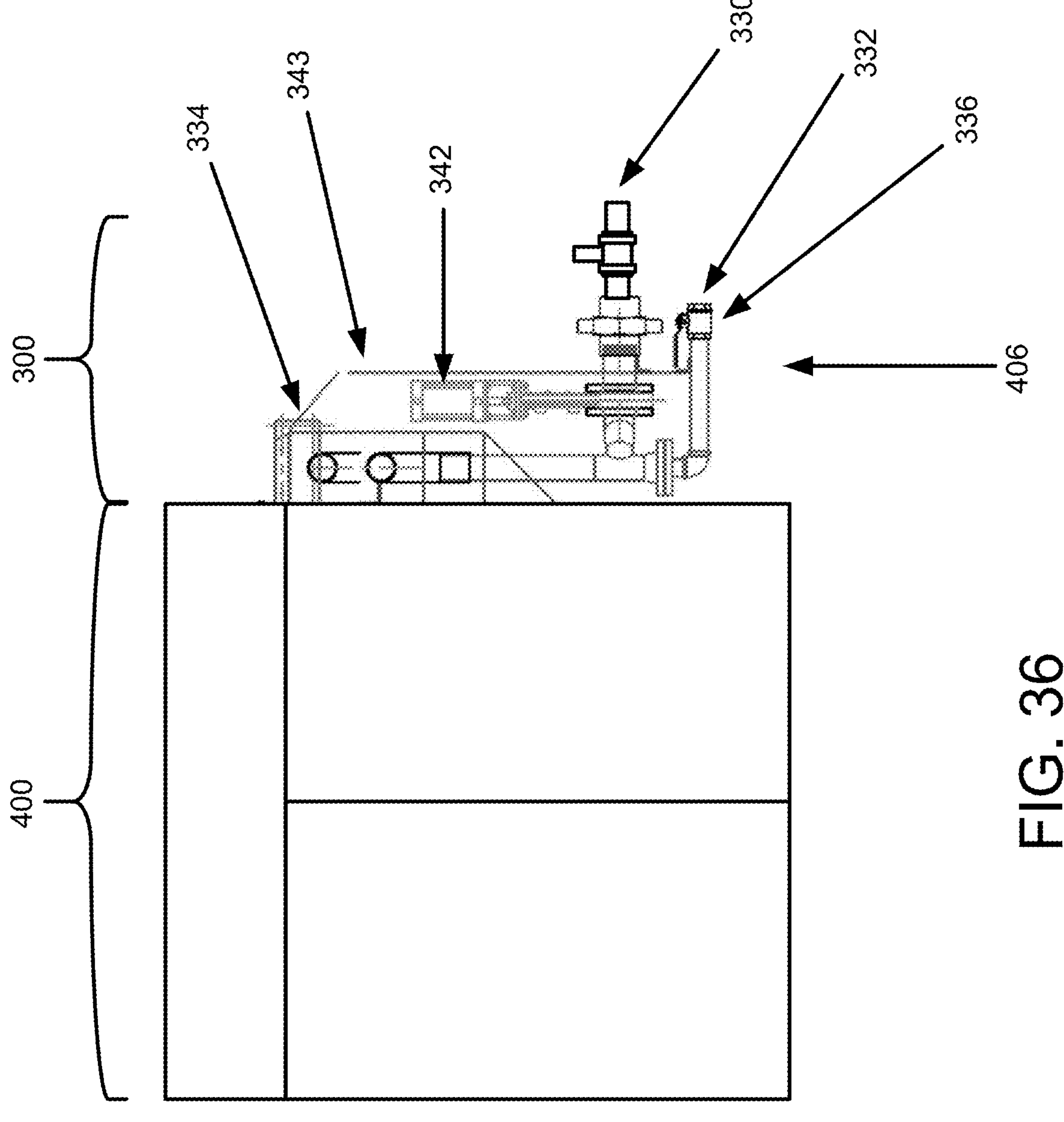
FIGS. 36-37 are diagrams of a second integration of a vacuum source with a fluid flow attenuating filter of a material removal system, according to one or more embodiments of the disclosure.
Figure 37:
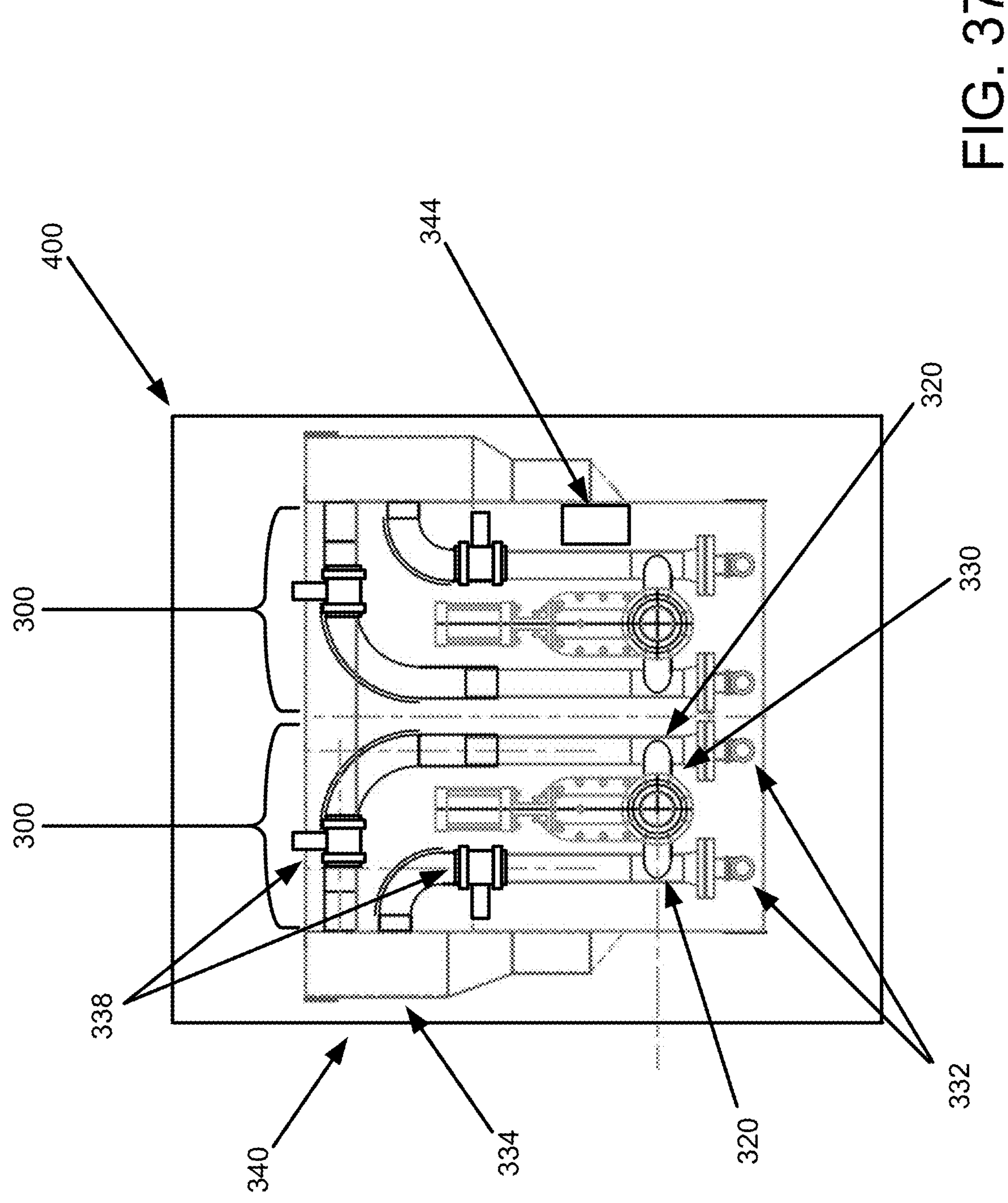
Figure 38:
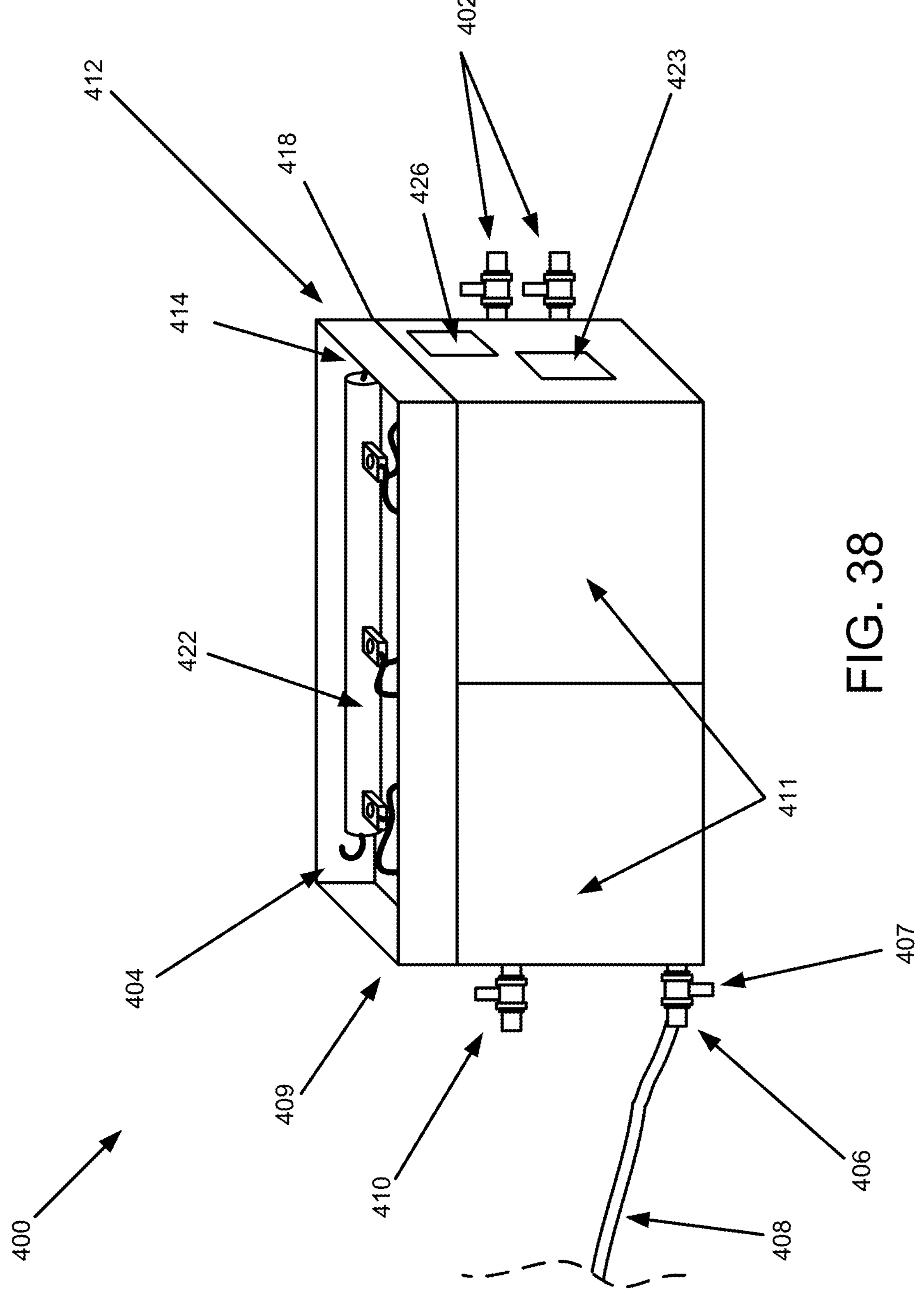
FIGS. 38-40 are diagrams of a fluid flow attenuating filter of a material removal system, according to one or more embodiments of the disclosure.
Figure 39:
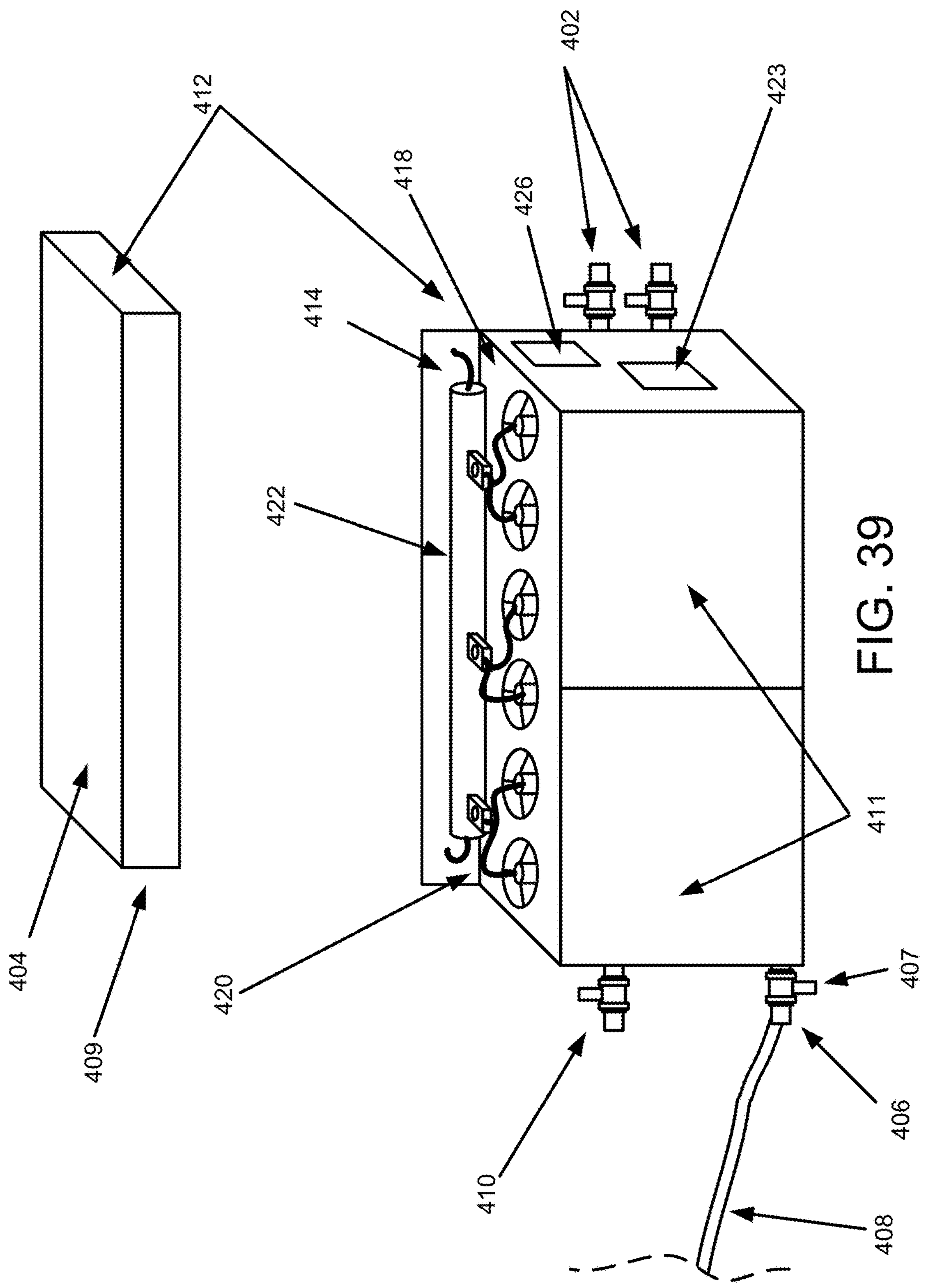
Figure 40:
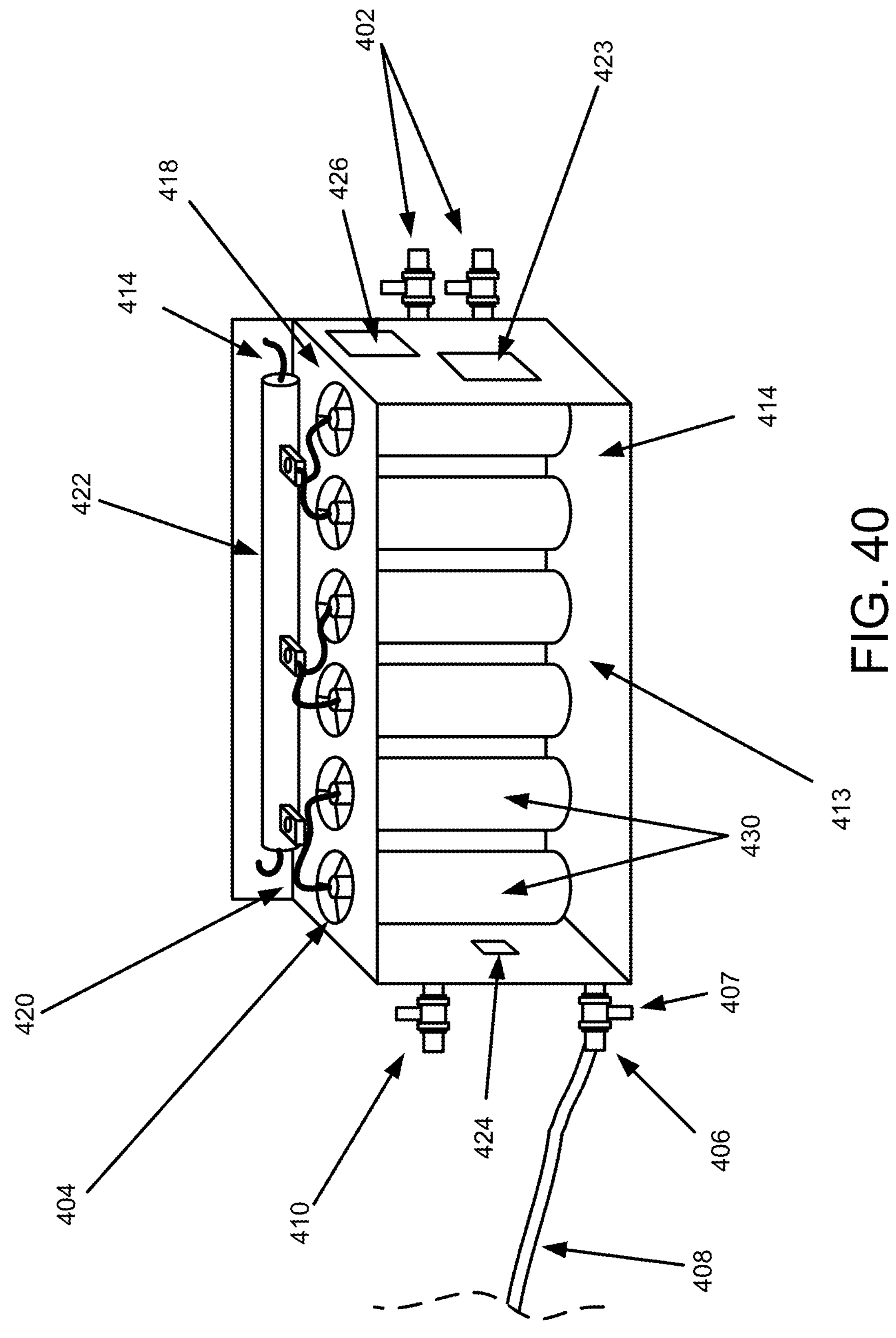
Figure 41:
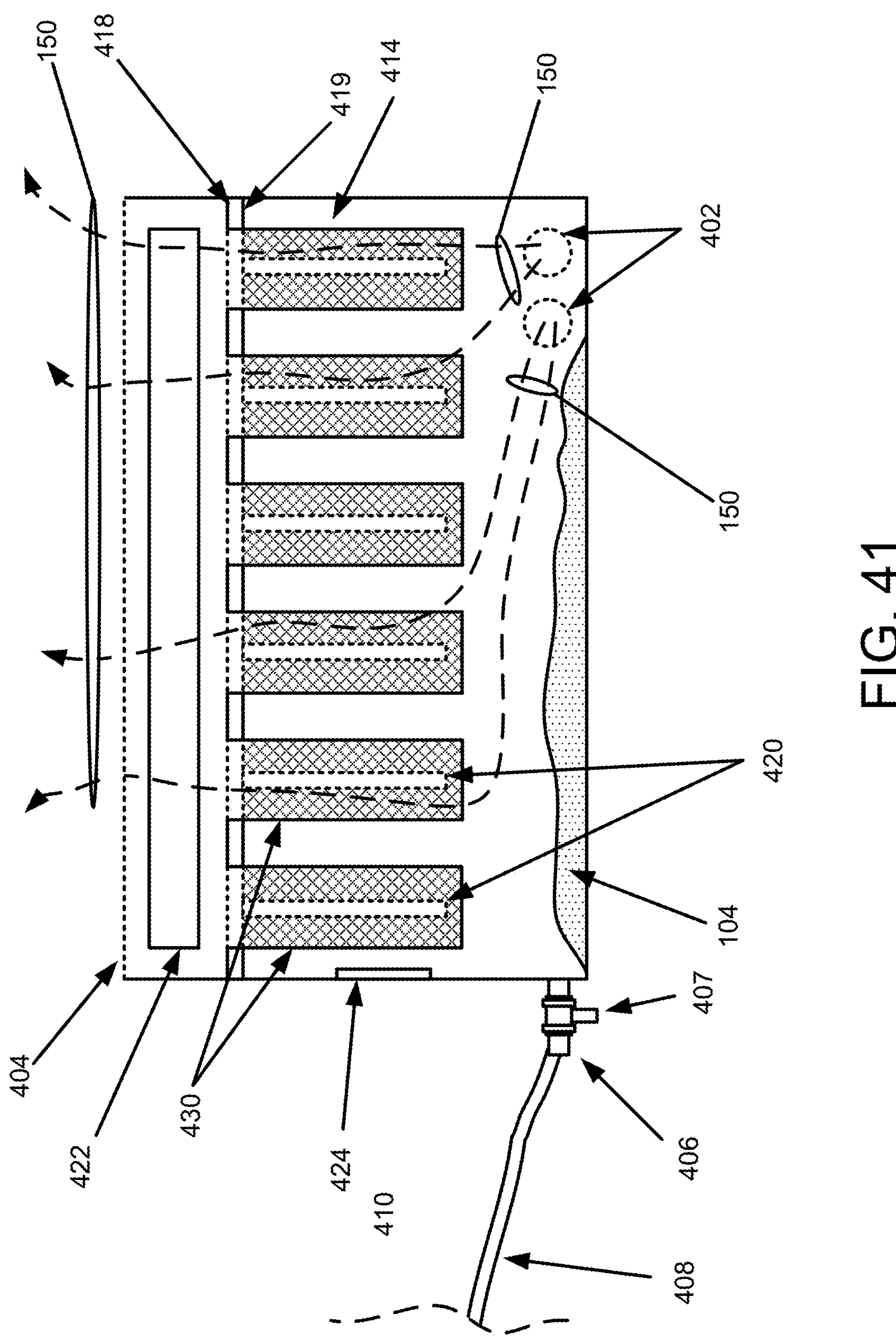
FIG. 41 is a simplified diagram of the fluid flow attenuating filter of FIGS. 38-40, according to one or more embodiments of the disclosure.
Figure 42:
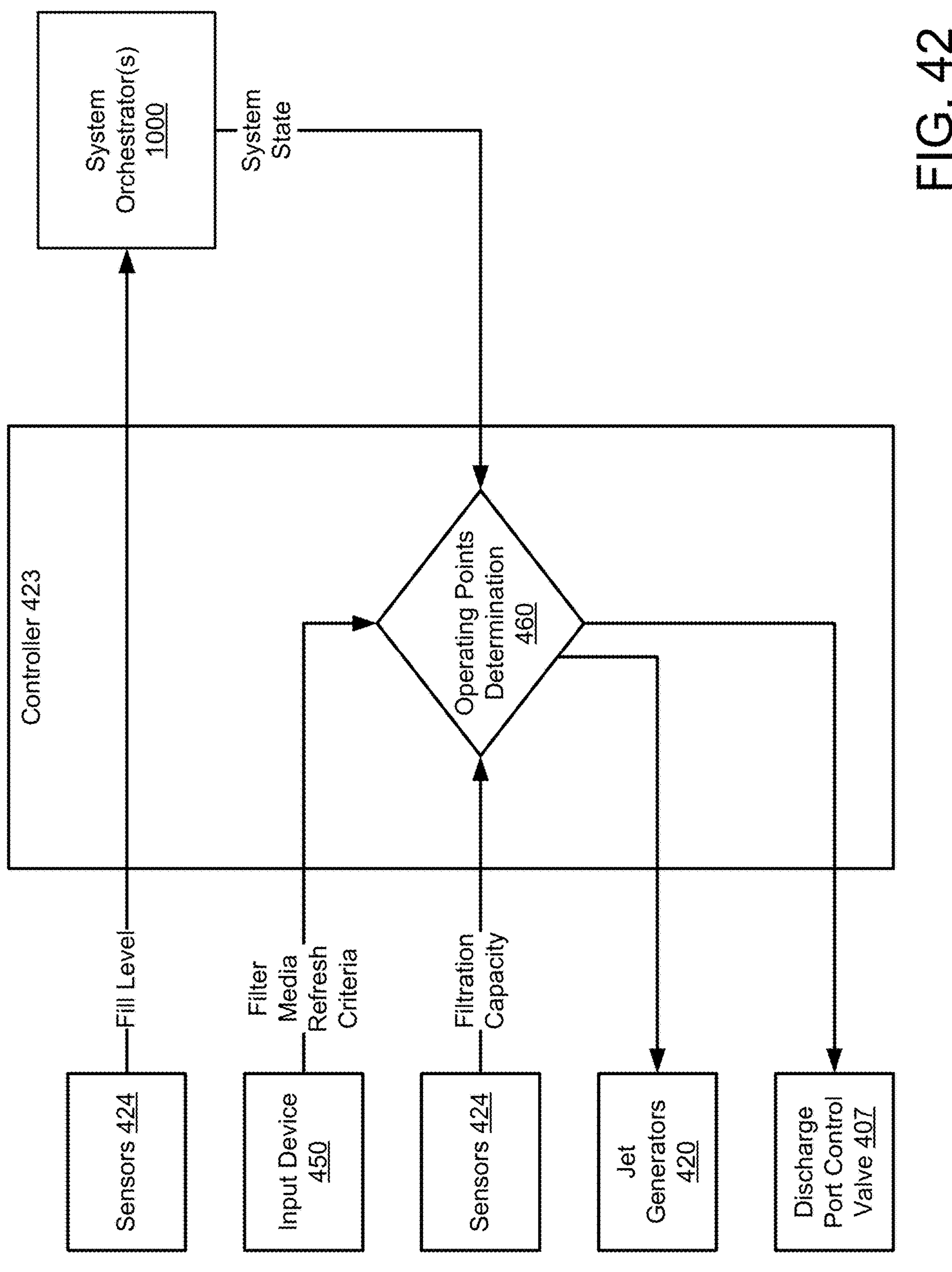
FIG. 42 is a block diagram of an operating points determination for a fluid flow attenuating filter of a material removal system, according to one or more embodiments of the disclosure.

As illustrated in FIG. 33, in one embodiment, vacuum source 300 is directly connected to pressure vessel 270. Directly connecting vacuum source 300 to pressure vessel 270 may cause vacuum induced fluid flow 130 to flow from pressure vessel 270 directly into vacuum source 300. Both pressure vessel 270 and vacuum source 300 may be rigid structures able to absorb forces applied to them by vacuum induced fluid flow 130 without significantly deflecting or moving.

Further, as shown in FIGS. 34-37, in one embodiment, vacuum source 300 is directly connected to fluid flow attenuating filter 400. Directly connecting vacuum source 300 to fluid flow attenuating filter 400 may cause vacuum induced fluid flow 130 to flow from vacuum source 300 (e.g., as part of vacuum exhaust fluid flow 310) directly into fluid flow attenuating filter 400. Both fluid flow attenuating filter 400 and vacuum source 300 may be rigid structures able to absorb forces applied to them by vacuum induced fluid flow 130 without significantly deflecting or moving.

Applicant recognized that the undesired materials 104 may be challenging to move via fluid flow by virtue of the state of matter of the undesired materials, the weight of the undesired materials, the viscosity and surface tension of the undesired materials, and/or other physical properties of the undesired materials. These characteristics of the undesired materials may limit the rate at which the undesired materials may flow through the fluid flow path if only a limited level of vacuum may be generated. A system in accordance with one or more embodiments may provide a high-pressure vacuum usable to expedite flow of the undesired material 104 through the fluid flow path. To expedite the flow of the undesired materials, vacuum source 300, in one embodiment, includes two or more Venturi mechanisms that may be operated in parallel with each other to enhance a pressure of the vacuum generated by vacuum source 300. Each of the two or more Venturi mechanisms may be driven using the compressed fluid from mobile fluid supply 500 (and/or other sources of compressed fluid such as other mobile fluid supplies).

FIGS. 34-37 illustrate one or more embodiments of vacuum source 300 including multiple Venturi mechanisms 320. Specifically, as illustrated in these figures, vacuum source 300 includes four Venturi mechanisms 320. The four Venturi mechanisms may be operated in parallel to provide a high-pressure vacuum and different levels of vacuum pressure.

To manage the pressure generated by vacuum source 300, in one embodiment, the Venturi mechanisms 320 are divided into two dual vacuum sources 340. Each of the Venturi mechanisms of the two dual vacuum sources 340 may be fluidly connected in parallel to each other so that they each may be driven using a common fluid supply port 332, may commonly exhaust out of a common exhaust port 334, and may apply vacuum using a common vacuum port 330. In this manner, each dual vacuum source 340 may provide a higher pressure vacuum than could be provided using a single Venturi mechanism driven by a similar rate of fluid flow.

To control the generation of vacuum by vacuum source 300, in one embodiment, the ports 330, 332, 334 of each dual vacuum source 340 are controlled by corresponding control valves 336, 338, 342. The control valves may be usable to control the rate of fluid flow through each of the respective ports.

The strength of the vacuum generated using multiple Venturi mechanisms may present safety hazards. To manage the safety hazards, in one embodiment, vacuum source 300 includes housing 343. Housing 343 may be a physical structure positioned around Venturi mechanism 320. Housing 343 may physically shield Venturi mechanism 320 from inadvertent strikes and may acoustically insulate Venturi mechanism 320 from the ambient environment. Housing 343 may include any number of walls or other types of structural members to physically shield Venturi mechanism 320 from the ambient environment.

Additionally, to manage the hazards, in one embodiment, vacuum port control valve 342 is positioned inside of housing 343 and is remotely operable. For example, vacuum port control valve 342 may be operably coupled to a button or other person operable mechanism which, when actuated, causes vacuum port control valve 342 to seal vacuum port 330. Accordingly, if an accident occurs, the vacuum generated by vacuum source 300 may be quickly ended.

To manage the process of generating the high-pressure vacuum, in one embodiment, vacuum source 300 includes controller 344. Controller 344 may be operably coupled to control valves 336, 338, 342. Controller 344 may control the operation of control valves 336, 338, 342 to apply vacuums of desired pressures. For example, controller 344 may be operably coupled to a switch, dial, or other mechanism that a person may operate to indicate a desired level of vacuum pressure to be generated by vacuum source 300. Controller 344 may use the indication to set the operation points of control valves 336, 338, 342 to generate the of desired vacuum pressure with Venturi mechanism 320.

Controller 344 may include computing hardware (e.g., processors, memory, storage devices, communication devices, other types of hardware devices including circuitry, etc.) and/or computing instructions (e.g., computer code) that when executed by the computing hardware cause controller 344 to provide its functionality. Controller 344 may include a lookup table or other data structure usable to determine the operating points for control valves 336, 338, 342 based on a desired vacuum level. Once the operating points are determined, controller 344 may modify the operation of control valves 336, 338, 342 based on the operating points. For example, controller 344 may modify the quantities of power used to drive control valves 336, 338, 342 to set the quantity of fluid flow allowed through each of ports 330, 332, 334.

To limit or prevent contamination of the ambient environment with undesired material 104, fluid flow attenuating filter 400 may remove undesired material from the vacuum induced fluid flow 130 prior to exhaustion into the ambient environment. To do so, fluid flow attenuating filter 400 may be pneumatically connected to vacuum source 300. In one embodiment, fluid flow attenuating filter 400 is pneumatically connected to vacuum source 300 by hose 600. In one embodiment, fluid flow attenuating filter 400 is directly pneumatically coupled to vacuum source 300 thereby reducing reliance on hose 600 which may be a safety hazard in operation of the system of FIG. 1.

Applicant recognized that industrial environments such as illustrated in FIG. 1 may include personnel tasked to operate the equipment in these environments. The presence of these persons may restrict the acceptable level of sound that may be produced for undesired material removal purposes. A fluid flow attenuating filter 400 in accordance with embodiments disclosed herein may also attenuate the sound generated by vacuum source 300 and/or mobile fluid supply 500 to sufficient levels such that personnel may not need to wear protective hearing due to the sound generated by a material removal system. In one or more embodiments disclosed herein, fluid flow attenuating filter 400 reduces the sound level generated by a material removal system by 25 decibels. For example, without the fluid flow attenuating filter 400, the system of FIG. 1 may generate approximately 115 decibels of sound. When fluid flow attenuating filter 400 is attached to the system, the sound level may be reduced to 89 decibels.

Thus, fluid flow attenuating filter 400 may both filter materials from received fluid flows before exhausting the received fluid flows and attenuate sound from received fluid flows before exhausting the received fluid flows into the ambient environment. The sound may be attenuated to an extent that personnel in the area need not wear hearing protection with respect to the system of FIG. 1 (the personnel may be required to wear hearing protection for other purposes).

FIGS. 38-42 illustrate an example of an embodiments of fluid flow attenuating filter 400. The fluid flow attenuating filter 400 may include housing 412 substantially surrounding interior 414. Housing 412 may generally seal interior 414 from the ambient environment. Housing 412 may include any number of walls or other structural members to seal interior 414. Housing 412 may also include a number of features for selectively providing access to various portions of interior 412. These features may include, for example, cover 409, doors 411, and/or other structures for reversibly allowing access to interior 414 from outside of housing 412. Cover 409 may provide for access to a portion of interior 414. For example, cover 409 may be a portion of housing 409 that may be opened and/or removed (e.g., detached) from a remaining portion of housing 414. When cover 409 is detached, jet generators 420 and jet supply 422 may be more easily accessed (e.g., for maintenance purposes). Doors 411 may provide for access to a second portion of interior 414. Generally, doors 411 may be openable and/or removable to provide for physical access to interior 414 when opened and/or removed. Doors 411 may be usable to provide for physical access to undesired material 104 trapped inside of interior 414, filter media 430, and/or jet generators 420.

To filter undesired material, in one embodiment, fluid flow attenuating filter 400 includes inlet ports 402, discharge port 406, and exhaust ports 404. Each of these ports may be positioned on housing 412 to provide access to interior 414 from outside of housing 412. For example, the respective ports may include holes or other structures through housing 412 that enable access to interior 414.

The inlet ports 402 may be pneumatically connected to vacuum source 300. When pneumatically connected to vacuum source 300, inlet ports 402 may receive vacuum induced fluid flow 130 from vacuum source 300. The minority of undesired material 104 may be entrained in vacuum induced fluid flow 130 thereby presenting a contamination hazard if exhausted into the ambient environment. Fluid flow attenuating filter 400 may include any number of inlet ports 402 positioned at any location on housing 412 without departing form embodiments disclosed herein. While illustrated in these figures as generally being disposed on one sidewall (e.g., a back side, opposite of doors 411), inlet ports 402 may be distributed across any number of sidewalls, through a bottom side, or other side of fluid flow attenuating filter 400 without departing from embodiments disclosed herein.

The exhaust ports 404 may be pneumatically connected to the ambient environment. The fluid flow path through the system illustrated in FIG. 1 may end at exhaust ports 404. Consequently, vacuum induced fluid flow 130 drawn from reaction vessel 100 and through the fluid flow path may exit the fluid flow path through exhaust ports 404. Interior 414 may be in the fluid flow path between inlet ports 402 and exhaust ports 404 so that vacuum induced fluid flow 130 flows through interior 414 prior to being exhausted into the ambient environment. While illustrated in these figures as generally being on a top side of fluid flow attenuating filter 400, exhaust ports 404 may be positioned elsewhere (e.g., on side walls of housing 412) to preferentially direct exhaust in other direction (e.g., other than upward) without departing from embodiments disclosed herein.

To partially attenuate sound, in one embodiment, exhaust ports 404 are of substantially larger size than inlet ports 402. The size different between these ports may reduce or eliminate backpressure on vacuum induced fluid flow 130. Additionally, the fluid flow path may expand greatly in cross section when transitioning from inlet ports 402 into interior 414. Consequently, any sound generated by vacuum induced fluid flow 130 may generally occur at the interface between inlet ports 402 and interior 414. Accordingly, fluid flow attenuating filter 400 may, in part, dissipate the sound from vacuum induced fluid flow 130 by generating it within fluid flow attenuating filter 400 so that the sound will naturally dissipate prior to exiting fluid flow attenuating filter 400.

To filter undesired material prior to exhaustion, in one embodiment, interior 414 includes filter media region 413. Filter media region 413 may be a portion of interior 414 in which a filter media may be positioned. Filter media region 413 may be positioned so that vacuum induced fluid flow 130 must flow through it prior to being exhausted through exhaust ports 404. In one embodiment, interior 416 includes filter media support plate 418. Filter media support plate 418 may be a structural member to support the filter media within filter media region 413. Filter media support plate 418 may generally divide interior 414 into two sections and include holes through which vacuum induced fluid flow 130 may travel between these sections. One or both sides of filter media support plate 418 may include baffling 419. Baffling 419 may be a physical structure to attenuate sound. Baffling 419 may attenuate sound generated by vacuum induced fluid flow 130 prior to exhaustion out of fluid flow attenuating filter 400. Baffling 419 may include, for example, ridges, indentations, cavities, and/or other physical features to dissipate acoustic energy.

To filter undesired material prior to exhaustion into the ambient environment, in one embodiment, fluid flow attenuating filter 400 includes filter media 430. Filter media 430 may be a physical structure usable to filter the minority of undesired material 104 from vacuum induced fluid flow 130. Filter media 430 may be any type of filter for removing material from fluid flows. Filter media 430 may also be sound absorptive and, in part, dissipate the sound generated by vacuum induced fluid flow. Filter media 430 may include a limited filtration capacity. Additionally, as filter media 430 filters material, its permeability to fluid flow may decrease.

To manage the filtration capacity of filter media 430, in one embodiment, fluid flow attenuating filter 400 includes jet generators 420. Jet generators 420 may be physical structures for generating jets of fluid flow. Jet generators 420 may be positioned to generate jets of fluid flow directed toward filter media 430 to refresh the filtration capacity of filter media 430. For example, jet generators 420 may be positioned inside of housing 412 and oriented into filter media region 413. Fluid flow attenuating filter 400 may include any number of jet generators 420. In some embodiments, jet generators 420 are partially or completely positioned inside of filter media 430. For example, filter media 430 may be implemented as hollow tubular shells with jet generators 420 being positioned inside of the hollows in the tubular shells.

When jet generators 420 generate the jets, the jets may transfer material filtered by filter media 430 out of filter media 430 and into interior 414. By doing so, the permeability and filtration capacity of filter media may be restored. For example, the jets may cause the material (e.g., undesired material 104) in filter media 430 to flow out of filter media 430 and onto a bottom or lower portion of housing 412 (e.g., a floor for interior 414).

To drive the jet generators 420, in one embodiment, fluid flow attenuating filter 400 includes jet fluid supply 422. Jet fluid supply 422 may be a physical structure for storing compressed fluid. In one embodiment, jet fluid supply 422 includes a storage tank in which the compressed fluid is stored. The compressed fluid may be a gas such as, for example, compressed air. Jet fluid supply 422 may be pneumatically coupled to jet generators 420. Jet generators 420 may include ports and electrically driven actuators that control the rate at which the compressed fluid from jet fluid supply 422 is allowed to exit jet generators 420. Thus, the jet generators 420 may modulate the strength of the jets, the timing of when the jets are generated, and/or other characteristics of the jets.

To fill jet fluid supply 422, in one embodiment, fluid flow attenuating filter 400 includes fluid supply port 410. Fluid supply port 410 may be pneumatically connected to jet fluid supply 422 to refill jet fluid supply 422 with compressed when another source of compressed fluid (e.g., mobile fluid supply 500) is pneumatically coupled to fluid supply port 410.

Due to the limited volume of interior 414, only a finite quantity of undesired material 104 may be stored in interior 414. Overtime, interior 414 may become filled with undesired material 104 as undesired material is removed from reaction vessel 100. Once interior 414 is filled, fluid flow attenuating filter 400 may become inoperable (e.g., undesired material may block fluid flow through interior 414.

To manage the fill level of interior 414, in one embodiment, fluid flow attenuating filter 400 includes discharge port 406. Discharge port 406 may provide for the removal of undesired material 104 from interior 414. In one embodiment, undesired material is removed from interior 414 through discharge port 406 while vacuum induced fluid flow 130 flows through interior 414.

To remove undesired material from interior 414, in one embodiment, discharge port 406 is pneumatically coupled to vacuum box 210. For example, discharge port 406 may be pneumatically coupled to vacuum box 210 through a restrictive hose 408. By doing so, when a high-pressure vacuum is applied to vacuum box 210, undesired material 104 in interior 414 may be drawn out of interior 414, through restrictive hose 408, and into vacuum box 210. Thus, both the majority and minority of undesired material 104 from reaction vessel 100 may be transferred to vacuum box 210. Discharge port 406 may be pneumatically coupled to other structures for undesired material discharge purposes without departing from embodiments disclosed herein.

To control when and/or the rate of removal of undesired material 104 from interior 414, in one embodiment, fluid flow attenuating filter 400 includes discharge port control valve 407. Discharge port control valve 407 may be positioned to control the rate of fluid flow through discharge port 406. Discharge port control valve 407 may include an electrically driven actuator usable to control the rate of fluid flow through discharge port 406. For example, discharge port control valve 407 may control the rate of fluid flow through discharge port 406 to selectively remove undesired material 104 from interior 414.

To determine when and at which rate to remove undesired material 104 from interior 414, in one embodiment, fluid flow attenuating filter 400 includes sensors 424. Sensors 424 may be positioned to monitor the filtration capacity of filter media 430, fill level of interior 414, and/or a flow rate of undesired material 104 out of discharge port 406. To do so, sensors 424 may measure any physical property of fluid flow attenuating filter 400 and use the measurement to infer these quantities. For example, sensors 424 may include photosensors that measure the filtration capacity of filter media 430 based on a quantity of light transmitted by filter media 430. In another example, sensors 424 may include scales used to measure a mass of undesired material 104 to infer the fill level of interior 414. Sensors 424 may include other components for measuring the same or different types of physical properties without departing from embodiments disclosed herein.

To orchestrate the operation of fluid flow attenuating filter 400, in one embodiment, fluid flow attenuating filter 400 includes controller 423. Controller 423 may be operably coupled to discharge port control valve 407, jet generators 420, and sensors 424. Controller 423 may obtain information from sensors 424 and selectively drive discharge port control valve 407 and jet generators 420 based on the information to ensure that (i) the filter media 430 is capable of continuing to filter fluid flows through interior 414 and (ii) interior 414 is not overfilled with undesired material 104.

Controller 423 may include computing hardware (e.g., processors, memory, storage devices, communication devices, other types of hardware devices including circuitry, etc.) and/or computing instructions (e.g., computer code) that when executed by the computing hardware cause controller 423 to provide its functionality. Controller 423 may include a lookup table or other data structure usable to make an operating points determination 460 for discharge port control valve 407 and jet generators 420 based on the fill level and filtration capacity of filter media 430. Once the operating points are determined, controller 423 may modify the operation of discharge port control valve 407 and jet generators 420 based on the operating points. For example, controller 423 may modify the quantities of power used to drive discharge port control valve 407 and jet generators 420 to set the quantity of fluid flows allowed through each of discharge port control valve 407 and jet generators 420. By doing so, fluid flow attenuating filter 400 may be more likely to be able to substantially continuously operate.

To allow persons to control the operation of fluid flow attenuating filter 400, in one embodiment, fluid flow attenuating filter 400 includes input device 450. Input device 450 may be operably connected to controller 423. User input may be provided to controller 423 through input device 450. Input device 450 may include, for example, one or more buttons, touch sensitive displays, levers, knobs, or other devices that are operable by a person to provide controller 423 with information.

Controller 423 may receive information from a person regarding how frequently to refresh the filtration capacity of filter media 430 and/or information regarding how frequently to discharge undesired material 104 from interior 414 with input device 450. Controller 423 may use such information when determining the operating points for discharge port control valve 407 and jet generators 420. For example, a person may provide operational preferences or other information using input device 450 to configure the operation of fluid flow attenuating filter 400.

Controller 428 may be powered with electricity. Fluid flow attenuating filter 400 may include solar panel 426 that provides power to controller 428. Controller 428 may include a batter in which the power from solar panel 426 is stored prior to use by controller 428.

Applicant recognized that industrial environments similar to the environment illustrated in FIG. 1 may include volatile hydrocarbon fluids (or other type of volatile materials) or other type of fluids susceptible to combustion. A system in accordance with one or more embodiments may not be powered by combustion. Rather, material collector 200, vacuum source 300, fluid flow attenuating filter 400, and mobile fluid supply 500 may be powered with electricity and/or compressed fluid. By doing so, the system of FIG. 1 may be capable of removing undesired materials from industrial environment without risk of igniting combustible materials in the environment.

As discussed above, various components may utilize fluid flows to provide their functionalities. To operate these components of the system of FIG. 1 may include mobile fluid supply 500. Mobile fluid supply 500 may supply compressed fluid to vacuum source 300 and/or fluid flow attenuating filter 400. The compressed fluid of mobile fluid supply 500 may be pneumatically coupled to vacuum source 300 (e.g., to generate vacuums) and fluid flow attenuating filter 400 (e.g., to refresh the filtration capacity of filter media).

To provide compressed fluid, mobile fluid supply 500 may compress a fluid and store it for future use. In one embodiment, mobile fluid supply 500 includes an air compressor. The air compressor may compress air from the ambient environment to generate the compressed fluid. Mobile fluid supply 500 may compress other fluids without departing from embodiments disclosed herein.

To limit or prevent combustion risk, in one embodiment, mobile fluid supply 500 compresses fluid using electricity. Mobile fluid supply 500 may obtain the electricity from any source. In one embodiment, mobile fluid supply 500 includes a battery which provides the electricity. In one embodiment, mobile fluid supply 500 includes a cord or other mechanisms for obtaining the electricity from another device (e.g., from a utility company or other large scale supplier, a solar setup or other non-combustion based electricity producer, etc.).

Applicant recognized that industrial environments such illustrated in FIG. 1 may require a high uptime by their operators. Consequently, the time required to setup the system of FIG. 1 may be a significant cost to the operators of the industrial environment. A system in accordance with embodiments disclosed herein may provide for the efficient setup, operation, and removal of the system in industrial environments (or other types of environment). To do so, any of the components shown in FIG. 1 may be placed on trailers or other types of high mobility structures to enable them to be efficiently placed and oriented with respect to reaction vessel 100.

Applicant also recognized that industrial environments such illustrated in FIG. 1 may have different requirements for material removal. For example, different industrial environment may have different quantities of undesired material and undesired material at different industrial environment may have different physical properties. A system in accordance with embodiments disclosed herein may provide for rapid deployment of a material removal system that is customized to meet the requirements of each industrial environment. To do so, different numbers of components illustrated in FIGS. 1-42 may be deployed and pneumatically connected in parallel and/or serial to provide desired levels of vacuum strength and desired storage capacities for undesired material.

For example, in one embodiment, as shown in FIG. 43, a material removal system may include multiple vacuum boxes 210, vacuum sources 300, fluid flow attenuating filters 400, and mobile gas supplies. For example, each vacuum box 210 may be pneumatically connected to reaction vessel 100 via divider 702 and manifold 700 through hoses 710. Divider 702 may be a pneumatic splitter that establishes two separate fluid flow paths through the respective vacuum boxes 210.

By pneumatically connecting both vacuum boxes 210 to reaction vessel 100 in parallel, undesired material from reaction vessel 100 may be transferred to both vacuum boxes 210 at the same time. Consequently, the material removal system may be capable of removing twice as much undesired material before the vacuum boxes are filled. The material removal capacity of a material removal system in accordance with embodiments may be scaled as necessary in this manner to meet industrial environment requirements. In such a system, any of the components may include any number of ports to facilitate the formation of multiple fluid flow paths. For example, as seen in FIG. 43, a vacuum box may include four ports (e.g., two inlet ports and two vacuum ports). The components of FIG. 43 may include different numbers of ports without departing from embodiments disclosed herein.

Each vacuum box 210 may be pneumatically connected to two vacuum sources 300 through hoses 714. By pneumatically connecting two vacuum sources to vacuum box 210, the strength of the high-pressure vacuum in vacuum box 210 may be increased. Consequently, a higher degree of suction may be applied to undesired material 104 in reaction vessel 100 thereby increasing the transfer rate of undesired material from reaction vessel 100 and allowing more difficult material to be transferred out of reaction vessel 100. The suction strength of a material removal system in accordance with embodiments may be scaled as necessary in this manner to meet industrial environment requirements.

Each of the vacuum sources 300 pneumatically connected to a vacuum box may be driven with fluid flow from a corresponding mobile fluid supply 500. For example, the mobile gas supplies may be pneumatically connected to corresponding vacuum sources through hoses 714.

Each of the vacuum sources 300 pneumatically connected to a vacuum box may also exhaust through a corresponding fluid flow attenuating filter 400. For example, the vacuum sources 300 that exhaust through a corresponding fluid flow attenuating filter 400 may be positioned on a trailer together to form a mobile unit. In this manner, the material removal system may be quickly and efficiently deployed and scaled as necessary to meet industrial environment requirements.

To facilitate efficient reconfiguration of a material removal system, any of the pneumatic connections may be implemented using quick connect-disconnect connections and/or pneumatic isolators. The quick connect-disconnect connections may allow for any of the pneumatic connections to be quickly made and removed. The pneumatic isolators may automatically seal the material removal system when a pneumatic connection is disconnected. For example, pneumatic isolators may be positioned between divider 702 and vacuum boxes 210. When one of hoses 710 is disconnected from divider 702, the pneumatic isolator may automatically seal the opening in divider 702 to which the disconnected hose was connected. In this manner, the disconnection of a hose may not impact the other fluid flow paths. For example, the fluid flow path between divider 702 and the still-connected vacuum box (e.g., with the other hose) may not be impacted. Quick connect-disconnect connections and/or pneumatic isolators may be used to facilitate the pneumatic reconfiguration of any of the fluidic topologies illustrated throughout this application.

Applicant recognized that industrial environments similar to that illustrated in FIG. 1 may need to be filled with desired material after the undesired material 104 is removed. For example, reaction vessel 100 may need to be refilled with catalyst or other materials after undesired material is removed. A system in accordance with embodiments disclosed herein may provide for rapid deployment of desired materials in industrial environments.

Figure 44:
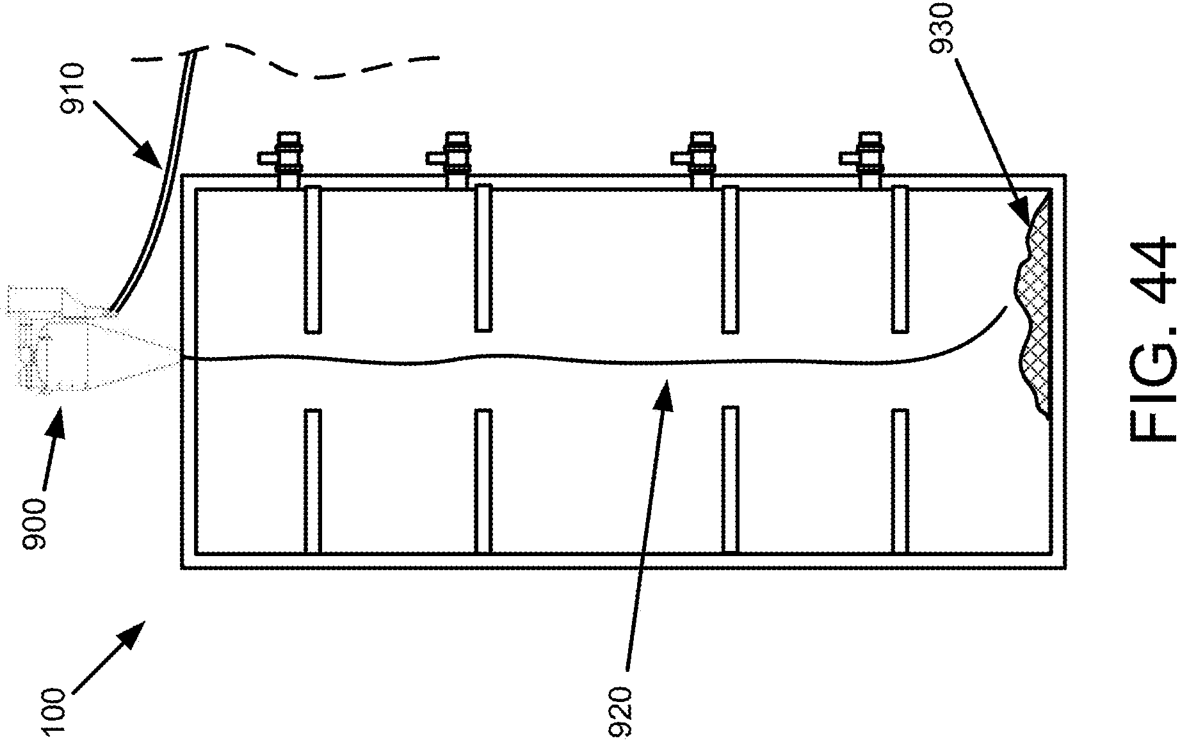
FIG. 44 is a block diagram of a receiver for replenishment of a reaction vessel with desired material, according to one or more embodiments of the disclosure.

To provide for the rapid deployment of desired materials, in one embodiment, as shown in FIG. 44, a material removal system includes receiver 900. Receiver 900 may be a physical device to rapidly deploy desired materials in reaction vessel 100. Receiver 900 may be positioned towards a top of reaction vessel 100 and may receive desired materials. When received, receiver 900 may separate the desired material from a high pressure fluid flow in which the desired material is entrained and used to carry it to receiver 900. The high pressure fluid flow may be directed to receiver 900 with hose 910. The high pressure fluid flow may be generated by, for example, mobile fluid supply 500.

Receiver 900 may be pneumatically connected to hose 920 through which the desired material is deployed to various locations in reaction vessel 100. For example, desire material in receiver 900 may be pumped, gravity fed, or otherwise directed through hose 920 into reaction vessel 100. The desired material 930 may be deployed in one or more locations within reaction vessel 100. Hose 920 may include various sections which may be removed as different zones are filled with desired material. By doing so, the length of hose 920 may be changed to match each of the zones (or the heights of structures in the respective zones).

The desired material 930 may take different forms. For example, in one embodiment, desired material 930 is a catalyst material that was previously removed from reaction vessel 100. The desired material 930 may be replacement catalyst or any other types of material without departing from embodiments disclosed herein. In other embodiments, the desired material 930 may be a new material that was not previously in reaction vessel 100.

The system illustrated in FIG. 1 may include a number of components that may need to cooperatively operate to provide its functionality. To orchestrate the operation of these components, in one embodiment, the operation of the material removal system of FIG. 1 is orchestrated in an automated or semi-automated manner. For example, as discussed above, any of the components of the material removal system may include a controller which may orchestrate the operation of the corresponding component.

Figure 45:
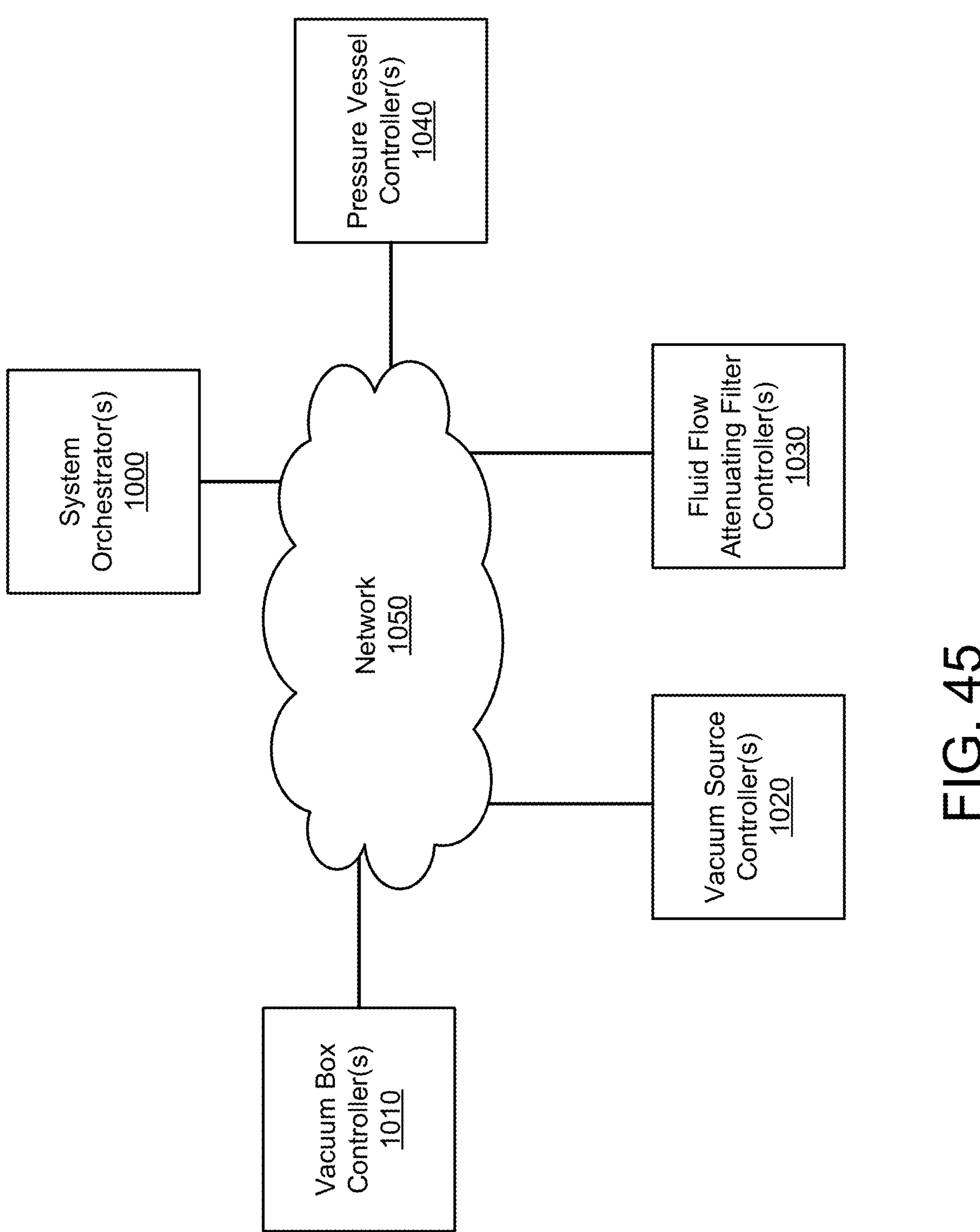
FIG. 45 is a block diagram of a controller and orchestrator configuration used to orchestrate substantially continuous material removal by a material removal system, according to one or more embodiments of the disclosure.

A material removal system may include one or more system orchestrator(s) 1000 as illustrated in FIG. 45 in an embodiment. The one or more system orchestrator(s) 1000 may be operably connected to any of the vacuum box controller(s) 1010, vacuum source controller(s) 1020, fluid flow attenuating filter controller(s) 1030, and/or pressure vessel controller(s) 1040 of component of the material removal system. The aforementioned orchestrator and controllers may be operably connected via network 940. Network 940 may include one or more wired and/or wireless networks through which the orchestrator and controllers may communicate.

The one or more system orchestrator(s) 1000 may obtain information regarding the operation of each of the controllers of the components of the material removal system. The information may include measurements by any sensors operably connected to the controllers, the operating points implemented by the controllers, and/or other types of information that may allow the one or more system orchestrator(s) 1000 to determine how to operate the components of the system.

The one or more system orchestrator(s) 1000 may also determine and provide system states to the controllers 1010, 1020, 1030, 1040. The system states may define how the material removal system is to operate. Generally, the material removal system may operate in accordance with the following states: (i) inactive state, (ii) material removal state in which the system actively removes undesired material from other environments, and (iii) a standby state in which the system is suspending fluid flow pending replacement of a vacuum box or other components of the material removal system. The controllers 1010, 1020, 1030, 1040 may take into account the system states when setting the operating points of components managed by the controllers 1010, 1020, 1030, 1040.

Figure 46:
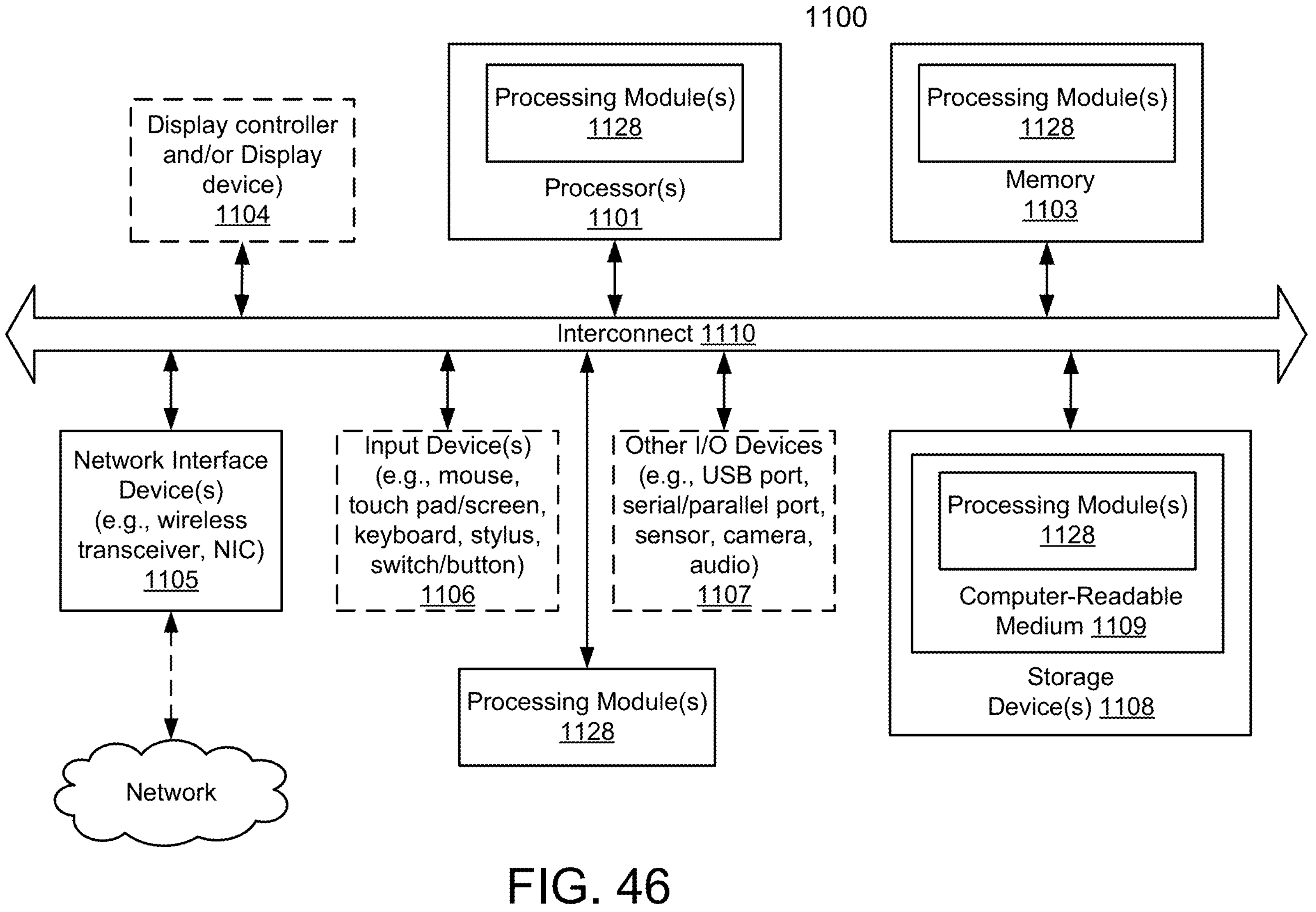
FIG. 46 is a block diagram of a data processing system used to orchestrate substantially continuous material removal by a material removal system, according to one or more embodiments of the disclosure.

The one or more system orchestrator(s) 1000 may include computing hardware (e.g., processors, memory, storage devices, communication devices, other types of hardware devices including circuitry, etc.) and/or computing instructions (e.g., computer code) that when executed by the one or more system orchestrator(s) 1000 to provide its functionality. The one or more system orchestrator(s) 1000 and/or any of the controllers 1010, 1020, 1030, 1040 include a data processing system as illustrated in FIG. 46. FIG. 46 is a block diagram illustrating an example of a data processing system (e.g., a computing device) according to one embodiment. System 1100 may include any number of components. These components may be implemented with integrated circuits (ICs), portions thereof, discrete electronic devices, or other modules adapted to a circuit board such as a motherboard or add-in card of the computer system, or as components otherwise incorporated within a chassis of the computer system. Note also that system 1100 is intended to show a high level view of many components of the computer system. However, it is to be understood that additional components may be present in certain implementations and furthermore, different arrangement of the components shown may occur in other implementations. System 1100 may represent a desktop, a laptop, a tablet, a server, a mobile phone, a media player, a personal digital assistant (PDA), a personal communicator, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

System 1100 may include processor 1101, memory 1103, and devices 1105-1108 via a bus or an interconnect 1110. Processor 1101 may represent a single processor or multiple processors with a single processor core or multiple processor cores included therein. Processor 1101 may represent one or more general-purpose processors such as a microprocessor, a central processing unit (CPU), or the like. More particularly, processor 1101 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1101 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1101, which may be a low power multi-core processor socket such as an ultra-low voltage processor, may act as a main processing unit and central hub for communication with the various components of the system. Such processor can be implemented as a system on chip (SoC). Processor 1101 is configured to execute instructions for performing the operations and steps discussed herein. System 1100 may further include a graphics interface that communicates with optional graphics subsystem 1104, which may include a display controller, a graphics processor, and/or a display device.

Processor 1101 may communicate with memory 1103, which in one embodiment can be implemented via multiple memory devices to provide for a given amount of system memory. Memory 1103 may include one or more volatile storage (or memory) devices such as random access memory (RAM), dynamic RAM (DRAM), synchronous DRAM (SDRAM), static RAM (SRAM), or other types of storage devices. Memory 1103 may store information including sequences of instructions that are executed by processor 1101, or any other device. For example, executable code and/or data of a variety of operating systems, device drivers, firmware (e.g., input output basic system or BIOS), and/or applications can be loaded in memory 1103 and executed by processor 1101. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1100 may further include IO devices such as devices (e.g., 1105, 1106, 1107, 1108) including network interface device(s) 1105, optional input device(s) 1106, and other optional IO device(s) 1107. Network interface device(s) 1105 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1106 may include a mouse, a touch pad, a touch sensitive screen (which may be integrated with a display device of optional graphics subsystem 1104), a pointer device such as a stylus, and/or a keyboard (e.g., physical keyboard or a virtual keyboard displayed as part of a touch sensitive screen). For example, input device(s) 1106 may include a touch screen controller coupled to a touch screen. The touch screen and touch screen controller can, for example, detect contact and movement or break thereof using any of a plurality (e.g., two or more) of touch sensitivity technologies, including but not limited to capacitive, resistive, infrared, and surface acoustic wave technologies, as well as other proximity sensor arrays or other elements for determining one or more points of contact with the touch screen.

IO devices 1107 may include an audio device. An audio device may include a speaker and/or a microphone to facilitate voice-enabled functions, such as voice recognition, voice replication, digital recording, and/or telephony functions. Other IO devices 1107 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 1107 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1110 via a sensor hub (not shown), while other devices such as a keyboard or thermal sensor may be controlled by an embedded controller (not shown), dependent upon the specific configuration or design of system 1100.

To provide for persistent storage of information such as data, applications, one or more operating systems and so forth, a mass storage (not shown) may also couple to processor 1101. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1101, e.g., via a serial peripheral interface (SPI). This flash device may provide for non-volatile storage of system software, including a basic input/output software (BIOS) as well as other firmware of the system.

Storage device 1108 may include computer-readable storage medium 1109 (also known as a machine-readable storage medium or a computer-readable medium) on which is stored one or more sets of instructions or software (e.g., processing module, unit, and/or processing module/unit/logic 1128) embodying any one or more of the methodologies or functions described herein. Processing module/unit/logic 1128 may represent any of the components described above, such as, for example, vacuum box controller(s) 1010, vacuum source controller(s) 1020, fluid flow attenuating filter controller(s) 1030, pressure vessel controller(s) 1040, and system orchestrator(s) 1000, as described above. Processing module/unit/logic 1128 may also reside, completely or at least partially, within memory 1103 and/or within processor 1101 during execution thereof by system 1100, memory 1103 and processor 1101 also constituting machine-accessible storage media. Processing module/unit/logic 1128 may further be transmitted or received over a network via network interface device(s) 1105.

Computer-readable storage medium 1109 may also be used to store some software functionalities described above persistently. While computer-readable storage medium 1109 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1128, components and other features described herein can be implemented as discrete hardware components or integrated in the functionality of hardware components such as ASICS, FPGAs, DSPs or similar devices. In addition, processing module/unit/logic 1128 can be implemented as firmware or functional circuitry within hardware devices. Further, processing module/unit/logic 1128 can be implemented in any combination hardware devices and software components.

Note that while system 1100 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

As discussed with respect to FIG. 1, undesired material may be removed from various environments. To provide for undesired material removal a number of methods for removing undesired material may be performed using all, or a portion, of the components of the system shown in FIG. 1.

Applicant recognized that in many scenarios, undesired material may need to be removed from industrial environments as quickly as possible. The cost of shutting down reaction vessel 100 may be prohibitive. A method, as illustrated for example in FIGS. 11-23 and 48-49, in accordance with embodiments disclosed herein may provide for substantially continuous removal of undesired material using material collectors having a finite capacity for the undesired material.

The method includes, in one embodiment, replacing the material collector and disposing of the undesired material in the material collector while the replacement material collector is used to continue to remove undesired material from a reaction vessel 100. In this manner, material collectors may be cycled into and out of the material removal system while the material removal system substantially continuously removes undesired material.

Figure 10:
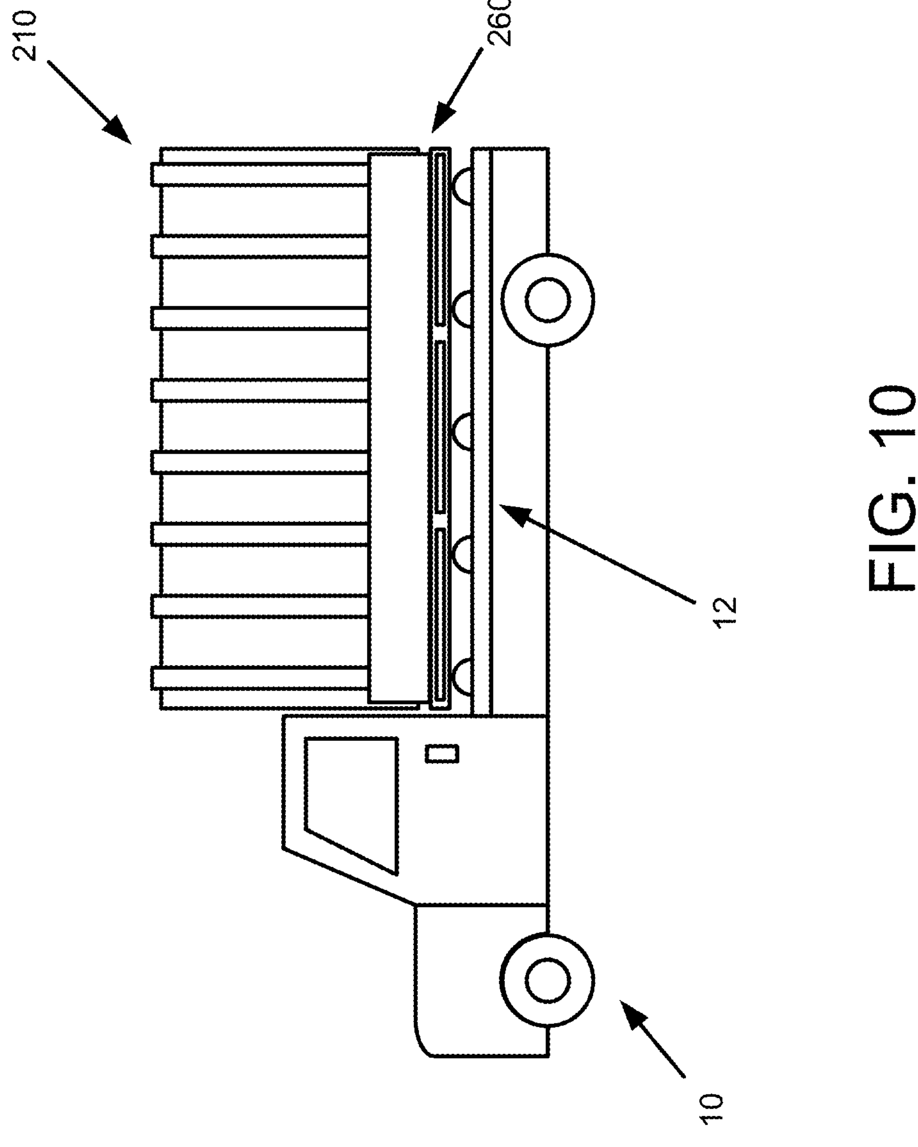
FIG. 10 is a diagram of a transportation vehicle to transport components of a material removal system, according to one or more embodiments of the disclosure.

The method also includes, in one embodiment, transporting material collectors to the industrial environment and removing filled material collectors from the industrial environment to a disposal site as illustrated in FIGS. 11-23. The material collectors may be transported using a transportation vehicle 10 as illustrated in FIG. 10. Transportation vehicle 10 may include bed 12 for transporting vacuum box 210. Bed 12 may include rollers or other features for enabling vacuum box 210 and carrier 260 to roll on the bed. Bed 12 may be elevated to place bed at an angle to facilitate loading and unloading of carrier 260 with vacuum box 210 positioned on it. For example, transportation vehicle 10 may include hydraulic elements or other structures for elevating bed 12.

Transportation vehicle 10 may also include winch 14. Winch 14 may allow for carrier 260 with vacuum box 210 positioned on it to be restrained in place and/or loaded or unloaded. For example, winch may include a line (e.g., a wire, chain, rope, etc.) coupled to a motor that allows for the line to be extended and retracted. When the line is attached to carrier 260, carrier 260 may be held fixedly on bed 12, may be allowed to roll off of bed 12, or may be pulled onto bed 12.

Figure 11:
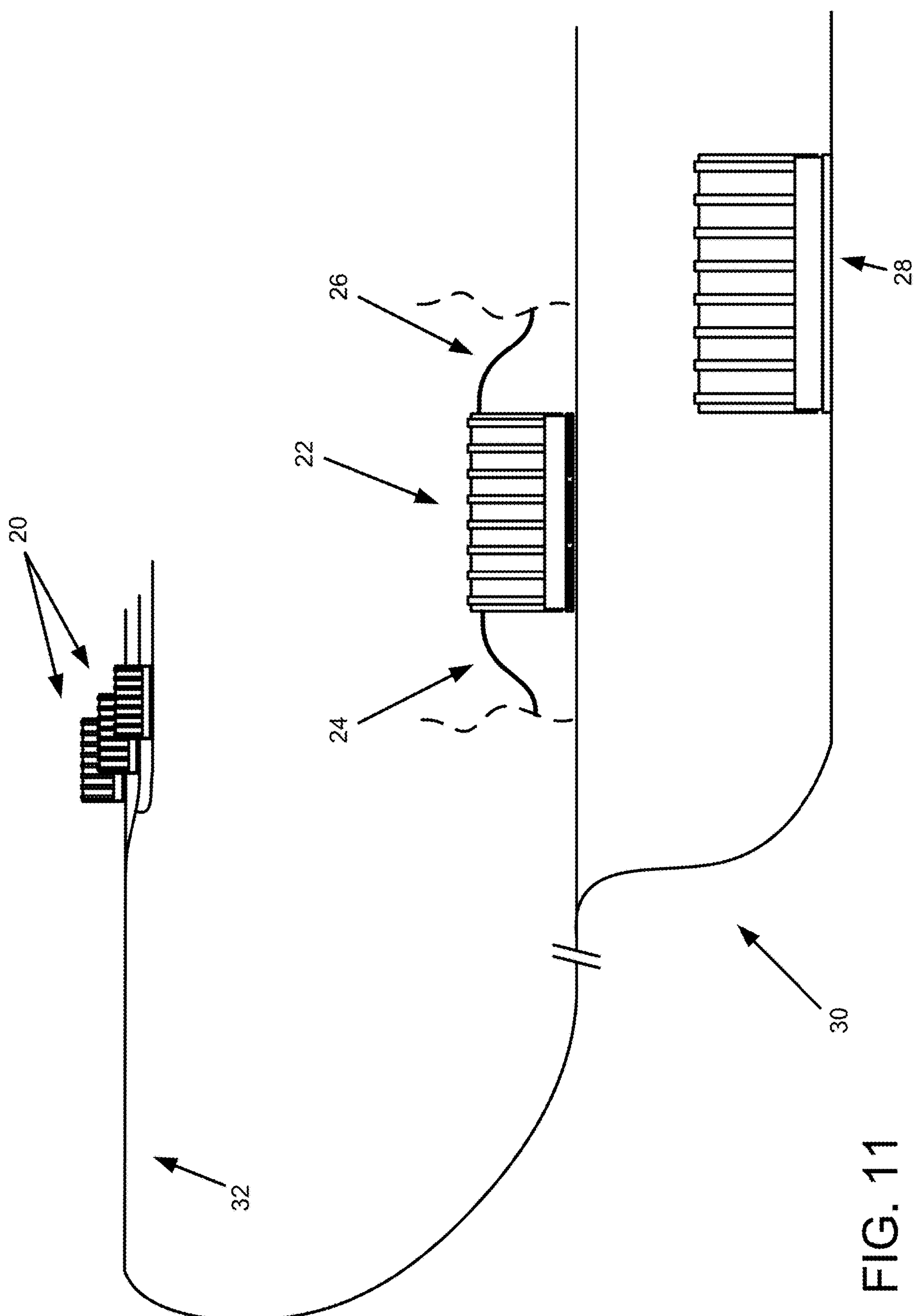
FIGS. 11-23 are simplified diagrams of replacement of material collectors of material removal system to support substantially continuous removal of material, according to one or more embodiments of the disclosure.
Figure 47:
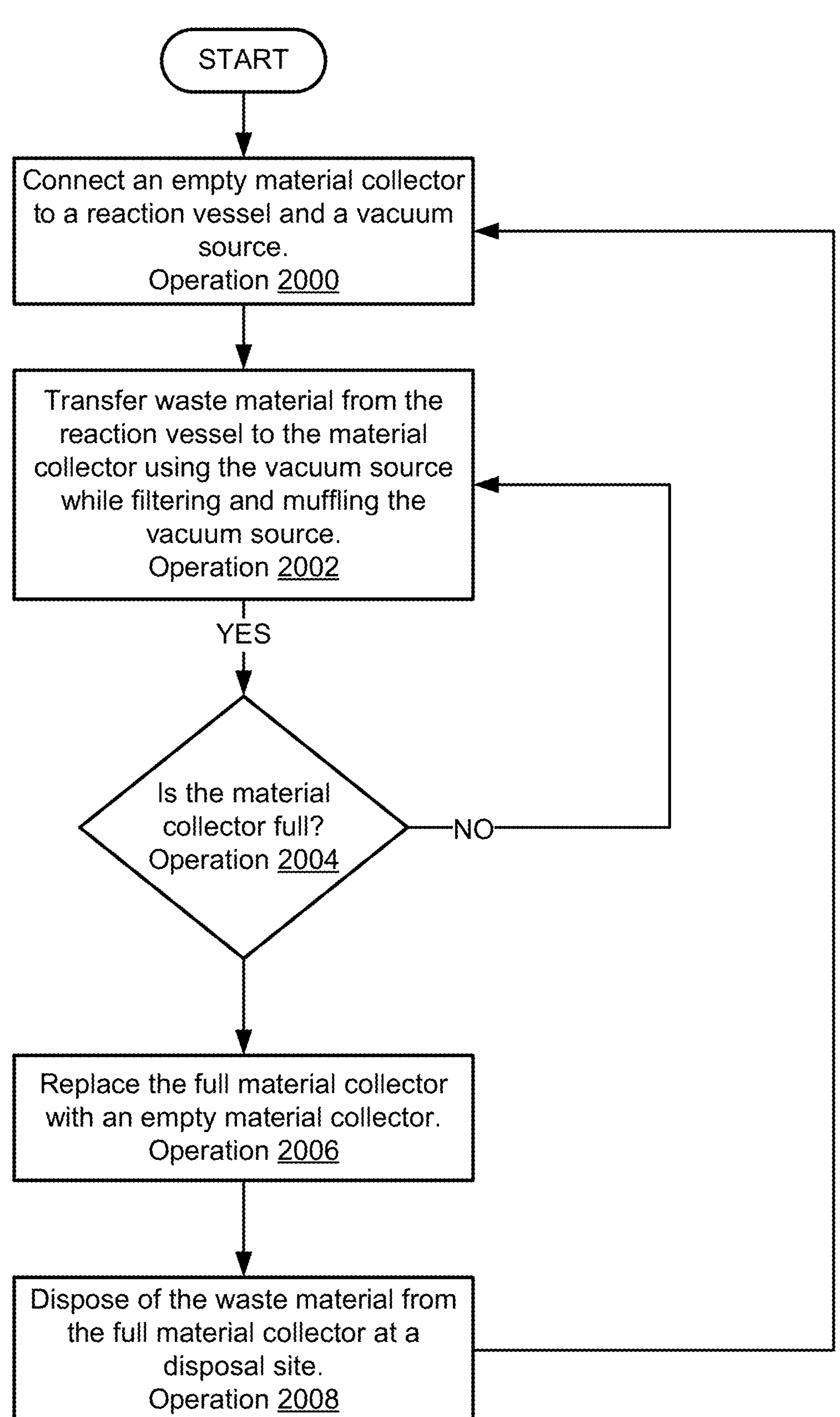
FIG. 47 is a flow diagram of substantially continuous removal of undesired material, according to one or more embodiments of the disclosure.
Figure 48:
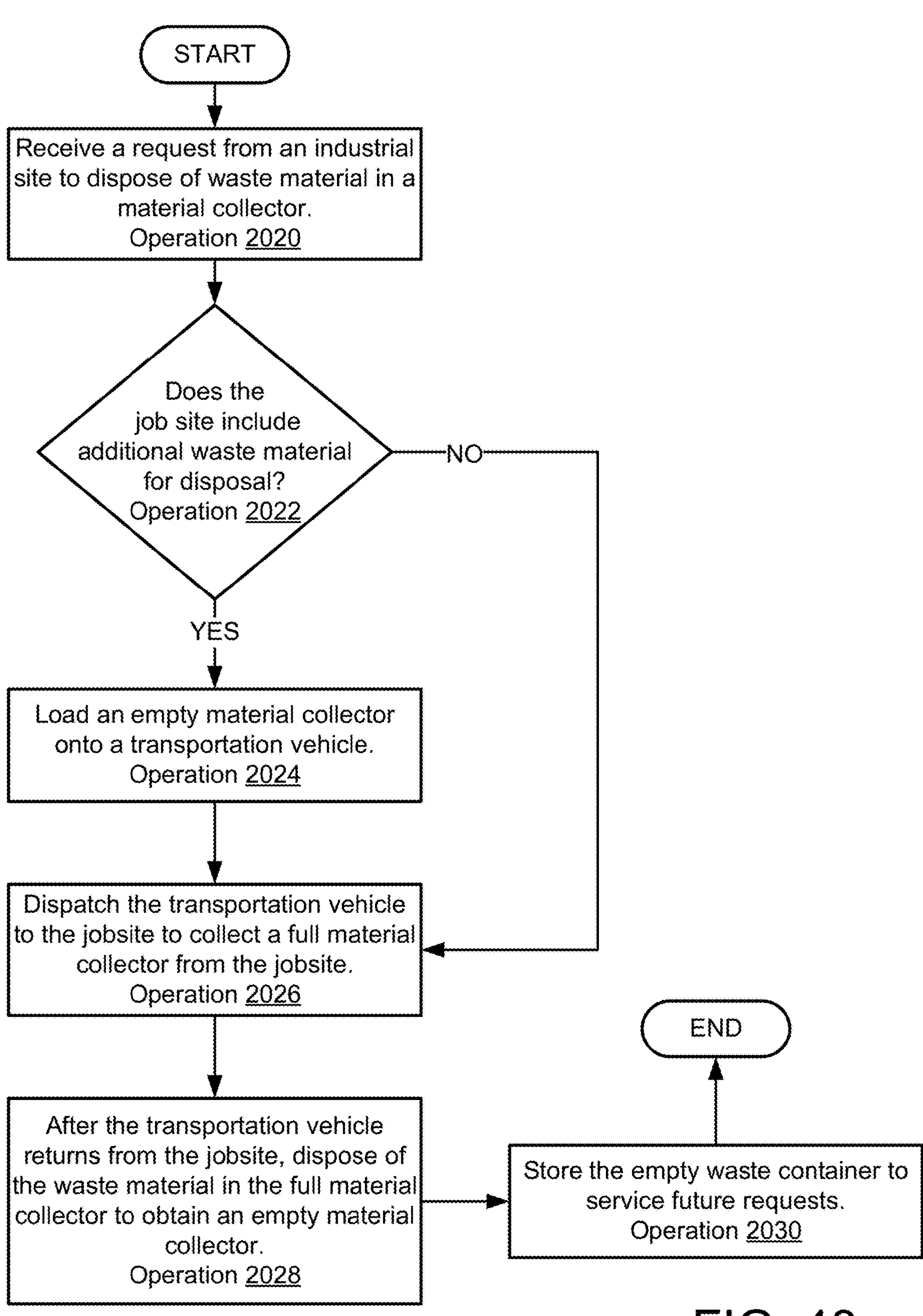
FIG. 48 is a flow diagram of undesired material removal with continuously replaced material collectors emptied and reused for material removal, according to one or more embodiments of the disclosure.

With reference to FIGS. 11 and 47, the method may include, at operation 2000, deploying vacuum boxes 22 (or another type of material collector) to industrial environment 30. Vacuum box may be pneumatically connected to a reaction vessel at industrial environment 30 through hose 24 and pneumatically connected a vacuum source through hose 26. Once pneumatically connected at operation 2002, high-pressure vacuum may be applied to vacuum box 22 to begin to transfer undesired material to vacuum box 22. While the vacuum box is being filled at operation 2004, its fill level may be monitored to determine whether it is (or will be) full. After some time, vacuum box 22 may begin to be filled. Prior to being completely filled, vacuum box 28 may also be deployed to industrial environment 30 with transportation vehicle 10.

Figure 12:
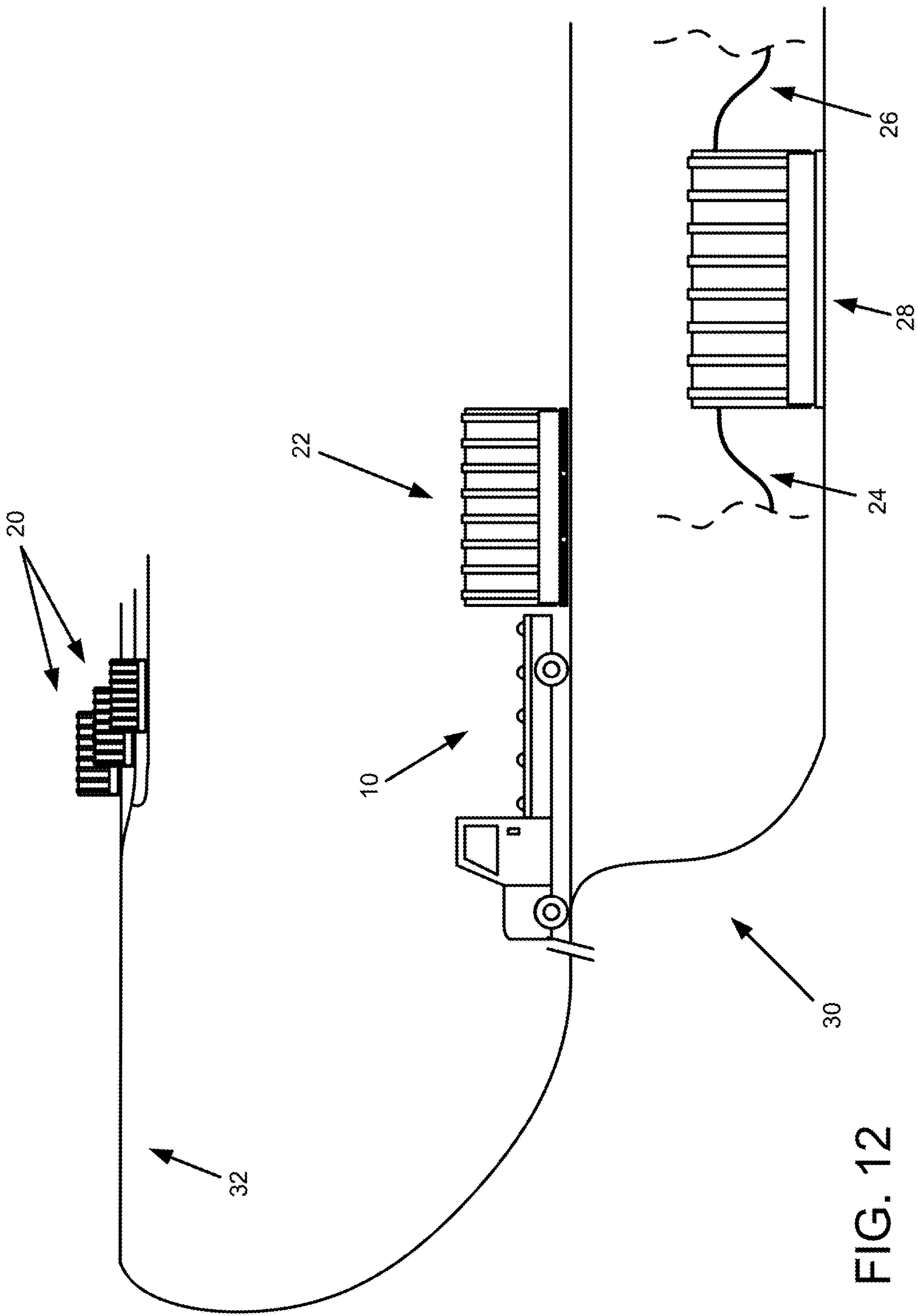

When vacuum box 22 is full at operation 2006, the hoses 24, 26 may be disconnected from vacuum box 22 and may be connected to vacuum box 28 to replace the vacuum box in the material removal system deployed to industrial environment 30, as illustrated in FIG. 12. While vacuum box 28 is used to continue to transfer undesired material, transportation vehicle may position itself with vacuum box 22.

Figure 13:
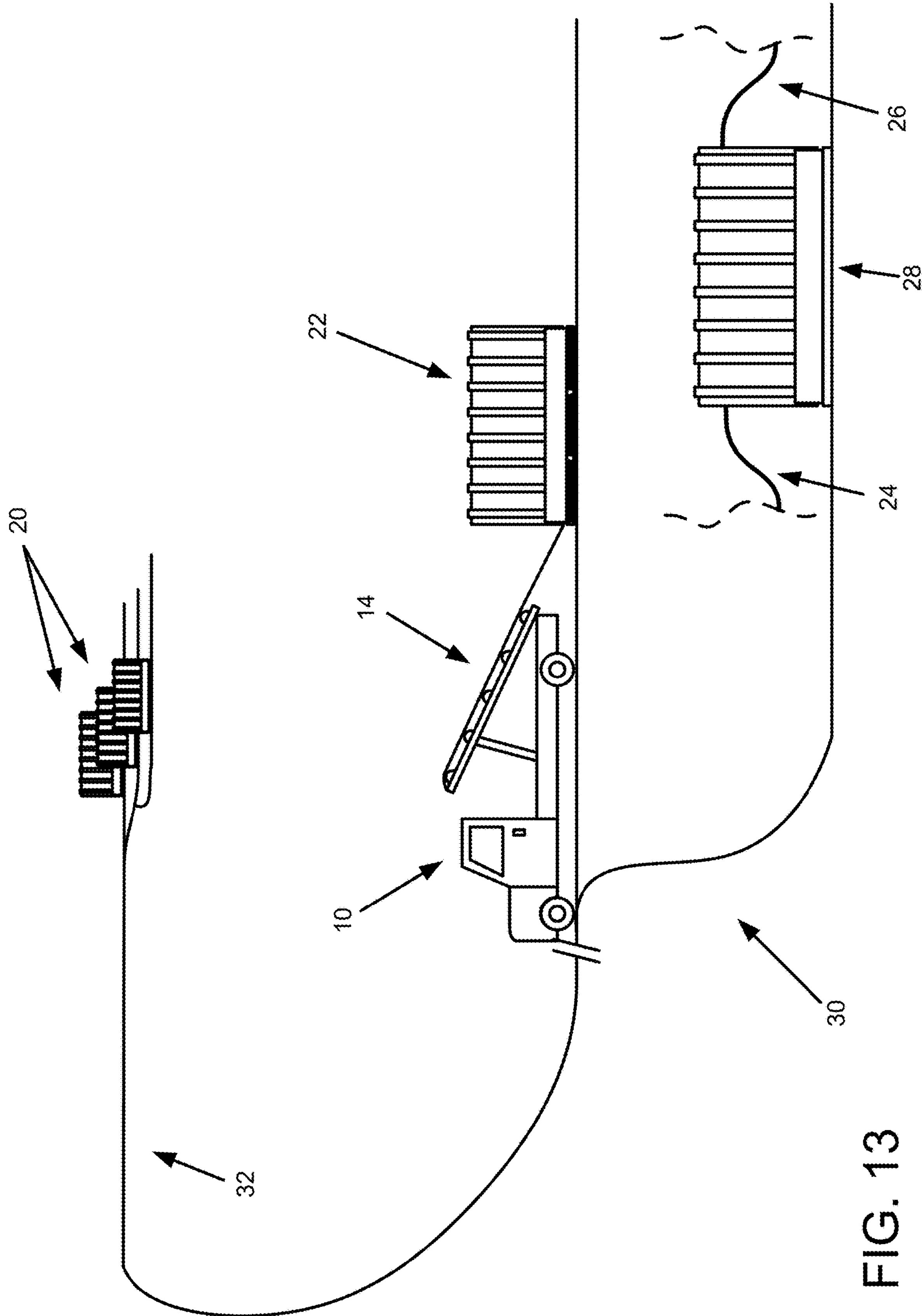
Figure 14:
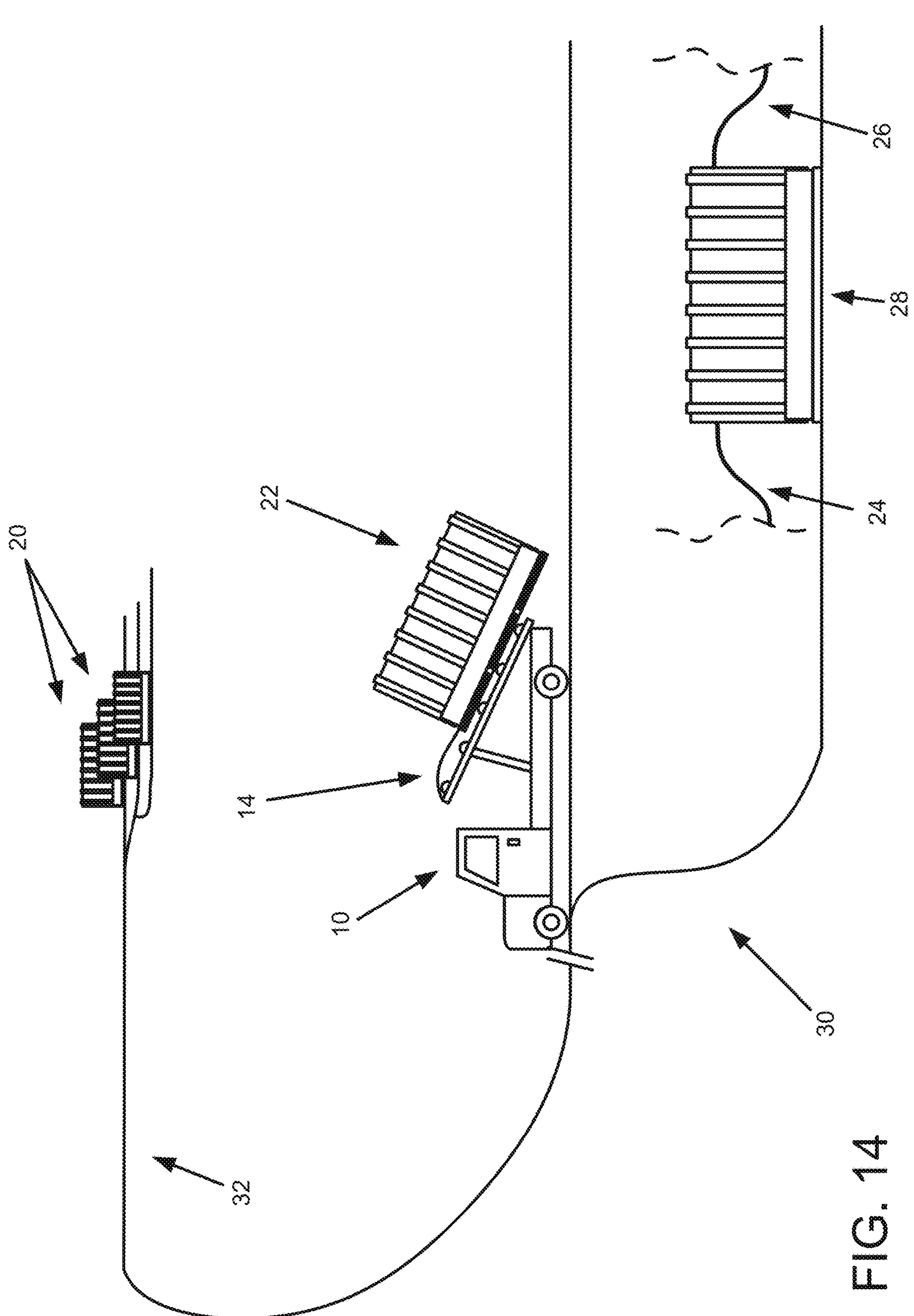
Figure 15:
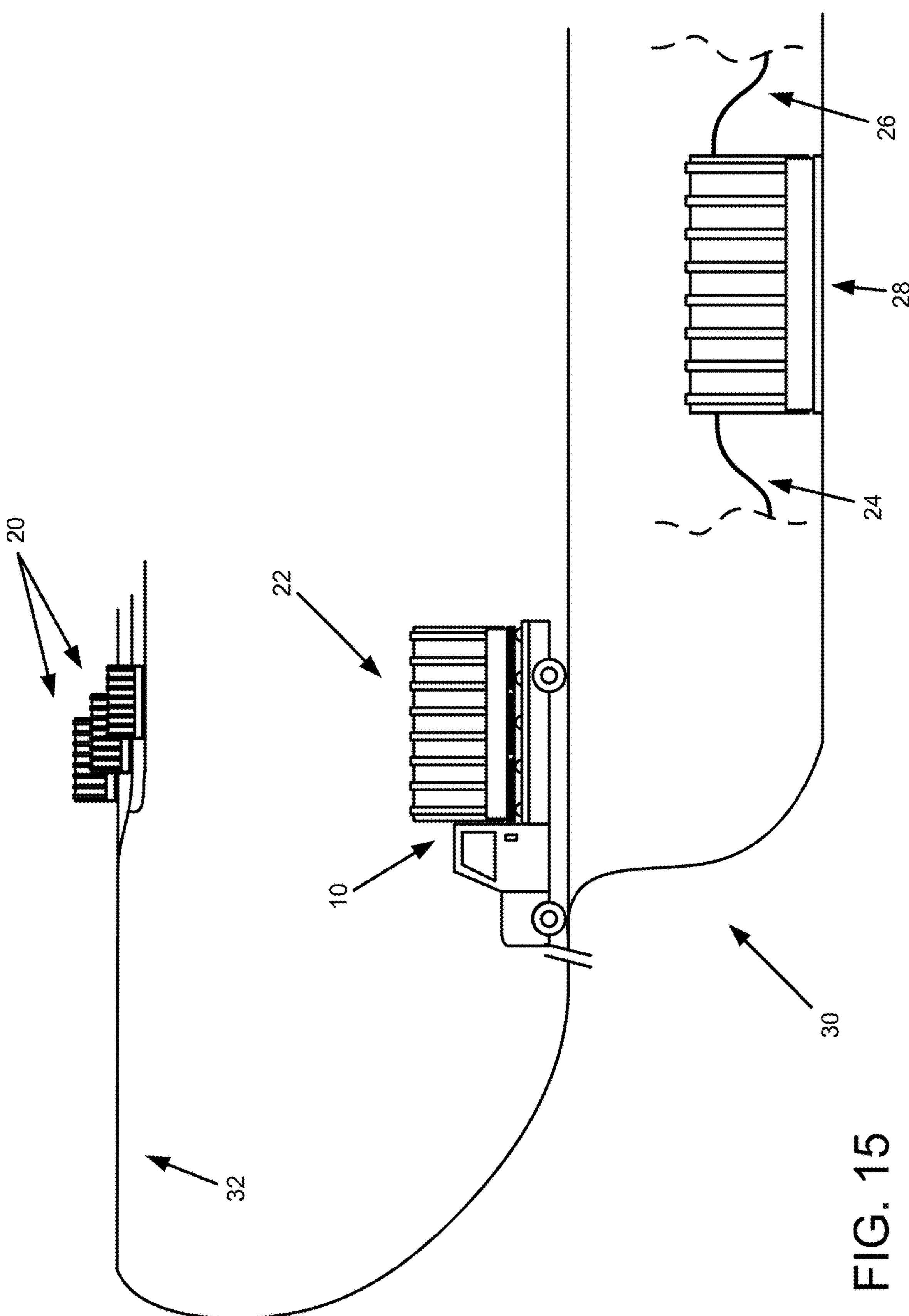

With reference to FIGS. 13-15, transportation vehicle 10 may elevate its bed and deploy (e.g., extend and attach) the line of winch 14 to vacuum box 22. Once the line of winch 14 is deployed, the line may be retracted to pull vacuum box 22 on to bed 12. The line may keep vacuum box 22 secured on bed 12 during transportation from industrial environment 30.

Figure 16:
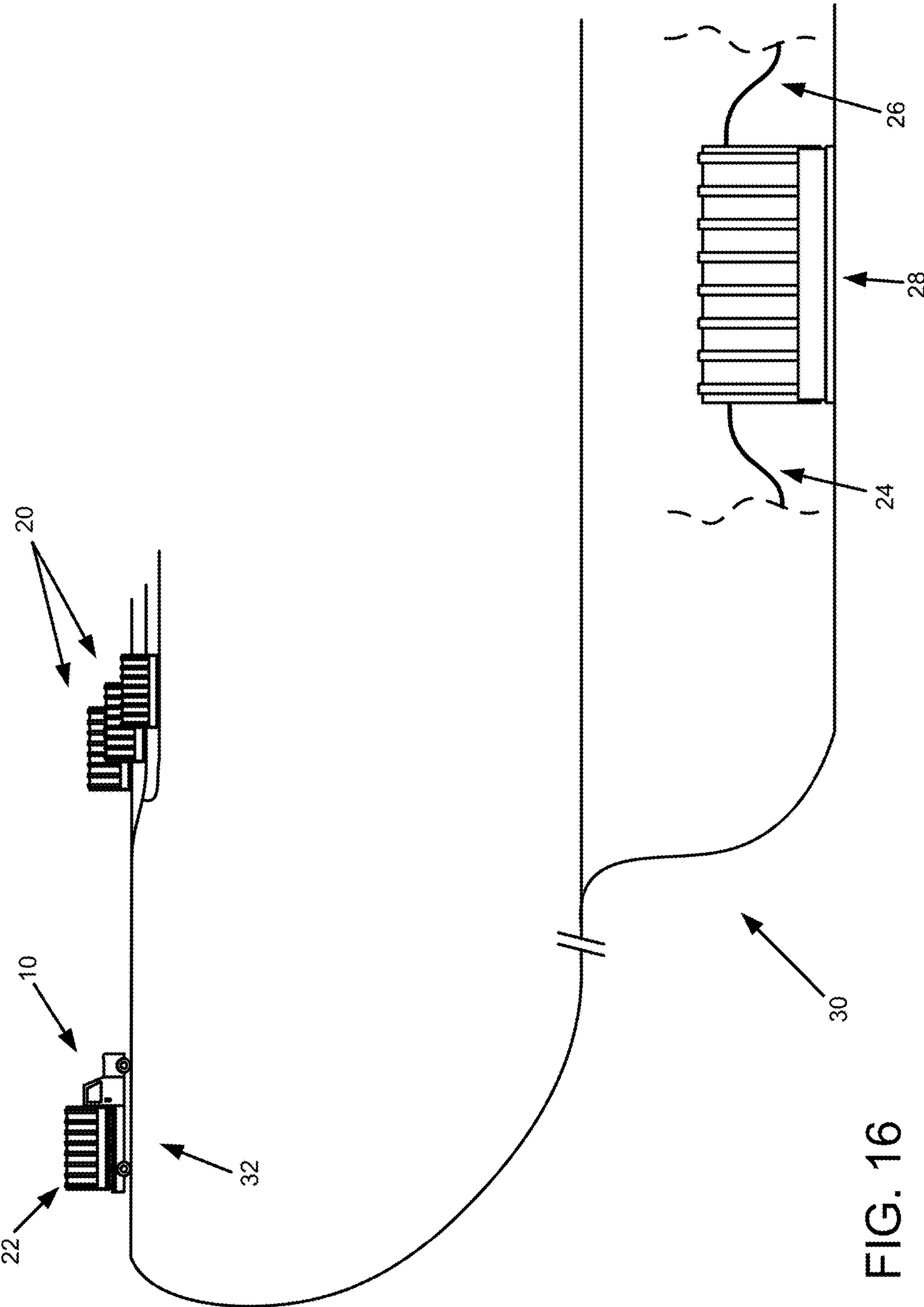
Figure 17:
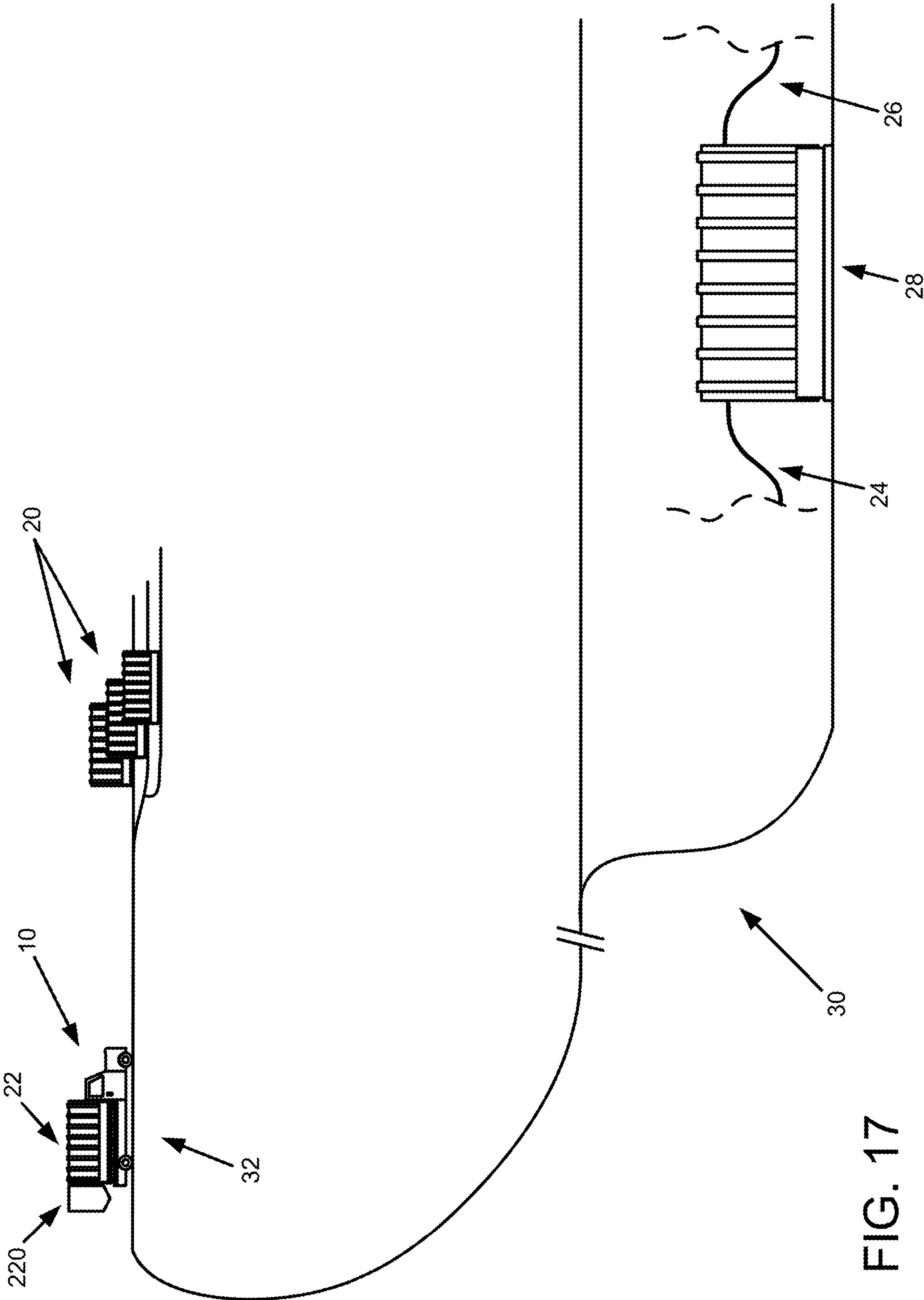
Figure 18:
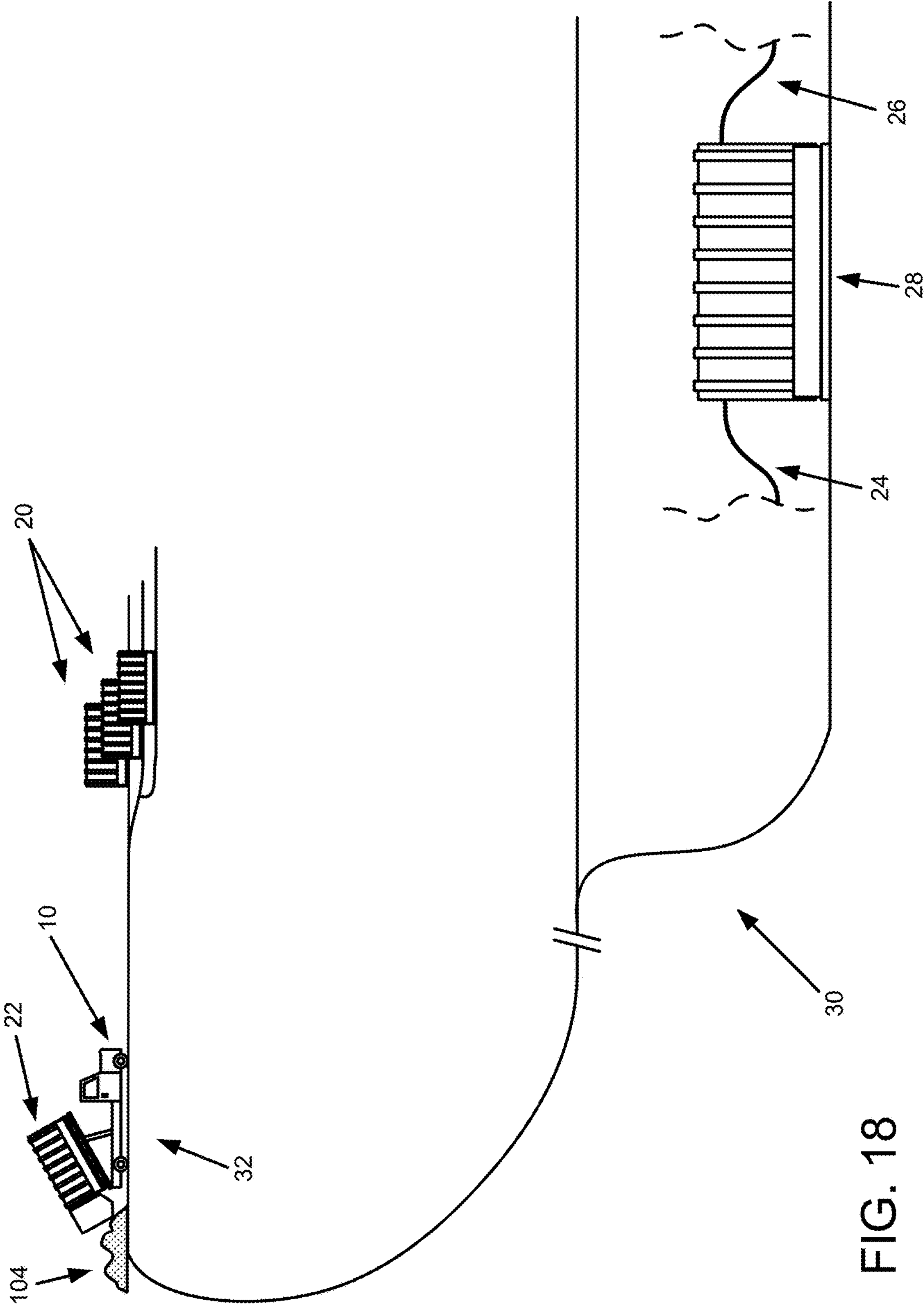
Figure 19:
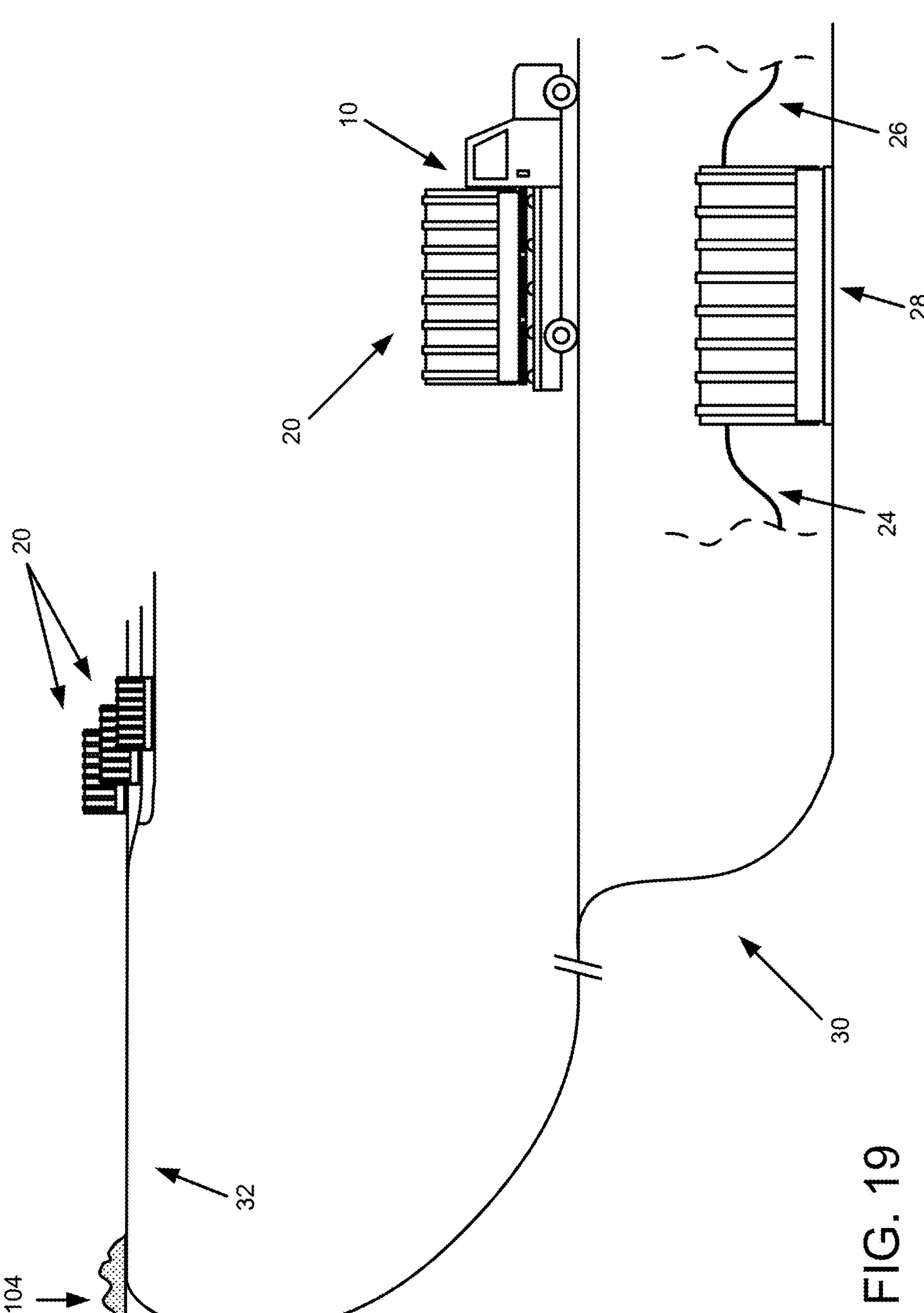
Figure 20:
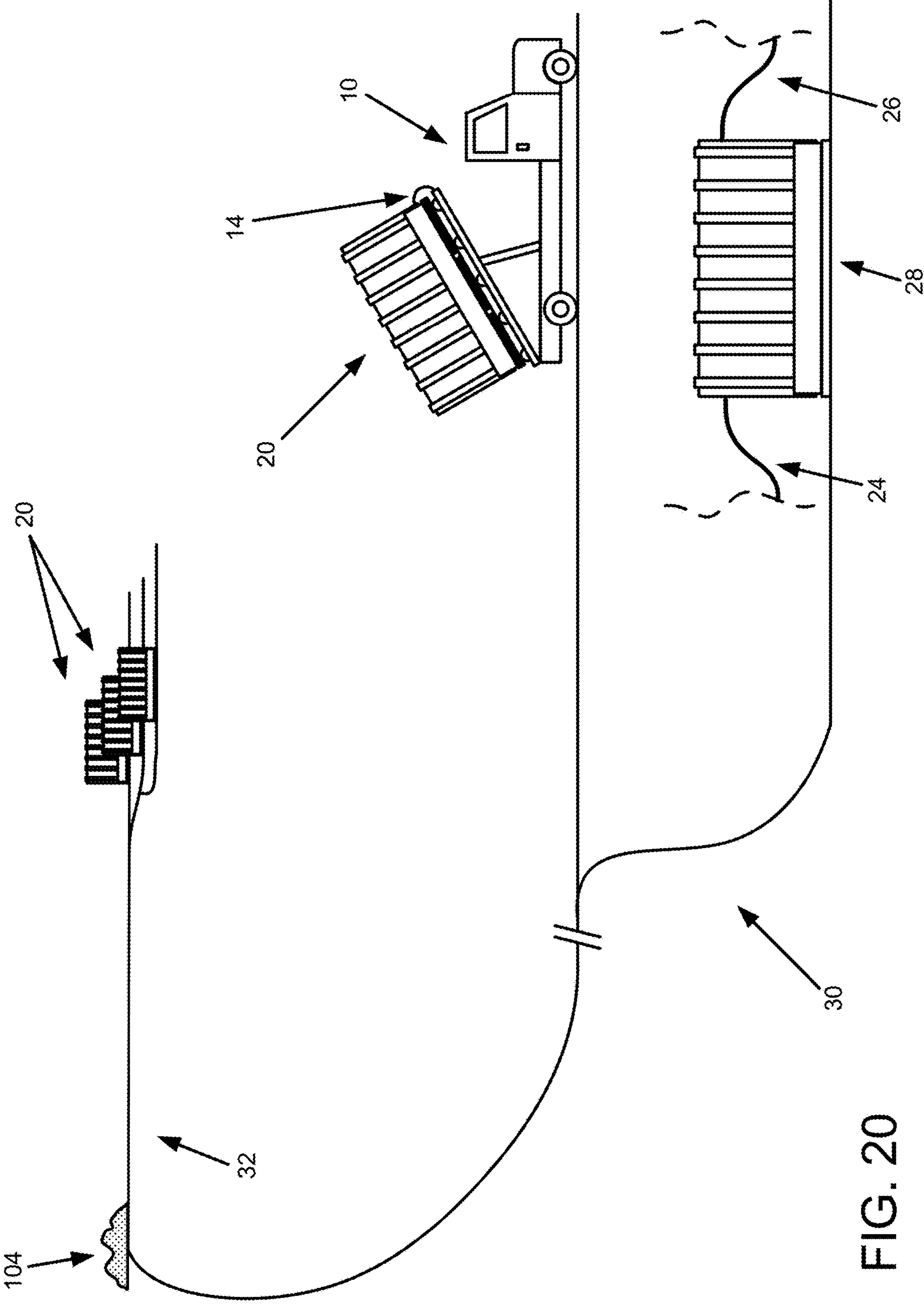
Figure 21:
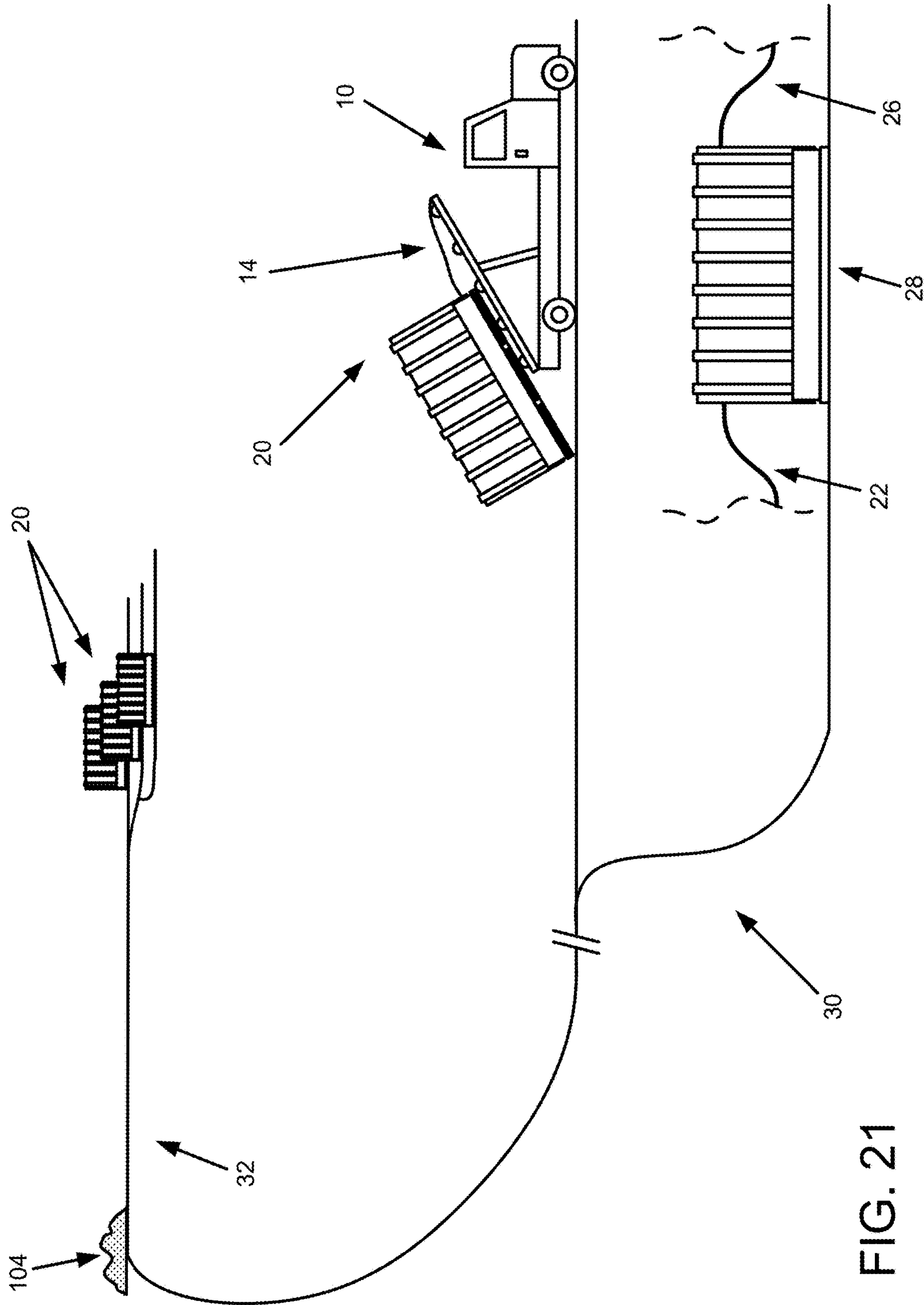
Figure 22:
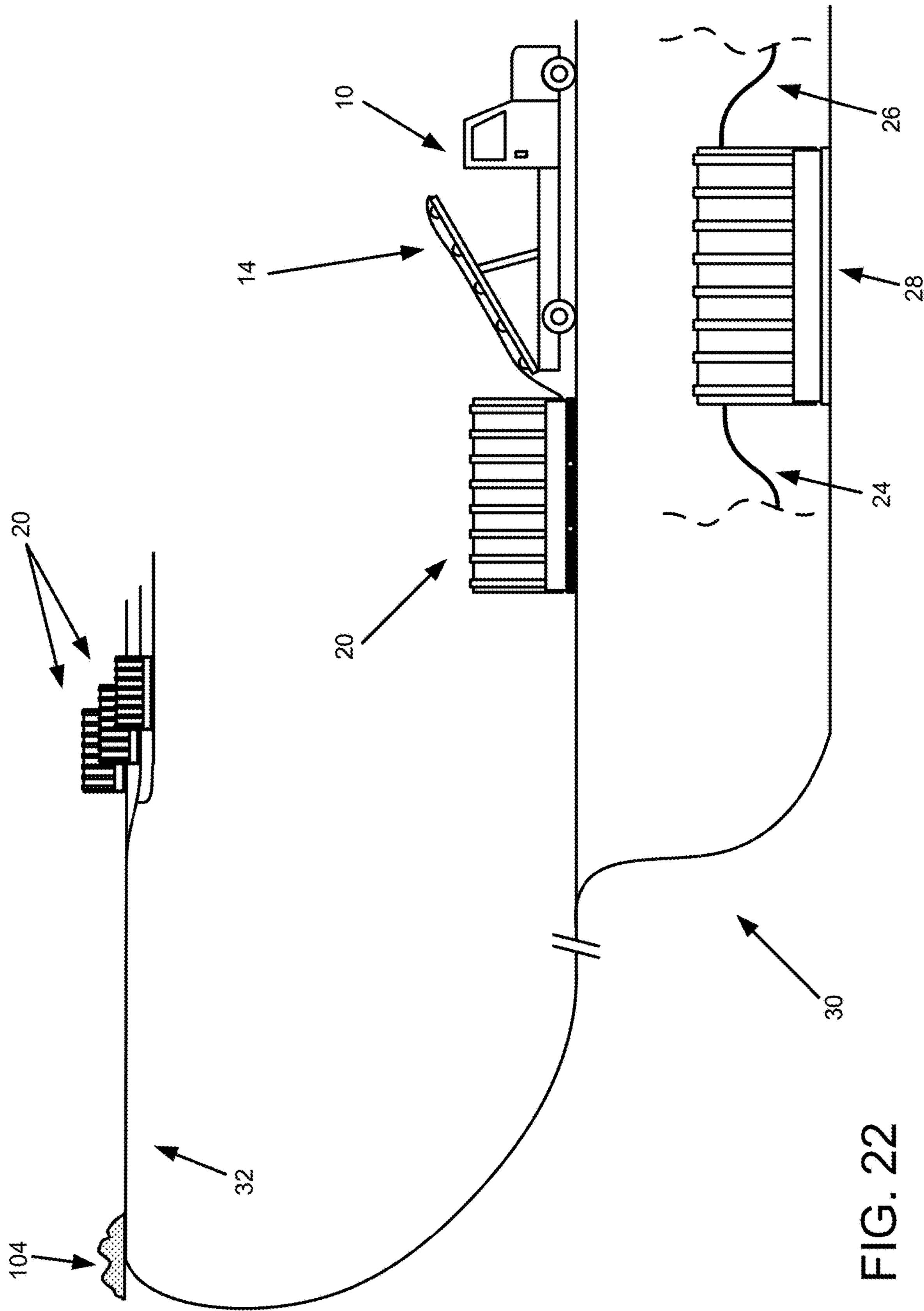
Figure 23:
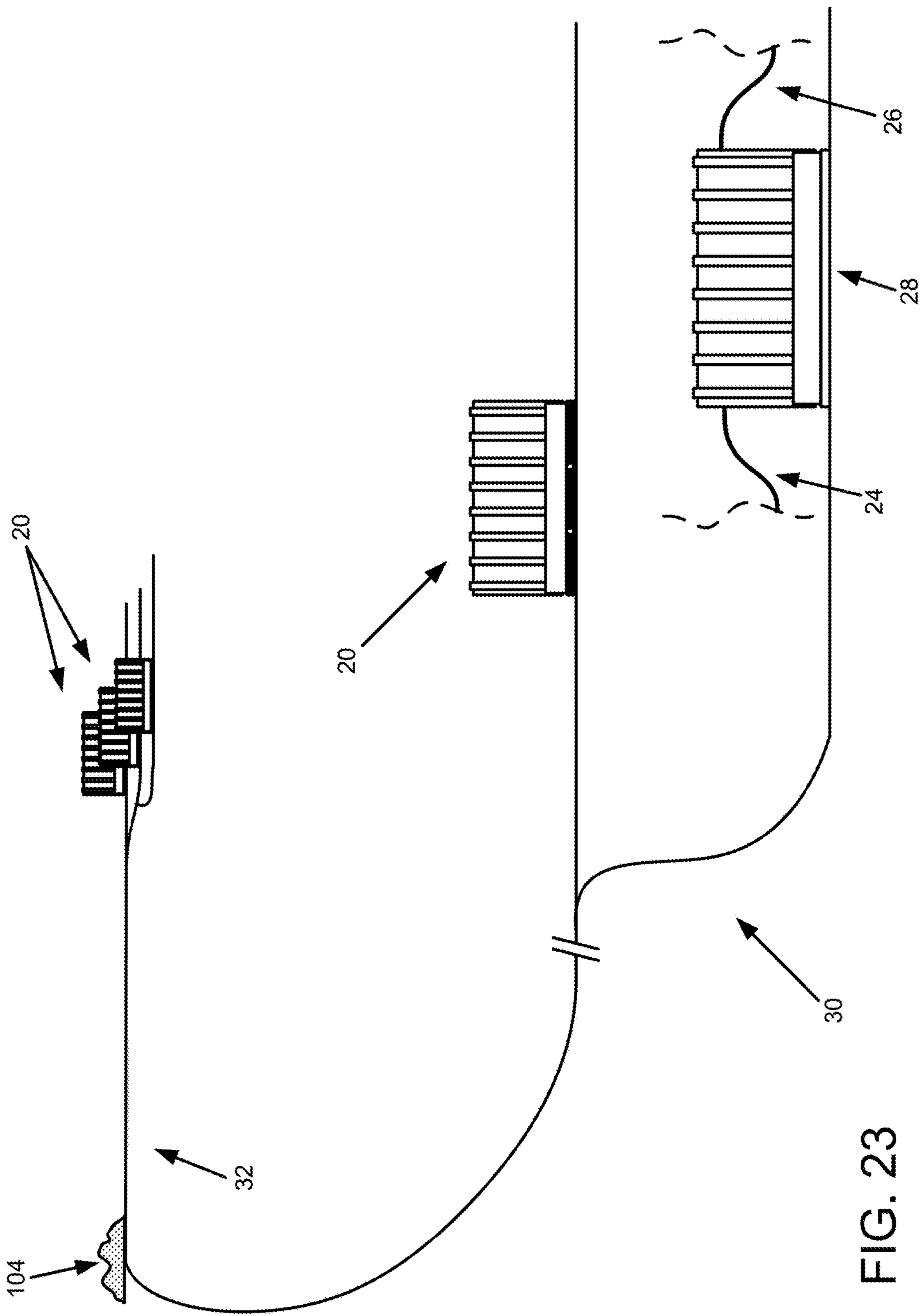
Figure 24:
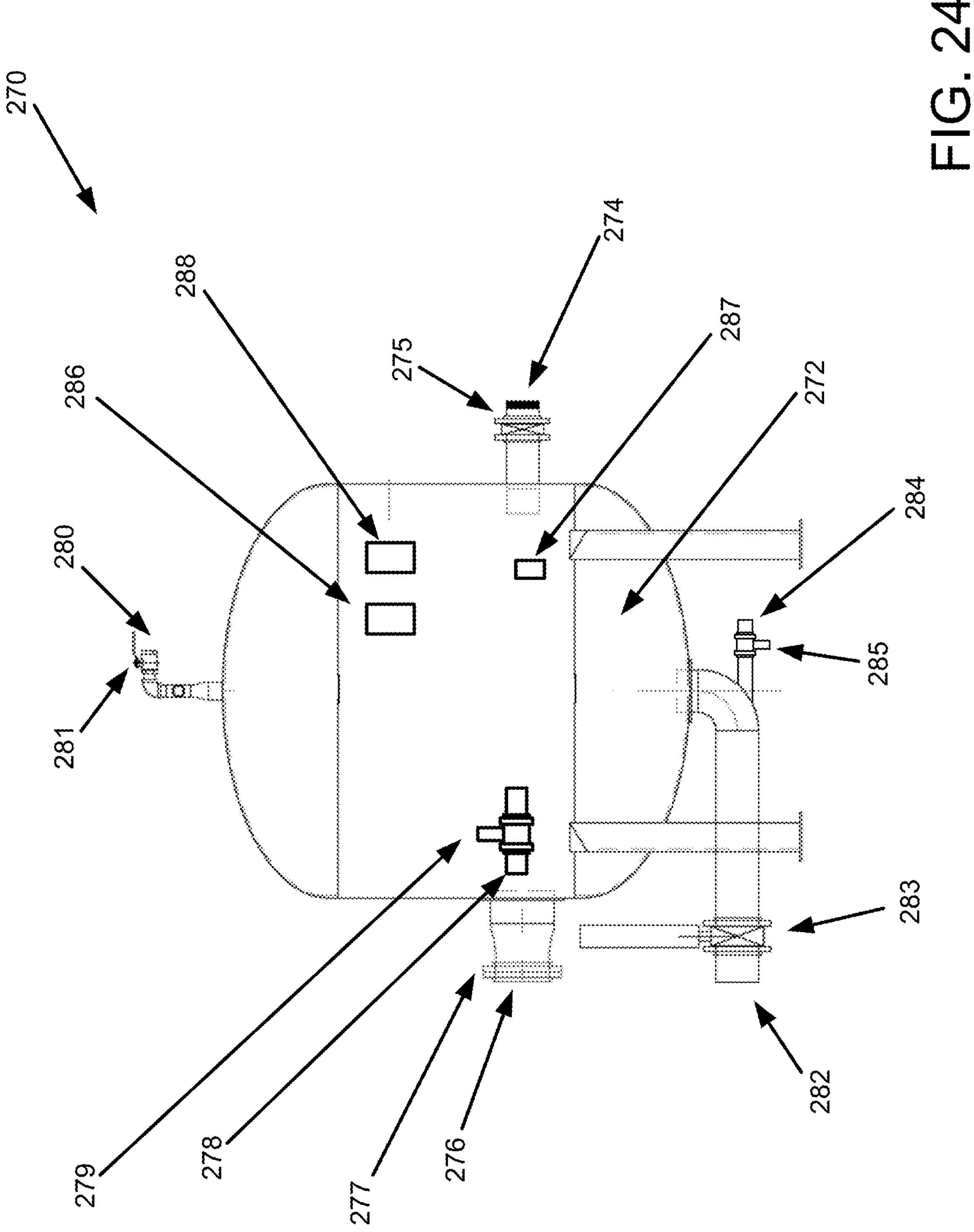
FIGS. 24-27 are diagrams of a material collector include a pressure vessel of a material removal system, according to one or more embodiments of the disclosure.

With reference to FIGS. 16-18, vacuum box 22 may be transported to disposal site 32 by transportation vehicle 10 at operation 2008. At disposal site 32, door 220 may be opened. While door 220 is opened, bed 12 may be elevated. Once elevated, gravity force may cause undesired material 104 to be dumped out of vacuum box 22. After undesired material 104 is dumped, vacuum box 22 may be cleaned using water jet, other cleaning method, or may not be cleaned.

With reference to FIGS. 19-23, after vacuum box 28 begins to be filled, operators at industrial environment 30 may request that vacuum box 28 be replaced. To replace vacuum box 28, transportation vehicle 10 may transport an empty vacuum box 20 to industrial environment 30. At industrial environment 30, transportation vehicle 10 may elevate bed 12 and position empty vacuum box 20 with the line of winch 14.

To replace vacuum box 28, in one embodiment, a removal request for vacuum box 28 is sent to a vacuum box providing entity (e.g., a company). A replacement request for vacuum box 28 may also be sent. The entity may receive these requests at operations 2020 and 2022. The entity may have personnel that service these requests by obtaining empty vacuum box 20 (which may be vacuum box 22 after it is emptied), transporting it to the industrial environment 30, and unloading it at operations 2024-2026.

Following placement of empty vacuum box 20, empty vacuum box 20 may replace vacuum box 28 in the material removal system using hoses 24, 26 and vacuum box 28 may be removed to disposal site 32 as described with respect to FIGS. 12-18. In one embodiment, vacuum box 28 is removed by the personnel from the entity that dropped off empty vacuum box 20 as part of servicing the removal request and replacement request.

The personnel that dropped off the vacuum box 28 at operations 2028-2030 may also remove vacuum box 28 from industrial environment 30, transport it to disposal site 32 with transportation vehicle 10, dispose of the undesired material in vacuum box 28 at industrial environment 30, and store vacuum box 28 for future use. In this manner, vacuum boxes may continuously be cycled through a material removal system. Consequently, the material removal system may substantially continuously remove undesired material while the undesired material is transported to disposal site 32.

Once a material removal system is deployed or a material collector in the material removal system has been replaced, the material removal system may be used to perform a method for removing undesired material (or continue removing undesired material) from an industrial environment.

The method for removing undesired material, in one embodiment, includes generating a high-pressure vacuum of fluid flow in an interior of a material collector when connected to the reaction vessel by a pneumatic connection which extends between one or more of the zones and the interior. The vacuum source may draw gases out of the material collector to establish the high-pressure vacuum in the material collector. The high-pressure vacuum of fluid flow may be generated by a vacuum source that is driven by a fluid flow from a mobile fluid supply. The flow of fluid from the mobile fluid supply may be, for example, a flow of compressed air or other gas.

The vacuum in the material collector may induce a fluid flow (e.g., a vacuum induced fluid flow) from a reaction vessel or other structure to which the material collector is pneumatically connected through a pneumatic connection. The pneumatic connection may connect an interior of the material collection to zones of the reaction vessel.

The high-pressure vacuum may be generated by driving a Venturi mechanism. The Venturi mechanism may be driven with a fluid flow from the mobile fluid supply. Driving the Venturi mechanism may generate the vacuum induced fluid flow. The Venturi mechanism may be connected to the material collector and mobile fluid supply with separate pneumatic connections. In one embodiment, the high-pressure vacuum is generated by driving at least two Venturi mechanisms. The Venturi mechanisms may be pneumatically connected to the material collector in parallel to cooperatively generate the high-pressure vacuum.

The method may further include transferring, with the high-pressure vacuum of the fluid flow, the waste material through the pneumatic connection to collect a majority of the waste material from the zones into the interior of the material collector. The waste material may be an undesired material in the zones of the reaction vessel. The waste material may be transferred by applying suction, with the high-pressured vacuum, to the waste material to draw it into the pneumatic connection, through the pneumatic connection, and into the interior of the material collector. When the waste material is transferred into the interior, a majority of the waste material may be trapped in the material collector while a minority of the waste material may be drawn out of the interior and into the vacuum source with the vacuum induced fluid flow.

While the waste material is transferred, in one embodiment, the method further includes monitoring the fill level of the majority of the waste material in the interior of the material collector to determine a time to stop the transferring of the waste material. The fill level may be monitored using one or more of a temperature, a workload, and a visual indicator. The temperature, workload, and visual indicator may be used to infer the fill level of the material collector. The stop time may be determined by comparing the inferred fill level to a threshold level (e.g., a maximum fill level) or other criteria. The stop time may be when the fill level meets or exceeds the threshold level.

The method further includes, in one embodiment, removing the high-pressure vacuum of fluid flow from the interior of the material collector based on the stop time, replacing the material collector with a standby material collector when the high-pressure vacuum of fluid flow is removed, and applying the high-pressure vacuum of fluid flow to an interior of the standby material collector after replacing the material collector. The high-pressure vacuum of the fluid flow may be removed when the inferred fill level meets or exceeds the threshold (or other criteria). The fluid flow may be removed by restricting or eliminating the fluid flow used to drive the vacuum source. The material collector may be replaced with the standby material collector by disconnecting pneumatic connections to the material connector and connecting the disconnected pneumatic connections to the standby material collector thereby replacing the material collector with the standby material collector in the fluid flow path. The high-pressure vacuum of fluid flow may be applied to the interior of the standby material collector by resuming the fluid flow used to drive the vacuum source after the material collector is replaced.

The waste material may be transferred by receiving the transferred waste material to two or more locations in the interior of the material collector and moving a portion of the transferred waste material away from the two or more locations in the interior when the transferred waste material is received. The transferred waste material may be received to two or more locations by splitting the high-pressure vacuum of fluid flow to the two or more locations when it enters the interior of the material collector thereby causing the majority of the waste material to be deposited to the two or more locations. The portion of the transferred waste material may be moved by applying force to the transferred waste material directing it away from the two or more locations. In one embodiment, the waste is transferred by driving an auger positioned in the interior of the material collector. The auger may apply the force to the waste material thereby moving it away from the two or more locations. The auger may be driven by a drive unit positioned outside of the interior. The drive unit may apply force (e.g., rotational force) to the auger to drive it.

The method further includes, in one embodiment, monitoring a fill level of the majority of the waste material in the interior of the material collector. The monitoring may be used to determine whether the fill level meets selected criteria (e.g., a threshold fill level). The fill level may be monitored by measuring one or more physical properties (e.g., pressures, flow rates, temperatures, distances, etc.) usable to infer the fill level. The fill level may be used to determine when to discharge the waste material based on the selected criteria. The selected criteria may be, for example, a quantity of the waste material in the interior.

When the fill level meets the selected criteria, pressure in the interior may be equalized from the high-pressure vacuum to an ambient pressure at a predetermined rate to initiate discharge of the majority of the waste material from the interior. The pressure in the interior may be equalized by allowing fluid from an ambient environment to flow into the interior and preventing the high-pressure vacuum from being applied. The high-pressure vacuum may be prevented from being applied by pneumatically disconnecting the source of the high-pressure vacuum from the interior of the material collector. For example, a control valve between the vacuum source and material collector may be closed, the operation of the vacuum source may be suspended, etc.

After pressure is equalized to ambient pressure, the pressure in the interior may be pressurized from the ambient pressure to an elevated pressure above the ambient pressure to increase a rate of the discharge. The pressure may be elevated by pumping a fluid into the interior. Pressurizing the interior may increase the rate of discharge of the waste material out of the interior.

The pressure in the interior may be pressurized above ambient by pumping a fluid into the interior of the material collector. The fluid may be pumped using a supply of compressed fluid pneumatically connected to the interior of the material collector. A control valve between the compressed fluid and the material collector may be opened while other pneumatic connections to the material collector may be closed with other control valves thereby causing the compressed fluid to flow into the interior.

To further increase the rate of discharge of the waste material, a rate of an assist flow may be increased. The assist flow rate may be increased by reducing a restriction that limits a rate of the assist flow. For example, the restriction may be a control valve between the assist flow and a source of compressed fluid. The control valve may be opened to increase the rate of the assist flow.

The method may further include filtering a minority of the waste material from the fluid flow after passage through the material collector with a fluid flow attenuating filter in fluid communication with the material collector and prior to discharge into an ambient environment. The minority of the waste material may be filtered by forcing the fluid flow through a filter media of the fluid flow attenuating filter prior to exhausting the fluid flow into the ambient environment. The filter media may be a porous structure with pores of a sufficiently small size and path complexity to remove the minority of the waste material from the fluid flow as it flows through the filter media.

In one embodiment, the minority of the waste material trapped in the filter media is transferred out of the filter media to refresh a filtration capacity of the filter media. The minority of the waste material may be transferred out of the filter media by jetting a fluid (e.g., compressed air) into the filter media (e.g., in a different direction from the vacuum induced fluid flow). The jetted fluid may eject the minority of the waste material from the filter media an into an interior of the fluid flow attenuating filter where it is stored away from the ambient environment. The minority of the waste material in the fluid flow attenuating filter may be transferred to the material collector through a pneumatic connection. The pneumatic connection may connect the interior of the fluid flow attenuating filter to the interior of the material collector causing the minority of the waste material to flow into the interior of the material collector through the pneumatic connection.

The method may further include attenuating sound from the high-pressure vacuum of the fluid flow with the fluid flow attenuating filter prior to the discharge of the fluid flow into ambient environment. The sound may be attenuated by reducing the rate of the fluid flow prior to exhausting it into the ambient environment. The fluid flow path may increase in cross section in the fluid flow attenuating filter thereby decreasing the flow rate of the fluid flow within the fluid flow attenuating filter. The sound may be further attenuated by dissipating the sound using baffling and/or the filter media. The baffling may be disposed between where the sound is generated and the ambient environment forcing the sound to interact with the baffling prior to release into the ambient environment. The baffling may absorb some of the acoustic energy from the sound thereby decreasing the sound level. The filter media may also dissipate the sound. The filter media may absorb some of the acoustic energy from the sound thereby decreasing the sound level. The sound may also be attenuated by distributing it over a wider area. For example, exhaust ports of the fluid flow attenuating filter may be large in size which decreases the concentration of the density of the acoustic energy of the sound after it leaves the fluid flow attenuating filter.

This application is a divisional of U.S. Non-Provisional application Ser. No. 17/811,277, filed Jul. 7, 2022, titled "SYSTEMS, METHODS, AND DEVICES FOR INDUSTRIAL TOWER WASTE EXTRACTION," which claims priority to and the benefit of U.S. Provisional Application No. 63/367,570, filed Jul. 1, 2022, titled "HIGH VOLUME INDUSTRIAL VACUUM ASSEMBLIES AND METHODS," U.S. Provisional Application No. 63/367,219, filed Jun. 29, 2022, titled "RECEIVER, ASSEMBLIES, AND METHODS FOR LOADING AND EXTRACTING PRODUCT IN ELEVATED TOWER," U.S. Provisional Application No. 63/367,218, filed Jun. 29, 2022, titled "ASSEMBLIES AND METHODS FOR MATERIAL EXTRACTION FROM RETENTION COLLECTIONS," U.S. Provisional Application No. 63/364,630, filed May 13, 2022, titled "ASSEMBLIES, APPARATUSES, SYSTEMS, AND METHODS FOR MATERIAL EXTRACTION AND CONVEYANCE," U.S. Provisional Application No. 63/264,101, filed Nov. 16, 2021, titled "ASSEMBLIES AND METHODS FOR MATERIAL EXTRACTION," U.S. Provisional Application No. 63/264,015, filed Nov. 12, 2021, titled "ASSEMBLIES AND METHODS FOR MATERIAL EXTRACTION," U.S. Provisional Application No. 63/203,147, filed Jul. 9, 2021, titled "SYSTEMS, METHODS, AND DEVICES FOR INDUSTRIAL TOWER WASTE EXTRACTION," and U.S. Provisional Application No. 63/203,108, filed Jul. 8, 2021, titled "SYSTEMS, METHODS, AND DEVICES FOR INDUSTRIAL TOWER WASTE EXTRACTION," the disclosures of all of which are incorporated herein by reference in their entireties.

In the drawings and specification, several embodiments of systems and methods to provide low carbon intensity transportation fuels have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

What is claimed is:

1. A system for removing waste material from a reaction vessel, the system comprising:

a manifold pneumatically coupled to two or more zones of differing elevations of the reaction vessel in which the waste material is disposed;

a material collector having an interior and pneumatically coupled to the manifold;

a high-pressure vacuum source pneumatically coupled to the material collector and positioned to generate a high-pressure vacuum of a fluid flow through the interior of the material collector to extract a majority of the waste material from the reaction vessel, through the manifold and into the interior of the material collector; and a fluid flow attenuating filter pneumatically coupled to an exhaust of the vacuum source and positioned to:

filter a minority of the waste material from the fluid flow after passage through the material collector and prior to discharge into an ambient environment, and attenuate sound of the high-pressure vacuum of the fluid flow prior to exhaustion of the fluid flow into ambient environment.

2. The system of claim 1, wherein the material collector comprises a vacuum box comprising:

a housing including one or more housing walls substantially surrounding the interior, an inlet port connected to the housing, positioned to allow access to the interior when pneumatically connected to the reaction vessel, and positioned to receive the majority of the waste material in the interior, a waste material mover positioned in the interior to move the majority of the waste material when received in the interior, a waste material discharge port connected to the housing to provide access to the interior and through which the waste material is discharged from the interior when positioned therein, and two or more structural housing support members each positioned spaced apart and extending along a surface of the housing to structurally support the one or more housing walls of the housing.

3. The system of claim 2, wherein the vacuum box further comprises:

a temperature sensor connected to the housing and positioned to measure a temperature of the material collector, and a controller, operably connected to the temperature sensor, adapted to determine a fill level of the waste material in the interior based on the temperature of the material collector.

4. The system of claim 2, wherein the vacuum box further comprises:

a controller, operably connected to the waste material mover and configured to determine a workload performed by the waste material mover to move the waste material in the interior; and determine a fill level of the waste material in the interior based on the workload.

5. The system of claim 4, wherein the housing includes a floor having one or more sloped floor walls on which the waste material in the interior is disposed when collected in the material collector.

6. The system of claim 5, wherein the waste material mover comprises:

an auger positioned to extend along lower portions of the sloped floor to move the waste material during collection in the material collector, and a drive unit positioned outside of the housing, operatively coupled to the auger and operably connected to the controller.

7. The system of claim 6, wherein the vacuum box further comprises:

a door substantially extending across an entire housing wall of the one or more housing walls and positioned to allow access to the interior when the door is open, the door sized to allow removal of the majority of the waste material in the interior through the door.

8. The system of claim 7, wherein the material collector further comprises:

a discharge port extending through the sloped floor and positioned in an auger induced movement path of the waste material in the interior to reduce a load on the auger when moving the waste material.

9. The system of claim 2, wherein each of the two or more structural housing support members are positioned to circumscribe at least three of the one or more housing walls in the case where the one or more walls is at least three.

10. The system of claim 9, wherein each of the two or more structural housing support members has a thickness that extends from an outer surface of the housing to set the surface of the housing back from an envelope defined by the two or more structural housing support members.

11. The system of claim 1, wherein the material collector further comprises:

a visual indicator positioned to show a fill level of the waste material in the interior when being filled with the waste material.

12. The system of claim 2, wherein the one or more housing walls comprise:

a first end wall positioned at a first end of a length of the vacuum box, and a second end wall positioned at a second end of the length of the vacuum box.

13. The system of claim 12, wherein the vacuum box further comprises:

a multiport extension pneumatically connected to the inlet port, positioned in the housing to distribute the majority of the waste material to two or more locations along the length of the vacuum box, and an exhaust port connected to the housing, positioned to allow access to the interior when pneumatically connected to the high-pressure vacuum source, and positioned to exhaust the minority of the waste material in the high-pressure vacuum of the fluid flow out of the interior.

14. The system of claim 13, wherein the inlet port is positioned on the first end wall and the exhaust port is positioned on one or more of: the first end wall or the second end wall, and wherein the vacuum box further comprises a door substantially extending across the second end wall, sized to allow removal of the majority of the waste material in the interior through the door.

15. The system of claim 1, wherein the fluid flow attenuating filter comprises:

a housing including a plurality of housing walls, a filter interior substantially surrounded by the plurality of housing walls, an inlet port pneumatically connected to the high-pressure vacuum source, positioned on one of the plurality of housing walls to receive the fluid flow into the filter interior, an exhaust port positioned on the housing to exhaust the fluid flow from the filter interior to an ambient environment and sized relative to the inlet port to attenuate the sound of the high-pressure vacuum of the fluid flow prior to exhaustion from the filter interior, and a filter media positioned in the filter interior to:

filter the minority of the waste material from the fluid flow, and attenuate a sound from the fluid flow prior to exhaustion from the filter interior.

16. The system of claim 15, wherein the fluid flow attenuating filter further comprises a jet generator adapted to generate a second fluid flow, and wherein the jet generator is positioned to transfer the filtered minority of the waste material from the filter media with the second fluid flow.

17. The system of claim 16, wherein the fluid flow attenuating filter further comprises a discharge port pneumatically connected to the material collector and positioned to transfer the minority of the waste material from the filter interior to the material collector.

18. The system of claim 17, wherein the fluid flow attenuating filter further comprises:

a controller operably connected to the jet generator and configured to intermittently generate the second fluid flow using the jet generator, a battery coupled to the controller to power the controller, and a solar panel coupled to the battery, positioned on the housing to charge the battery.

19. The system of claim 18, wherein the fluid flow attenuating filter further comprises a control valve operably connected to the controller and positioned to regulate a rate of the transfer of the filtered minority of the waste material from the filter interior to the material collector.

20. The system of claim 19, wherein the fluid flow attenuating filter further comprises:

a fill level sensor position to determine a fill level of the minority of the waste material in the filter interior, and wherein the controller is further configured to set the rate of the transfer of the filtered minority of the waste material from the filter interior to the material collector based on the fill level of the minority of the waste material in the filter interior.

21. The system of claim 1, wherein the material collector comprises a high volume pressure vessel comprising:

a housing including one or more housing walls substantially surrounding the interior in a bulbous shape, an inlet port connected to the housing, positioned to allow access to the interior when pneumatically connected to the reaction vessel, and positioned to receive the majority of the waste material in the interior, an exhaust port connected to the housing, positioned to allow access to the interior when pneumatically connected to the high-pressure vacuum source, and to exhaust the minority of the waste material out of the interior, a discharge port connected to the housing, positioned to discharge the majority of the waste material from the interior, a fluid supply port pneumatically connected to a fluid supply, positioned to pressurize the interior with the fluid supply, a relief port pneumatically connected to an ambient environment, positioned to relieve the high-pressure vacuum from the interior, a flow assistor positioned to increase a rate of the discharge of the majority of the waste material through the discharge port, and a controller configured to:

monitor a fill level of the majority of the waste material in the interior, make a determination that the fill level meets criteria, and in response to the determination:

discharge the majority of the waste material through the discharge port.

22. The system of claim 21, wherein the controller further is configured to:

prior to making the determination, seal the discharge port, the fluid supply port, and the relief port, thereby to direct the fluid flow from the inlet port to the exhaust port.

23. The system of claim 21, wherein a lower portion of the housing has a bowl shape between the inlet port and the exhaust port to trap the majority of the waste material in the interior, and wherein the inlet port and the exhaust port are positioned on the housing above the bowl shape.

24. The system of claim 23, wherein the discharge port is fluidly connected to the bowl shape to gravity feed the trapped majority of the waste material out of the discharge port.

25. The system of claim 1, further comprising:

a fluid supply source comprising:

a fluid reservoir to store a fluid, and a motor connected to the fluid reservoir to fill the fluid reservoir.

26. The system of claim 25, further comprising:

a pressurizer pneumatically coupled to the fluid reservoir, positioned to pressurize the two or more zones of the reaction vessel with the fluid.

27. The system of claim 25, wherein the high-pressure vacuum source comprises:

a venturi mechanism pneumatically connected to the fluid reservoir to generate the high-pressure vacuum with the fluid.

28. The system of claim 27, wherein the venturi mechanism further comprises:

one or more companion venturi mechanisms also pneumatically connected to the fluid reservoir to cooperatively generate the high-pressure vacuum by use of the fluid with the venturi mechanism.

29. The system of claim 1, wherein the material collector comprises a first material collector, and wherein the vacuum source comprises a first vacuum source, and wherein the system further comprises:

a second material collector pneumatically also connected to the manifold, and a second vacuum source pneumatically connected to the second material collector, so that the combination of the first and second vacuum sources and the first and second material collectors increase an extraction rate of the waste material from the reaction vessel.

30. The system of claim 1, wherein the material collector comprises a first vacuum box to be filled with the waste material, and the system further comprises:

a second auxiliary vacuum box positioned in the vicinity of the first vacuum box to substantially minimize a replacement time for the material collector.

31. The system of claim 1, further comprising:

a trailer having a bed positioned to underlie, support, and allow transport of the vacuum source and fluid flow attenuating filter as collective units.

* * * * *